US012759714B2

(12) United States Patent
Carle et al.

(10) Patent No.: US 12,759,714 B2
(45) Date of Patent: Oct. 13, 2026

(54) AIRCRAFT WITH AN UNDUCTED FAN PROPULSOR

(71) Applicant: General Electric Company, Evendale, OH (US)

(72) Inventors: Sara Elizabeth Carle, Hilliard, OH (US); Daniel L. Tweedt, West Chester, OH (US); Syed Arif Khalid, West Chester, OH (US); Andrew Breeze-Stringfellow, Montgomery, OH (US); William Joseph Bowden, Cleves, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/223,820

(22) Filed: May 30, 2025

(65) Prior Publication Data

US 2026/0200582 A1 Jul. 16, 2026

Related U.S. Application Data

(63) Continuation-in-part of application No. 18/939,731, filed on Nov. 7, 2024, and a continuation-in-part of (Continued)

(51) Int. Cl.

*B64D 27/12* (2006.01)
*B64C 11/16* (2006.01)

(Continued)

(52) U.S. Cl.

CPC .............. *B64D 27/12* (2013.01); *B64C 11/16* (2013.01); *B64C 11/48* (2013.01); *B64D 27/402* (2024.01); *B64D 29/02* (2013.01); *B64D 33/04* (2013.01)

(58) Field of Classification Search

CPC ...... B64D 27/12; B64D 27/402; B64D 29/02; B64D 33/04; B64C 11/16; B64C 11/48

See application file for complete search history.

(56) References Cited

U.S. PATENT DOCUMENTS

| | | | |
|---|---|---|---|
| 3,981,463 | A | 9/1976 | Pazmany |
| 4,055,041 | A | 10/1977 | Adamson |

(Continued)

FOREIGN PATENT DOCUMENTS

| | | | |
|---|---|---|---|
| DE | 102021113202 | A1 | 2/2022 |
| FR | 3070368 | | 3/2019 |

(Continued)

OTHER PUBLICATIONS

USPTO; U.S. Appl. No. 18/939,731, filed Nov. 7, 2024, entitled "Aircraft and Method for Operating".

(Continued)

*Primary Examiner* — Kimberly S Berona
*Assistant Examiner* — Steven J Shur
(74) *Attorney, Agent, or Firm* — Fitch, Even, Tabin & Flannery LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor. An unducted fan propulsor may further include an outlet nozzle that expels an exhaust stream at a non-zero angle with the centerline of the unducted fan propulsor such that the centerline is oriented downwardly relative to the exhaust stream. The outlet nozzle (Continued)

may further include a core cowl shaped to cause a bypass or third stream flow to entrain a core exhaust stream.

20 Claims, 32 Drawing Sheets

Related U.S. Application Data application No. 18/797,158, filed on Aug. 7, 2024, now Pat. No. 12,365,446, which is a continuation of application No. PCT/US2024/040754, filed on Aug. 2, 2024, which is a continuation-in-part of application No. 18/652,052, filed on May 1, 2024, now Pat. No. 12,384,522, which is a continuation-in-part of application No. 18/230,609, filed on Aug. 4, 2023, now Pat. No. 12,365,471.

(60) Provisional application No. 63/653,538, filed on May 30, 2024.

(51) Int. Cl.

| | |
|---|---|
| ***B64C 11/48*** | (2006.01) |
| ***B64D 27/40*** | (2024.01) |
| ***B64D 29/02*** | (2006.01) |
| ***B64D 33/04*** | (2006.01) |

(56) References Cited

U.S. PATENT DOCUMENTS

| | | | |
|---|---|---|---|
| 4,411,399 | A | 10/1983 | Hapke |
| 4,449,683 | A | 5/1984 | Gratzer |
| 4,451,015 | A | 5/1984 | Hapke |
| 4,486,146 | A | 12/1984 | Campion |
| 4,637,573 | A | 1/1987 | Perin |
| 4,713,935 | A | 12/1987 | Szuminski |
| 5,079,916 | A | 1/1992 | Johnson |
| 5,135,185 | A | 8/1992 | Adamson |
| 5,136,185 | A | 8/1992 | Fleming |
| 5,746,391 | A | 5/1998 | Rodgers |
| 5,887,822 | A | 3/1999 | Thornock |
| 6,102,328 | A | 8/2000 | Kumata |
| 7,165,744 | B2 | 1/2007 | Howarth |
| 7,891,163 | B2 | 2/2011 | Richards |
| 8,336,808 | B2 | 12/2012 | Challis |
| 8,714,475 | B2 | 5/2014 | Gall |
| 9,242,721 | B2 | 1/2016 | Neuteboom |
| 9,567,090 | B2 | 2/2017 | Gallet |
| 9,682,783 | B2 | 6/2017 | Bensilum |
| 9,759,160 | B2 | 9/2017 | Sankrithi |
| 9,771,878 | B2 | 9/2017 | Lu |
| 10,040,559 | B2 | 8/2018 | Hoisington |
| 10,364,750 | B2 | 7/2019 | Rambo |
| 10,442,541 | B2 | 10/2019 | Miller |
| 10,556,699 | B2 | 2/2020 | Pautis |
| 10,669,881 | B2 | 6/2020 | Breeze-Stringfellow |
| 10,704,410 | B2 | 7/2020 | Zatorski |
| 10,907,495 | B2 | 2/2021 | Breeze-Stringfellow |
| 11,136,109 | B2 | 10/2021 | Wood |
| 11,939,052 | B2 | 3/2024 | Van Der Meer |
| 2004/0140397 | A1 | 7/2004 | Dun |
| 2007/0176053 | A1 | 8/2007 | Bigot |
| 2010/0014977 | A1 | 1/2010 | Shattuck |
| 2011/0016844 | A1 | 1/2011 | Durand |
| 2011/0192933 | A1 | 8/2011 | Guering |
| 2012/0119023 | A1 | 5/2012 | Moore |
| 2013/0038057 | A1 | 2/2013 | Mcloughlin |
| 2014/0234112 | A1 | 8/2014 | Read |
| 2015/0239569 | A1 | 8/2015 | Gallet |
| 2016/0167798 | A1 | 6/2016 | Prentice |
| 2016/0244174 | A1 | 8/2016 | Pautis |
| 2016/0333734 | A1 | 11/2016 | Bowden |
| 2017/0240286 | A1 | 8/2017 | Lemarchand |
| 2017/0313430 | A1 | 11/2017 | Pautis |
| 2018/0119641 | A1 | 5/2018 | Colebrooke |
| 2018/0141670 | A1 | 5/2018 | Keller |
| 2019/0031362 | A1 | 1/2019 | Petty, Sr. |
| 2019/0118967 | A1 | 4/2019 | Kelly |
| 2019/0185170 | A1 | 6/2019 | Schelfaut |
| 2019/0225318 | A1 | 7/2019 | Ramakrishnan |
| 2020/0010174 | A1 | 1/2020 | Wood |
| 2020/0331591 | A1 | 10/2020 | Page |
| 2021/0108597 | A1 | 4/2021 | Marion |
| 2021/0222575 | A1 | 7/2021 | Breeze-Stringfellow |
| 2022/0063793 | A1 | 3/2022 | Freely |
| 2023/0021836 | A1 | 1/2023 | Riddle |
| 2023/0099948 | A1 | 3/2023 | Chiabrando |
| 2023/0356853 | A1 | 11/2023 | Cline |
| 2024/0018900 | A1 | 1/2024 | Khalid |
| 2024/0401482 | A1 | 12/2024 | Kray |
| 2025/0042537 | A1 | 2/2025 | Carle |
| 2025/0042538 | A1 | 2/2025 | Carle |
| 2025/0042558 | A1 | 2/2025 | Carle |
| 2026/0008550 | A1 | 1/2026 | Carle |
| 2026/0015090 | A1 | 1/2026 | Carle |

FOREIGN PATENT DOCUMENTS

| | | | |
|---|---|---|---|
| FR | 3070368 | B1 | 11/2019 |
| FR | 3083207 | A1 | 1/2020 |
| FR | 3127024 | | 3/2023 |
| FR | 3127025 | | 3/2023 |
| FR | 3127269 | | 3/2023 |
| FR | 3129375 | | 5/2023 |
| FR | 3129428 | | 5/2023 |
| FR | 3129432 | | 5/2023 |
| FR | 3129436 | | 5/2023 |
| FR | 3129690 | | 6/2023 |
| FR | 3129970 | | 6/2023 |
| FR | 3129972 | | 6/2023 |
| FR | 3130313 | | 6/2023 |
| FR | 3130323 | | 6/2023 |
| FR | 3130747 | | 6/2023 |
| FR | 3130874 | | 6/2023 |
| FR | 3130875 | | 6/2023 |
| FR | 3130877 | | 6/2023 |
| FR | 3130879 | | 6/2023 |
| FR | 3130894 | | 6/2023 |
| FR | 3130895 | | 6/2023 |
| FR | 3130896 | | 6/2023 |
| FR | 3130897 | | 6/2023 |
| FR | 3132279 | | 8/2023 |
| FR | 3132729 | | 8/2023 |
| FR | 3132743 | | 8/2023 |
| FR | 3133367 | | 9/2023 |
| FR | 3133368 | | 9/2023 |

OTHER PUBLICATIONS

USPTO; U.S. Appl. No. 19/224,187, filed May 30, 2025, entitled "Unducted Thrust Producing System".

"Could an open fan engine cut carbon emissions for more sustainable aviation?"; https://www.airbus.com/en/newsroom/stories/2022-07-could-an-open-fan-engine-cut-carbon-emissions-for-more-sustainable; Jul. 19, 2022; 3 pgs.

Antonov An-70—Price, Specs, Photo Gallery, History—Aero Corner; https://aerocorner.com/aircraft/antonov-an-70/#lg=1&slide=5; Site was known as early as Dec. 2021; 5 pgs.

Attariwala, Joetey; "Coming to a Theatre near You"; published Feb./Mar. 2016 Issue (Oct. 26, 2017); https://www.armadainternational.com/2017/10/airbus-a400m-strategic-turboprop-freighter-programme/; 9 pgs.

AIRCRAFT WITH AN UNDUCTED FAN PROPULSOR

PRIORITY INFORMATION

This application is a continuation-in-part of U.S. patent application Ser. No. 18/797,158, filed on Aug. 7, 2024, which is a continuation of International Appl. No. PCT/US2024/040754, filed on Aug. 2, 2024, which claims priority to U.S. patent application Ser. No. 18/230,609, filed on Aug. 4, 2023, and Ser. No. 18/652,052, filed May 1, 2024, the latter of which is a continuation-in-part of the former, the disclosures of which are hereby incorporated by reference in their entireties. Furthermore, this patent application claims benefit of priority to U.S. Provisional Application No. 63/653,538, entitled "UNDUCTED THRUST PRODUCING SYSTEM" and filed on May 30, 2024, which is hereby incorporated herein by reference in its entirety. This patent application also claims benefit of priority to U.S. application Ser. No. 18/939,731, entitled "AIRCRAFT AND METHOD FOR OPERATING" and filed on Nov. 7, 2024, which is hereby incorporated herein by reference in its entirety.

TECHNICAL FIELD

The present disclosure relates generally to an aircraft with a fan propulsor.

BACKGROUND

Winged aircraft have undermounted propulsors in the form of a turboprop engine. The addition of a propulsor to a wing can lead to installation penalties, including increased drag. As the size of the undermounted propulsor increases, installation penalties can also increase, such as increased weight.

BRIEF DESCRIPTION OF DRAWINGS

A full and enabling disclosure of the aspects of the present description, including the best mode thereof, directed to one of ordinary skill in the art, is set forth in the specification, which refers to the appended figures, in which.

DETAILED DESCRIPTION

Aspects and advantages of the present disclosure will be set forth in part in the following description or may be learned through practice of the present disclosure.

The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein. The singular forms "a", "an", and "the" include plural references unless the context clearly dictates otherwise. The term "at least one of" in the context of, e.g., "at least one of A, B, and C" refers to only A, only B, only C, or any combination of A, B, and C. The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

Figure 6A:
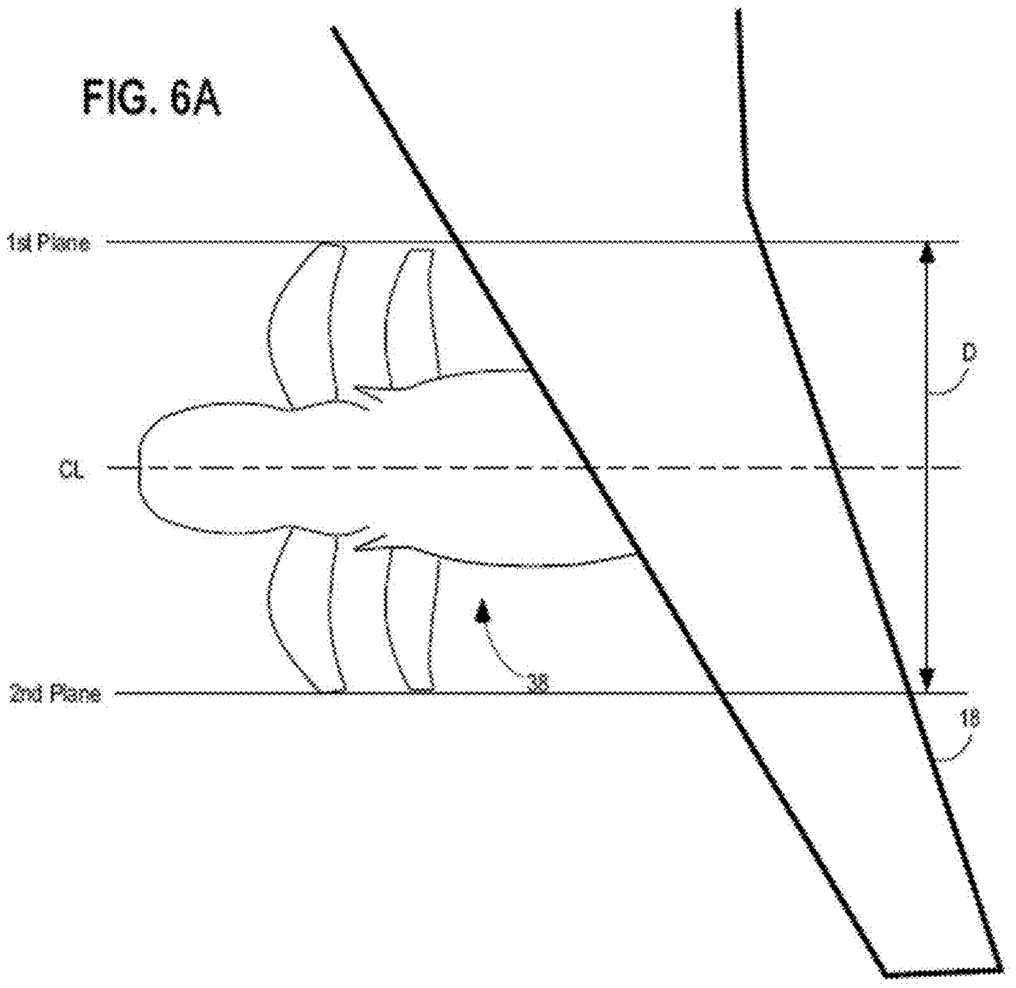
FIG. 6A comprises a top plan view of the propulsor of FIG. 4 and inboard and outboard locations of the wing relative to an unducted fan propulsor centerline, with the inboard and outboard locations in FIG. 6A used to determine a chord length (C) of the airfoil section in FIG. 4.
Figure 6B:
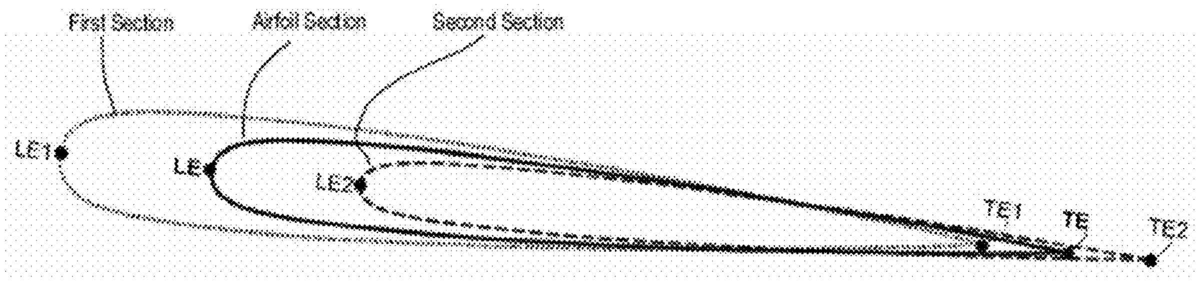
FIG. 6B comprises a schematic side elevation view of a first section and a second section of the aircraft wing, which sections are used to determine an effective quarter chord point (QC) of the airfoil section in FIG. 4.

"Airfoil section" and "effective quarter chord point (QC)" are defined as follows. "Airfoil section" is defined as the average of a first offset plane section and a second offset plane section of an airfoil (e.g., an airfoil associated with a horizontal stabilizer or wing of an aircraft), where the first offset plane section is the section of the airfoil taken at a first plane and the second offset plane section is the section of the airfoil taken at a second plane, the first and second planes each being offset in a direction perpendicular to, and equidistant from a central plane by a distance of ½ of a fan diameter (D) of rotating blades of a propulsor mounted to the portion of the aircraft body associated with the airfoil section (wing or horizontal stabilizer). The first plane is inboard of the central plane (towards the fuselage) and the second plane is outboard of the central plane. When the aircraft is on the ground, both the gravity vector and axis of rotation of the rotating blades lie in the central plane. The intersection of the first offset plane with the airfoil defines a first section having a first section leading edge (LE1) and a first section trailing edge (TE1), with the LE1 at the forward-most point of the first section and the TE1 at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIGS. 6 and 6B. An "Airfoil Section" defined herein has its leading and trailing edges TE, LE determined in this manner. "Effective Quarter-chord point" ("QC") is defined as ¼ of the distance from the leading edge LE of the airfoil section determined in the foregoing manner, measured along the chord of this airfoil section. QC is dependent on the fan diameter (D) because the airfoil section LE and TE values change if D for the unducted fan propulsor changes.

"Cruise Speed" refers to aircraft speed and applies to a vehicle with a cruising altitude up to approximately 65,000 ft. In certain embodiments, cruise altitude is between approximately 28,000 ft. and approximately 45,000 ft. In still certain embodiments, cruise altitude is expressed in flight levels based on a standard air pressure at sea level, in which a cruise flight condition is between FL280 and FL650.

In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

It is understood that the plurality blades, whether forward or rearward, may have a variation of root forward-most points and root rearward-most points. This can be due to both installed position as well as orientation in the case of variable pitch blades. For purposes of defining the distances TRL, RTL, and VTL it is understood that a rotating blade or rotating array of blades are orientated such that the respective leading edges of the blades are in their most forward position, e.g., a feathered position. The respective trailing edge position is also obtained when the leading edge is in the most forward position. For purposes of defining the distances TRL, RTL, and VTL it is understood that the forward or leading edge or rearward or trailing edge of a stationary blade (or vane) or array of stationary blades (or vanes) is the most forward or leading edge position across the array of vanes or the most rearward or trailing edge position across the array of vanes. "Blade" can refer to a stationary or rotating blade. "Stationary blade(s)" has the same meaning as "vane(s)."

Figure 3:
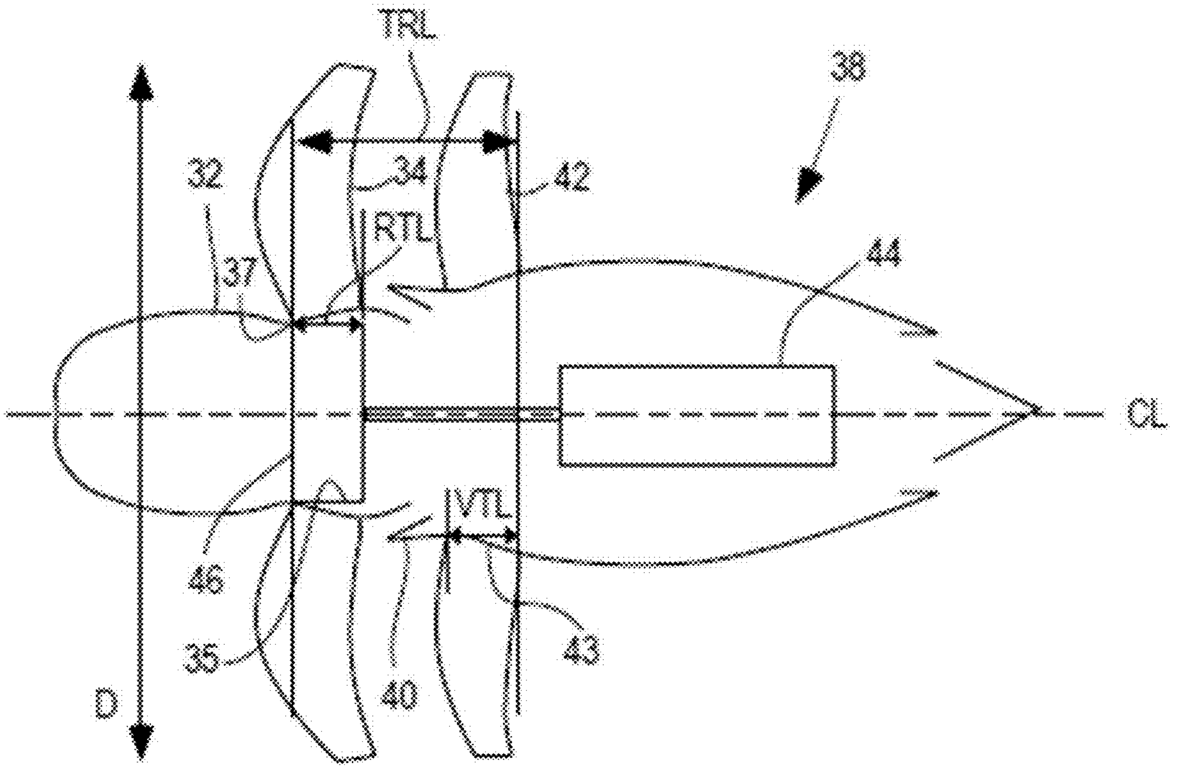
FIG. 3 comprises an elevational cross-sectional view of an exemplary unducted fan propulsor having a plurality of blades arranged in a forward array and a rearward array.

"Unducted fan propulsor" as used herein means an aircraft engine characterized by an array of rotating fan blades and static (or non-rotating), outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or fan nacelle. FIG. 3 depicts an unducted fan propulsor. Additionally, the term unducted fan propulsor means an unducted, fan driven aircraft engine capable of providing thrust to an aircraft to enable cruise flight speeds between 0.7 Mach and 0.90 Mach, or 0.75 to 0.85 Mach.

"Aircraft" means a vehicle having a wing (and/or horizontal stabilizer), an airfoil defined by the wing (and/or horizontal stabilizer), and one or two unducted fan propulsors mounted to the wing, and the aircraft is operable at cruise flight speeds between 0.7 Mach and 0.90 Mach, or 0.75 to 0.85 Mach. "Fuselage centerplane" ("FCP") is defined as a plane that is located equidistant from the wingtips, intersecting the fuselage, and containing the gravity vector when the aircraft is on the ground.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other. As used herein, the term "proximate" refers to being closer to one side or end than an opposite side or end.

A "third stream" as used herein means a non-primary air stream capable of increasing fluid energy to produce a minority of total propulsion system thrust. A ducted turbofan may generate two main exhaust streams: a core exhaust stream and a bypass stream. An unducted thrust producing system may generate three exhaust stream: a core exhaust stream, a bypass flow stream corresponding to an unducted fan stream generated by the unducted fan on the outside of the engine, and a third stream generated through a guided bypass flowpath disposed radially outward from the turbomachine flowpath of the core exhaust stream. A pressure ratio of the third stream may be higher than that of the primary propulsion stream (e.g., a fan or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

The term "mean direction of flow," with respect to an exhaust stream, refers to a mean average of all flow from a particular exhaust, taking into account both magnitude and direction of all of such flow. The mean direction of flow may refer to the mean direction of flow during a steady state operation, such as during cruise operations.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The inventors were faced with a problem of how to improve thrust delivered to an aircraft by an unducted fan propulsor without increasing the required engine power delivered to the unducted fan of the unducted fan propulsor.

It was surprisingly found that the solution to this problem is heavily dependent on the location of the unducted fan propulsor relative to the aircraft wing.

The inventors found that installing an unducted fan propulsor presents the challenge of addressing penalties that can result due to the interaction with the rest of the aircraft. The manner in which these penalties are addressed according to the claimed subject matter is unique for this type of engine.

An unducted fan propulsor is particularly challenged due to the scrubbing and interference drags relative to a ducted turbofan. That additional drag then results in a higher thrust needed from the propulsor. Generally, higher thrust for a ducted turbofan comes with a larger power requirement and thus more fuel flow. For the unducted fan propulsor it was surprisingly found by placing the engine so that it can take advantage of the high pressure flow induced by the wing (and/or a horizontal stabilizer), engine thrust may increase without increasing the power requirement on the engine. This placement of the engine relative to the wing then acts to offset the scrubbing and interference drag, thus not increasing the required fuel (or reducing the increased fuel flow required for a non-optimum engine placement). The inventors found that increased drag effects associated with an unducted fan propulsor, rather than addressed directly, may instead be offset by placing the engine at a more optimal location relative to the wing.

Additionally, the inventors found that the installed engine's improved position also positively influences the noise produced by the wing-engine interaction during flight at cruise conditions.

It was surprisingly found that by adapting a particular location on an unducted fan propulsor relative to an aircraft wing's effective quarter chord point (QC), the desired result of offsetting interference and scrubbing drag without increasing the power delivered to the fan could be achieved for an unducted fan propulsor.

It was also found that the improved position is dependent on the fan blade size of the unducted fan propulsor.

As explained below, after recognizing the novel flow characteristics associated with an unducted fan propulsor installed on an aircraft, taking into account the limitations on where to place this propulsor, the inventors were surprisingly able to establish criteria for positioning the propulsor relative to an aircraft wing to offset interference and scrubbing effects by defining a midpoint (P) location between external output guide vanes (OGV) or input guide vanes (IGV) and a forward or aft rotating array of fan blades, respectively, and additionally defining the distance from the effective quarter chord point (QC) to P. The position of P relative to QC and QC itself were found dependent on the rotating fan diameter. The correlation of these parameters to offset interference and scrubbing effects was not used before and was the surprising finding of the inventors for an unducted fan propulsor. Thus, mounting unducted fan propulsors relative to the effective quarter-chord point (QC) and fan blade size as described in embodiments provided herein offsets interference and scrubbing effects associated with an unducted fan propulsor and is an improvement over other mounting locations, including conventional mounting locations that are more forward of, and more in line with, a wing chord line.

Various aspects of the present disclosure describe aspects of an aircraft characterized in part by a specific relation between an effective quarter chord point (QC) of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 1:
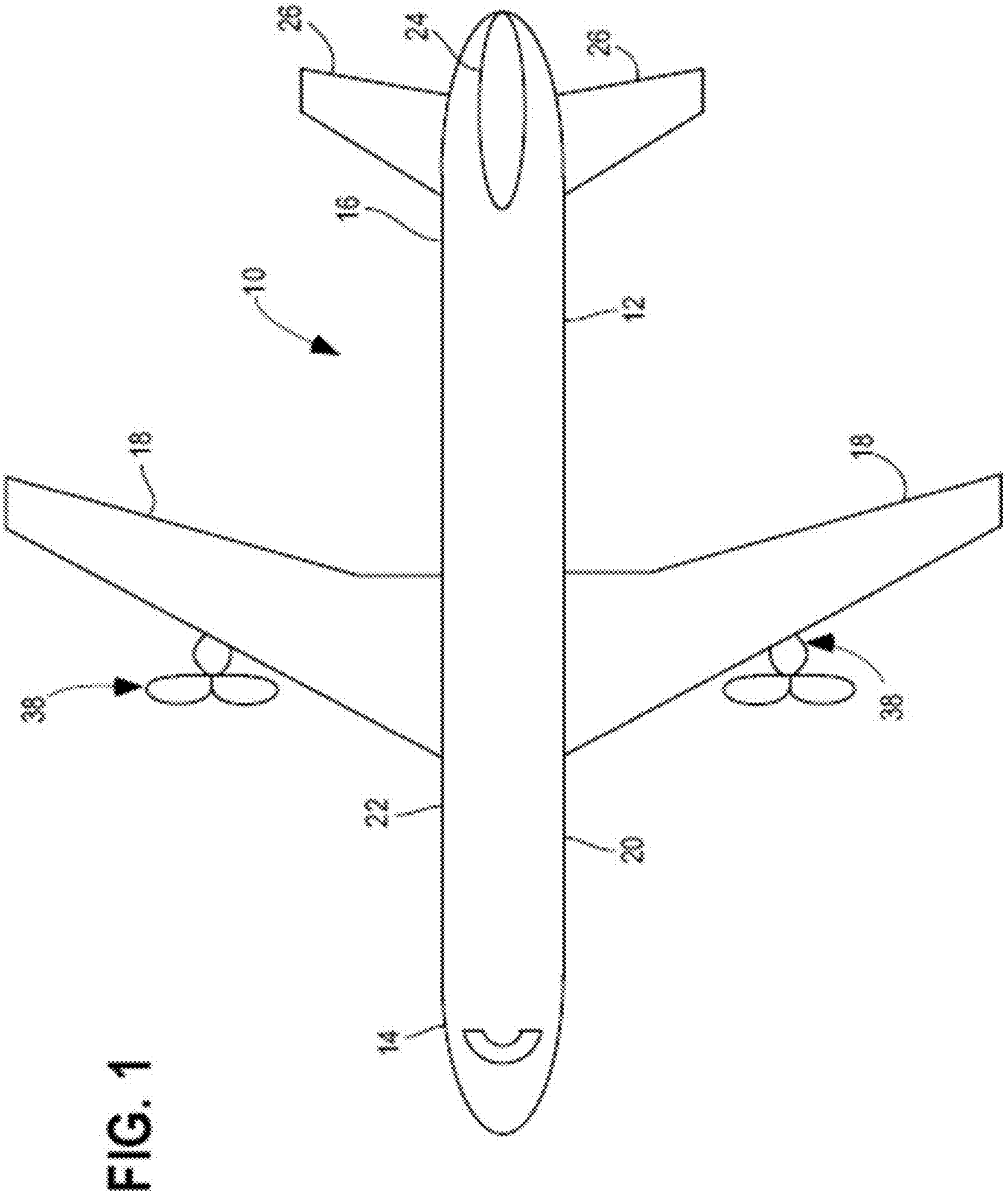
FIG. 1 comprises a top plan view of an aircraft as configured in accordance with various embodiments of these teachings, with undermounted, unducted fan propulsors mounted on forward wings of the aircraft.
Figure 2:
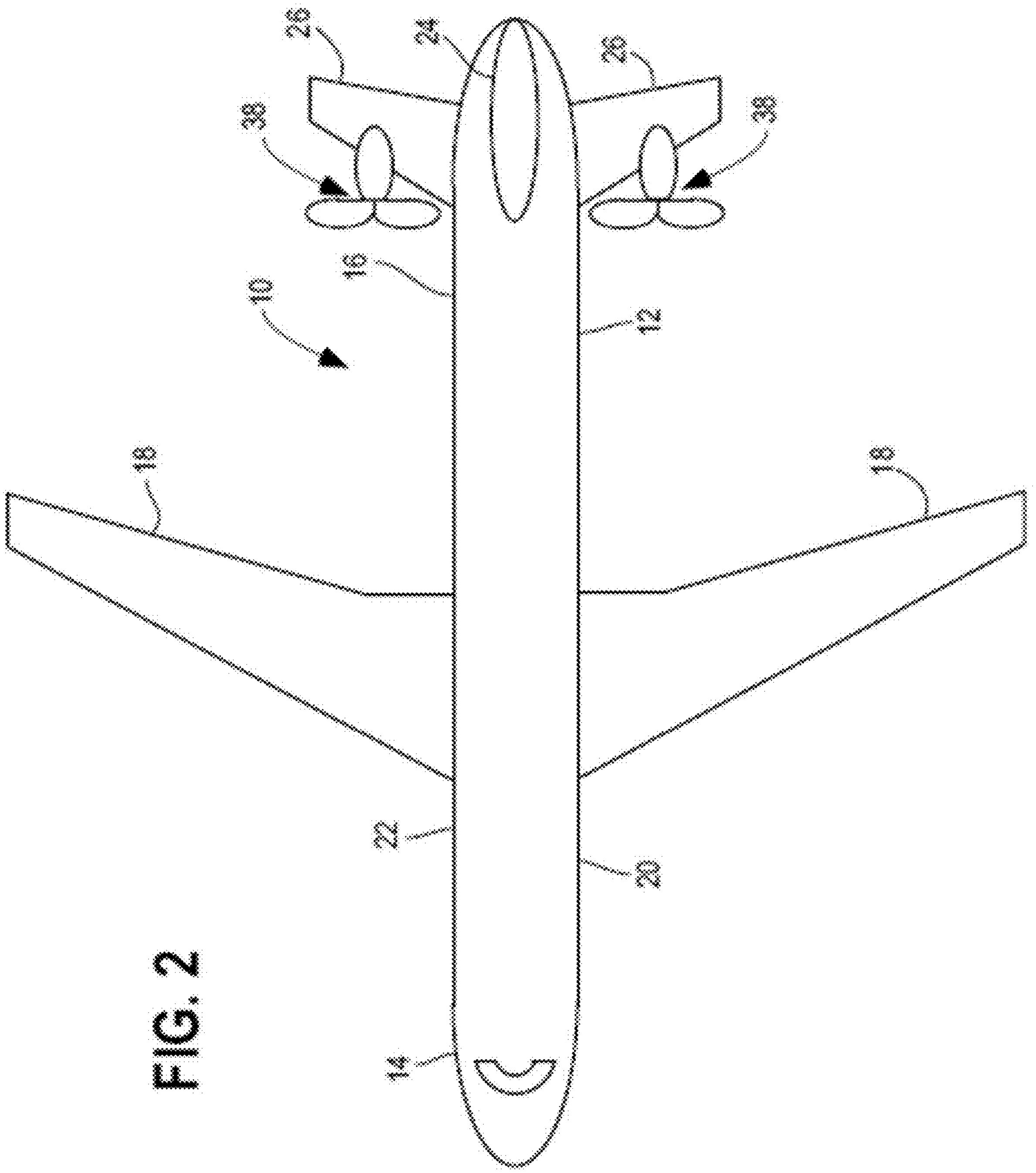
FIG. 2 comprises a top plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. An unducted fan propulsor 38 is undermounted relative to each of the wings 18, as shown in the embodiment of FIG. 1. Alternatively, the unducted fan propulsor 38 is mounted relative to the top of each of the horizontal stabilizers 26, as shown in FIG. 2. In some embodiments, more than one of the unducted fan propulsors 30 or 38 may be mounted to each of the wings 18 or each of the horizontal stabilizers 26.

FIG. 3 shows an elevational cross-sectional view of an embodiment of one of the unducted fan propulsors 38. As is seen from FIG. 3, the unducted fan propulsor 38 takes the form of an open fan propulsion system and has a rotating element in the form of rotatable propeller assembly 32 on which is mounted a first array of blades 34 around a centerline (CL) of the unducted fan propulsor 38. The first array of blades 34 defines a diameter D representing the tip-to-tip diameter of the blades and a maximum radial extent from CL. This diameter D is measured along a radial direction perpendicular to CL. The unducted fan propulsor 38 of FIG. 3 includes a second array of blades or vanes, which are non-rotating or static. In some embodiments, a non-rotating stationary element in the form of vane assembly 40 includes an array of vanes 42 disposed around CL.

Each of the blades 34 has a root 35 where the blade 34 is attached to the rotatable propeller assembly 32, and each blade 34 defines a root length (RTL). The root length (RTL) is defined as the axial extent (in a direction parallel to CL) from the radially innermost leading edge (LE) of the blade 34 airfoil, e.g., closest to CL, to the axial location of the radially innermost trailing edge (TE) of the blade 34 airfoil.

Figure 4:
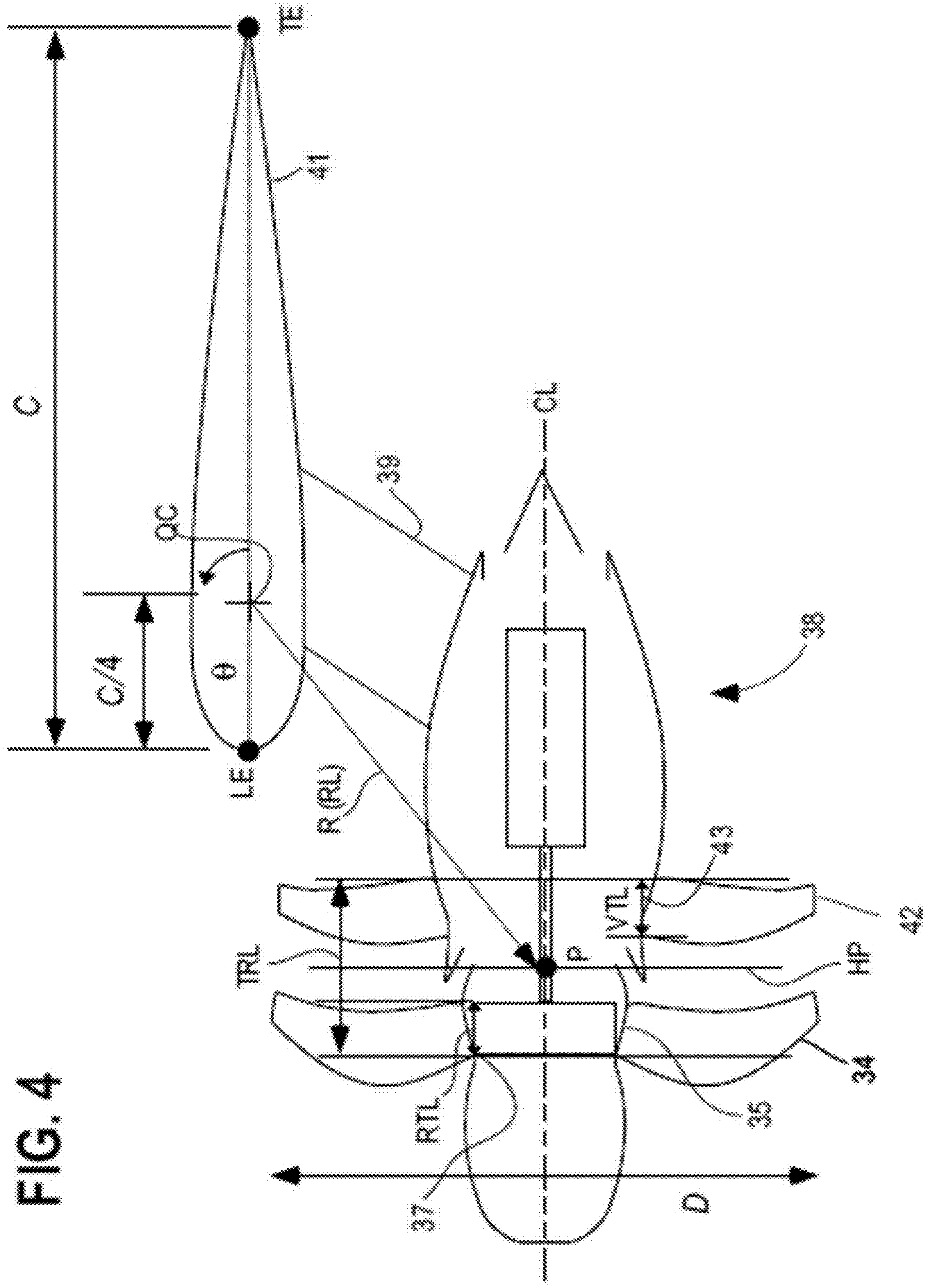
FIG. 4 comprises a schematic side elevation view showing the location of the unducted fan propulsor of FIG. 3 relative to an airfoil section.

Each of the vanes 42 also has a root 43 with a vane root distance VTL where the vane 42 is attached to the non-rotating vane assembly 40. The total root length (TRL) is the distance between the leading edge (LE) of the blade 34 airfoil (radially nearest to CL) of the blades 34 and the trailing edge (LE) of the root 43 of the vanes 42, as shown in FIGS. 3 and 4. TRL is a measured axial distance from the radial innermost LE of the foremost row of blades/vanes and the trailing edge (TE) of the vanes 42. In some embodiments, the second array may instead be a second rotating elements and the TRL is the measured axial distance from the radially innermost LE of the blades 34 of the first rotating element and the TE of the root of the blades of the second rotating elements. In some embodiments, the vanes 42 may be forward of the rotating blades, and the TRL is the distance between the LE edge of the root of the vanes and the TE of the root of the rotating blades. In some embodiments, an unducted fan propulsor having rotating elements (e.g., rotating blades) and stationary elements (e.g. vanes) may be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rearward edge of the root of the aftmost row of blades/vanes of the unducted fan propulsor.

Referring to FIG. 4, for purposes explained more later, the unducted fan propulsor 38 has a point P. For the unducted fan propulsor 38 with a first array of blades 34 (or vanes) and a second array of blades 42 (or vanes), as shown in FIGS. 3 and 4, the point P is located at the intersection of CL and a line HP perpendicular to CL and that passes through an axial midpoint of the total root length TRL between a forward end at the root of one of the blades 34 of the forward array and a rearward end at the root of one of the blades 42 of the rearward array when aligned with the one of the blades 34 of the forward array, as shown in FIG. 6. Either the forward or rearward array can be vanes or blades. In other words, the line HP is located equidistant from a forward end of the root of one of the forward vanes or blades 34 and a rearward end of the root of one of the rearward blades or vanes 42. The TRL of an unducted fan propulsor is defined as the distance between the LE of the root of the forward row of blades/vanes and the rearward edge of the root of the aftmost blade/vane.

Referring again to FIG. 3, the exemplary unducted fan propulsor 38 includes a drive mechanism 44 that provides torque and power to the propeller assembly 32 through a transmission 46. The drive mechanism 44 may be a gas turbine engine and associated transmission 46. Transmission 46 delivers torque from the drive mechanism 44 to the propeller assembly 32. The transmission system can be configured as a direct drive engine, transferring power from a power turbine or low-pressure turbine (LPT) to the propeller assembly, or an indirect drive system where torque from the LPT is transferred to the propeller assembly 32 through a gearbox. The gearbox reduces a rotation speed of the drive shaft to match a desired rotational speed for the propeller assembly 32. The gas turbine engine includes in serial order a compressor, combustor, high pressure turbine and the LPT. In other embodiments the drive mechanism may generate power partially or fully by an electric motor. In the former case the drive mechanism is a hybrid electric drive mechanism including a gas turbine engine where a drive shaft includes an electric motor-generator for generating torque. In the latter case the drive mechanism is an electric motor.

The unducted fan propulsor 38 is attached relative to the wings 18 or horizontal stabilizer 26 through one or more intermediate components or features, e.g., a pylon 39, as shown in FIG. 4.

Each of the wings 18 shown in FIG. 1, and horizontal stabilizers 26 shown in FIG. 2, has an airfoil section 41 associated with it, where the airfoil section 41 is defined above.

As depicted in FIG. 4, a chord line C of the airfoil section, length C as shown, is a straight line extending from LE to TE of the airfoil section (it will be understood that the airfoil section as shown and defined herein is not meant to indicate any particular camber associated with an aircraft wing). The effective quarter-chord point (QC) of the airfoil section is located on the chord line. QC is located at a distance of C/4 from the LE of the airfoil section 41.

Figure 5A:
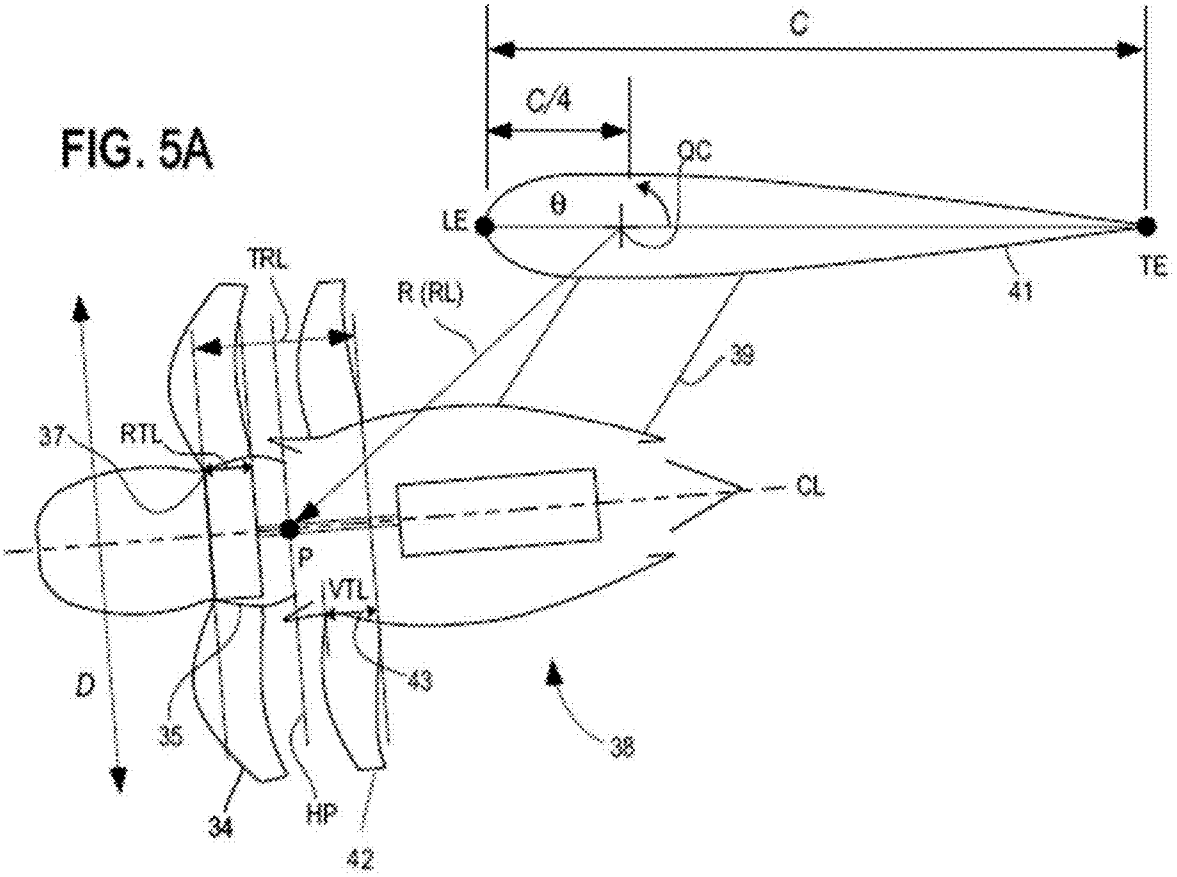
FIG. 5A is a schematic side elevation view similar to FIG. 4 and showing the unducted fan propulsor pitched downward relative to the airfoil section.
Figure 5B:
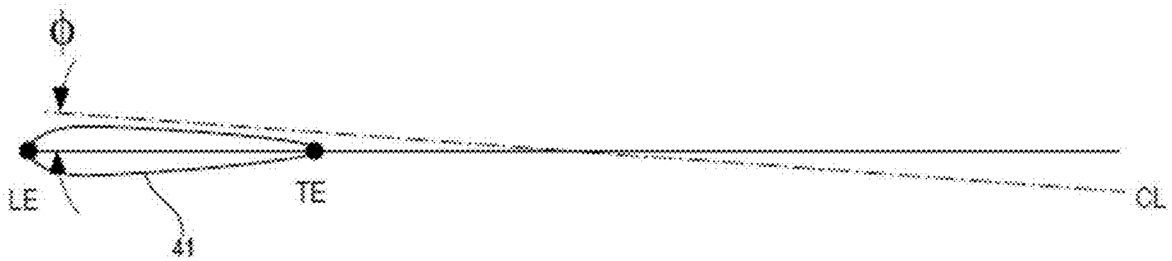
FIG. 5B defines a pitch angle (D for the unducted fan propulsor relative to a chord line of the airfoil section in FIG. 4.

As shown in FIG. 4, the CL of the propulsor 38 and the chord line C are parallel to each other, corresponding to a zero pitch of the propulsor relative to the chord line C. The propulsor 38 can be pitched at different angles relative to the chord line, such as pitched downward as shown in FIG. 5A. FIG. 5B defines a pitch angle (D for the propulsor 38, which is the angle spanned between the propulsor centerline CL and chord line C. Positive pitch corresponds to a clockwise rotation of CL relative to C. The pitch angle (can be fixed or variable during flight. For underwing installations, the pitch angle (can vary between −5 and +2 degrees, or it can vary between −3 and 0 degrees. During cruise conditions, propulsor pitch and toe angle (FIG. 6E, defined below) provide for an improved installed aerodynamic performance for the unducted fan propulsor in terms of reduced cabin noise and reduced off-axis loading of the unducted fan propulsor's drive shaft. For aft horizontal stabilizer or aft fuselage installations, the angle (can vary between −2 and +5 degrees to more align with downwash created by the wing.

The position of the open fan propulsor 38 is defined relative to QC. The airfoil section, as defined above, is the average of a first offset plane section and a second offset plane section of the airfoil (of the wing), where the first offset plane section is the section of the airfoil taken at a first plane and the second offset plane section is the section of the airfoil taken at a second plane, the first and second planes being offset in a direction perpendicular to, and equidistant from a central plane by a distance of ½ the maximum fan diameter (D) for the rotating blades, as shown in FIG. 6A. Both the gravity vector and axis of rotation of the rotating blades of the propulsor lie in this central plane when the aircraft is on the ground.

Figure 6C:
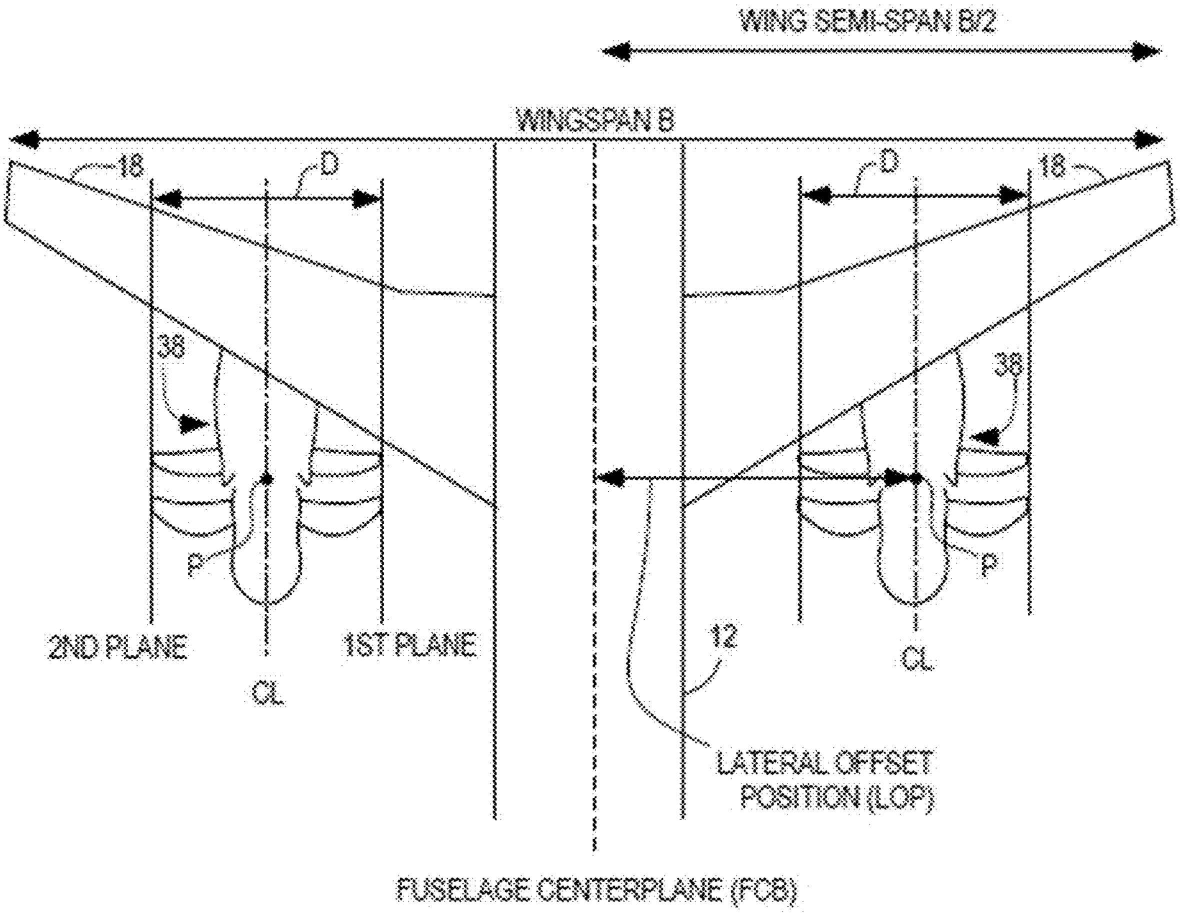
FIG. 6C comprises a schematic top plan view of a portion of an aircraft having a pair of wings extending from the fuselage with the propulsor of FIG. 3 mounted relative to each of the wings.

Referring to FIG. 6C, the propulsor 38—specifically, point P of the propulsor 38—has a spanwise location laterally offset from the fuselage centerplane (FCP) relative to the aircraft's wingspan B. P has a laterally offset position (LOP) between 10% and 80%, 20% and 40%, or between 25% and 35% of B/2 measured from the fuselage centerplane (FCP), as defined above. The location of P is also chosen to avoid interference with the fuselage or an adjacent propulsor if more than one propulsor is mounted relative to the wing. For an aft fuselage installation, the LOP of the propulsor will be closer to the fuselage, but far enough away from the fuselage's boundary layer to reduce or avoid undue interaction with the fuselage boundary layer.

Figure 6D:
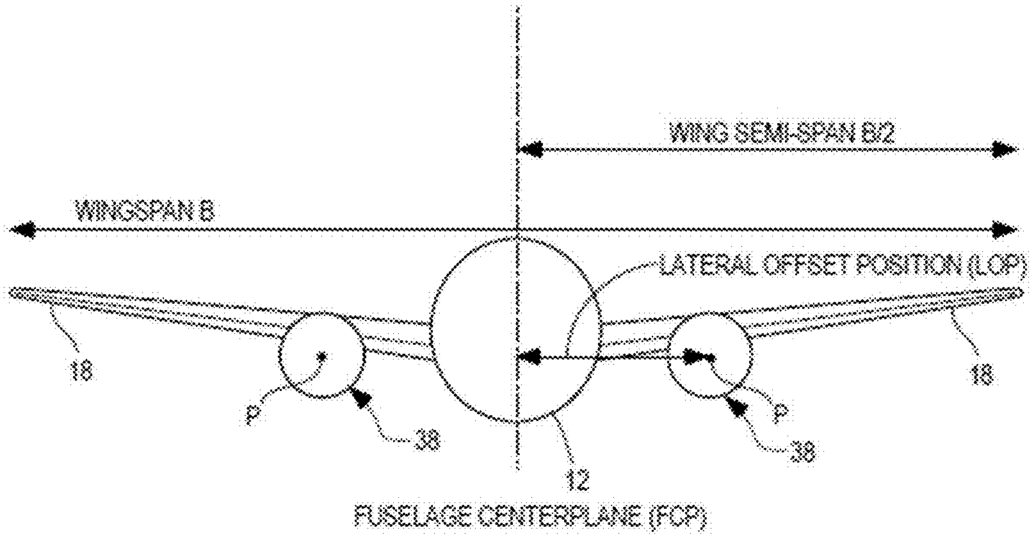
FIG. 6D comprises a schematic front elevation view of the aircraft portion of FIG. 6C.
Figure 6E:
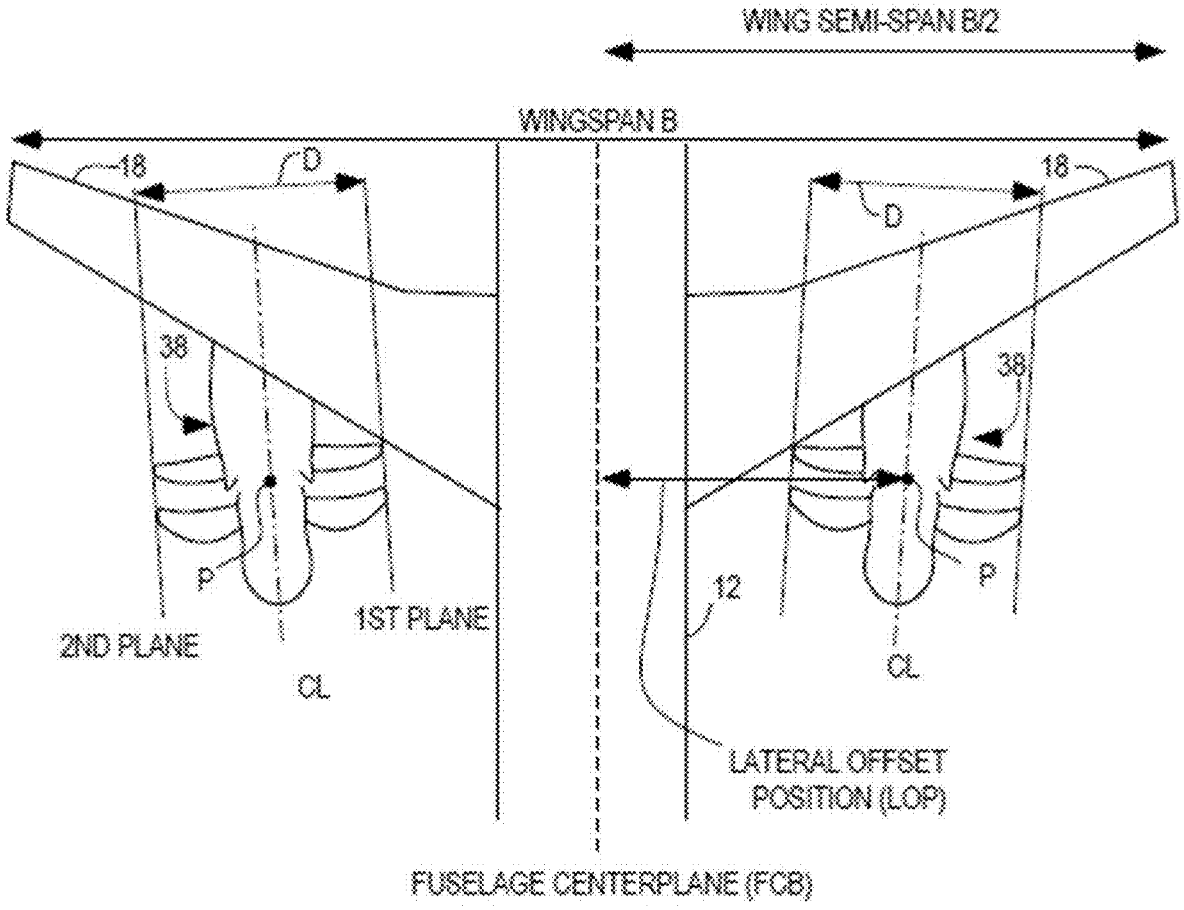
FIG. 6E comprises a schematic top plan view of a portion of an aircraft having a pair of wings extending from the fuselage with the propulsor of FIG. 3 mounted relative to each of the wings, similar to FIG. 6C but showing the propulsors toed inwardly toward the fuselage.

As shown in FIG. 6C, the propulsor centerline CL and the fuselage centerplane (FCP) can be orientated parallel to each other. Referring to FIG. 6D, other angles between propulsor centerline CL and the fuselage centerplane (FCP) are contemplated. For an underwing mounted propulsor, the toe angle can provide added benefit when positive (i.e., the rotor toed-in towards the fuselage with the forward end of the propulsor 38 being more inboard than the aft end). The propulsor can have an inward toe angle of between 0 and 5 degrees, or between 1 and 3 degrees.

There are specific locations that the inventors have found to be advantageous to position the unducted fan propulsor 38 to generate increased thrust using higher pressure air flow, in order to offset the scrubbing and interference drag. The higher pressure air flow can be beneath the wings 18. In the case of a horizontal stabilizer 26, the higher pressure air flow is above the horizontal stabilizer 26. Accordingly, the high-pressure side of an airfoil may refer to the underside of a wing 18 or the top side of a horizontal stabilizer 26.

The aircraft described herein has a fuselage, wings and/or stabilizers, and two or more unducted fan propulsor systems (or propulsors). The unducted fan propulsor system, which is mounted on the pressure side of a wing or horizontal stabilizer, provides thrust to the aircraft. To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. For example, placement can affect loads on and size of the pylon, wing loads, landing gear length and associated forces, weight, and cost.

The teachings described below enable improved balancing of the tradeoffs required in the aircraft design while positioning the unducted fan propulsor relative to the airfoil section's effective quarter chord point QC to offset scrubbing and interference drag loses.

Referring to FIG. 4, the location of an unducted fan propulsor relative to an airfoil section 41 is defined herein using a polar coordinate system having an angular (θ) coordinate and a radial (R) component, with origin located at the effective quarter chord point (QC) of the airfoil section having a chord length (C) as shown. The radial component is referred to herein as a "positioning line (R)". The location of the point P of the unducted fan propulsor 38 relative to the origin (QC) of the polar coordinate system (the origin of the coordinate system is the same as the effective quarter chord point for airfoil section 41) is expressed in terms of a vector having radial component R with magnitude RL and angular component θ. The vector magnitude RL is called a "positioning line length (RL)".

The angle θ is measured relative to a datum that is the airfoil section chord line (e.g., in FIG. 6 the vector R is located by an angle that is between 180 and 270 degrees measured counterclockwise about origin QC relative to the chord line). When viewed looking from an outboard position towards an inboard position (e.g., the fuselage), 0 is positive in a counter-clockwise direction when the propulsor is below the airfoil section 41 (wing, FIG. 9), and θ is positive in a clockwise direction when the propulsor is above the airfoil section (horizontal stabilizer, FIG. 10) as indicated in the drawings, respectively, by the direction of the arrow from the origin.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section) of FIGS. 5 and 6 the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θlocating the unducted fan propulsor system relative to the airfoil section tend to offset scrubbing and interference drag for an unducted fan propulsor.

Figure 9:
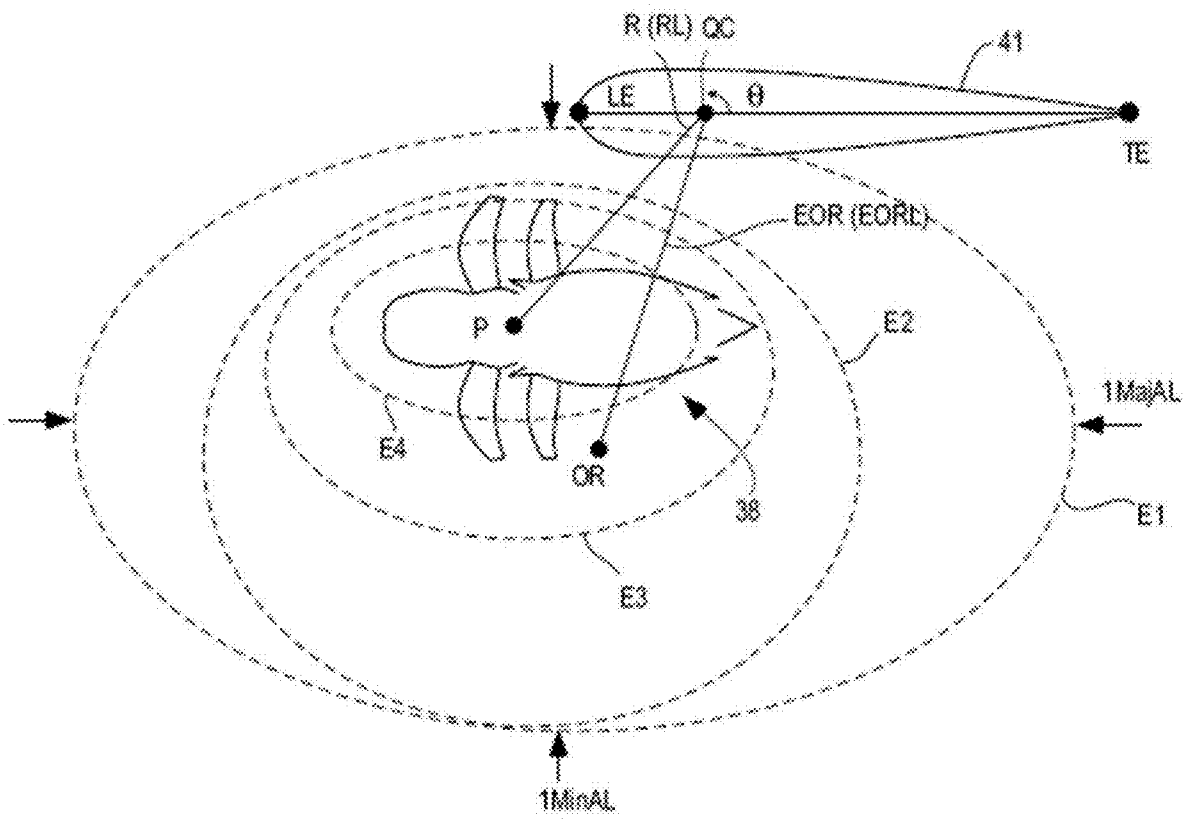
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
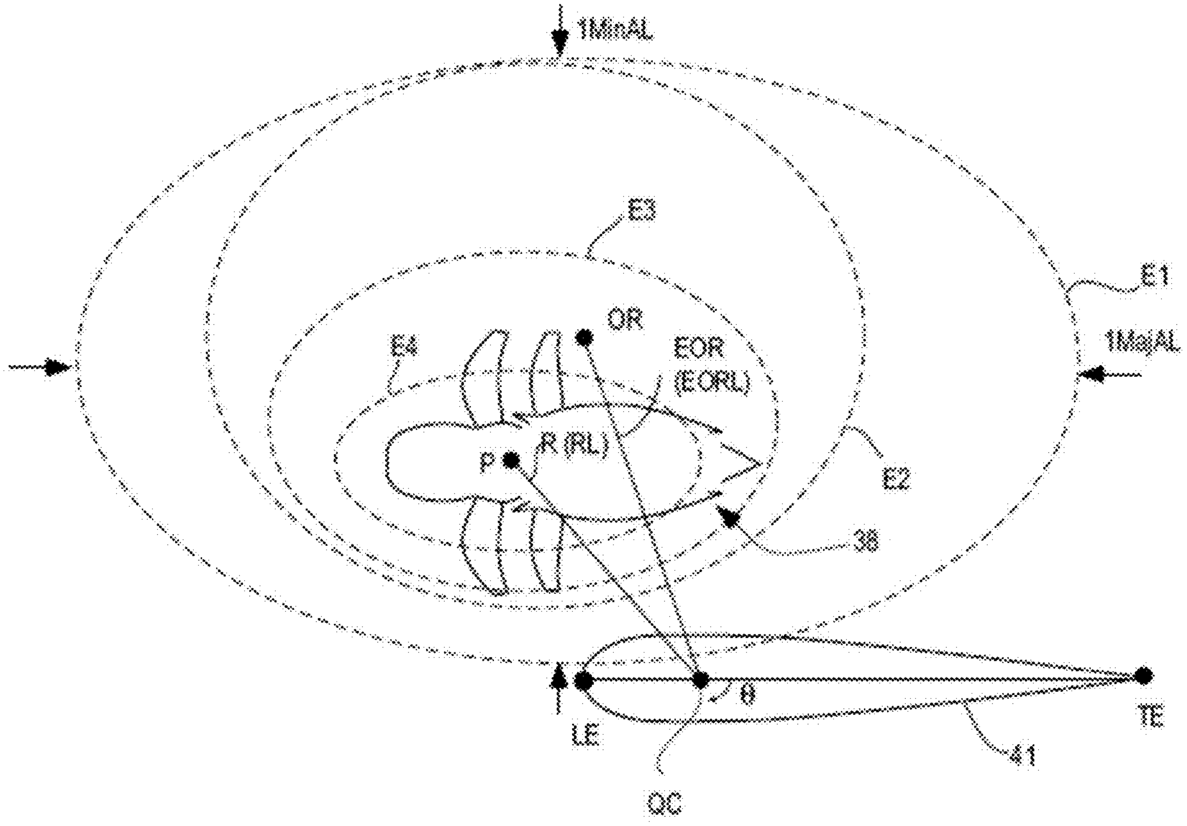
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse defining a region relative to QC where scrubbing and interference drag tends to offset. FIGS. 7-10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The location of OR is expressed relative to QC using the polar coordinate system frame of reference defined earlier. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to QC. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. The angle θ is measured relative to the chord line (as defined earlier) and positive in a clockwise direction when the propulsor is above the airfoil section (horizontal stabilizer, FIG. 10) as indicated in the drawings, respectively, by the direction of the arrow from the origin.

An angle θ for the ellipse origin positioning line EOR is measured from a datum that is the chord line to an ellipse positioning line EOR (e.g., in FIG. 9 the vector EOR is located by an angle that is between 180 and 270 degrees measured counterclockwise about origin QC). A positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 38 is located in a first ellipse E1 with a first ellipse origin defined by EORL/D of 0.938 and θ of 253.6°. The first ellipse E1 also has a first major axis length (1MajAL) and a first minor axis length (1MinAL), where 1MajAL/D is 2.8 and 1MinAL/D is 1.7. An unducted fan propulsor located within E1 tends to offset scrubbing and interference drag.

In a second embodiment, the point P of the unducted fan propulsor 38 is located in a second ellipse E2 having a second ellipse origin defined by EORL/D of 1.051 and 0 of 248.8°. The second ellipse E2 has a second major axis length (2MajAL) and a second minor axis length (2MinAL), where 2MajAL/D is 1.86 and 2MinAL/D is 1.56. An unducted fan propulsor located within E2 tends to offset scrubbing and interference drag.

In a third embodiment, the point P of the unducted fan propulsor 38 is located in a third ellipse E3 having a third ellipse origin defined by EORL/D of 0.870 and θ of 239.6°. The third ellipse E3 has a third major axis length (3MajAL) and a third minor axis length (3MinAL), where 3MajAL/D is 1.4 and 3MinAL/D is 0.9. An unducted fan propulsor located within E3 tends to offset scrubbing and interference drag.

In a fourth embodiment, the point P of the unducted fan propulsor 38 is located in a fourth ellipse E4 having a fourth ellipse origin defined by EORL/D of 0.763 and θ of 235.7°. The fourth ellipse E4 has a fourth major axis length (4MajAL) and a fourth minor axis length (4MinAL), where 4MajAL/D is 0.94 and 4MinAL/D is 0.44. An unducted fan propulsor located within E4 tends to offset scrubbing and interference drag. The location of the unducted fan propulsor system (i.e., point P) relative to the airfoil section may also be expressed in terms of the following expressions:

$$\frac{RL}{D}+\frac{\left(\sqrt{a*\left[b*\sin^2(\theta)-c*\cos^2(\theta)+d*\sin(\theta)*\cos(\theta)\right]}+e*\sin(\theta)+f*\cos(\theta)\right)}{g*\sin^2(\theta)+h*\cos^2(\theta)}>0 \text{ and}$$

$$\frac{RL}{D}+\frac{\left(-\sqrt{a*\left[b*\sin^2(\theta)-c*\cos^2(\theta)+d*\sin(\theta)*\cos(\theta)\right]}+e*\sin(\theta)+f*\cos(\theta)\right)}{g*\sin^2(\theta)+h*\cos^2(\theta)}<0$$

where 0.07<RL/D<1.98 and θ is between 187° and 340°, and where a, b, c, d, e, f, g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |
| g | 1.96 | 0.8649 | 0.49 | 0.2209 |
| h | 0.7225 | 0.6084 | 0.2025 | 0.0484 |

In a sixth embodiment, the point P of the unducted fan propulsor 38 can be defined by the above expression, but where 0.254<RL/D<1.86 and 0 is between 199° and 306°, and where a, b, c, d, e, f, g and h have the values set forth in the above table under the heading "Sixth Emb."

In a seventh embodiment, the point P of the unducted fan propulsor 38 can be defined by the above expression, but where 0.369<RL/D<1.43 and 0 is between 204° and 291°, and where a, b, c, d, e, f, g and h have the values set forth in the above table under the heading "Seventh Emb.".

In an eighth embodiment, the point P of the unducted fan propulsor 38 can be defined by the above expression, but where 0.477<RL/D<0.9455 and 0 is between 211° and 274°, And where a, b, c, d, e, f, g and h have the values set forth in the above table under the heading "Eighth Emb."

Figure 7:
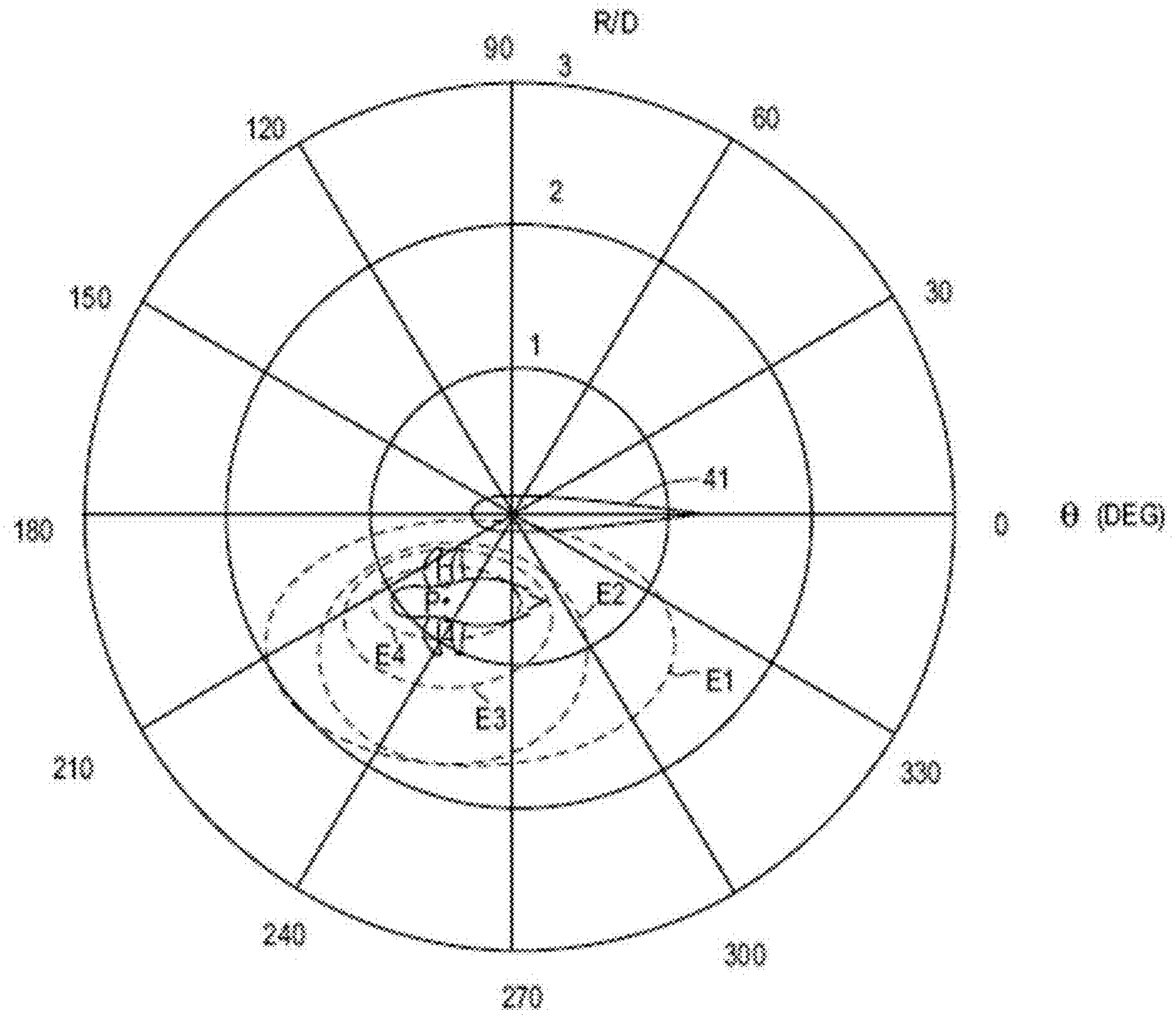
FIG. 7 comprises a schematic side elevation view similar to that of FIG. 4, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system.

Figure 11:
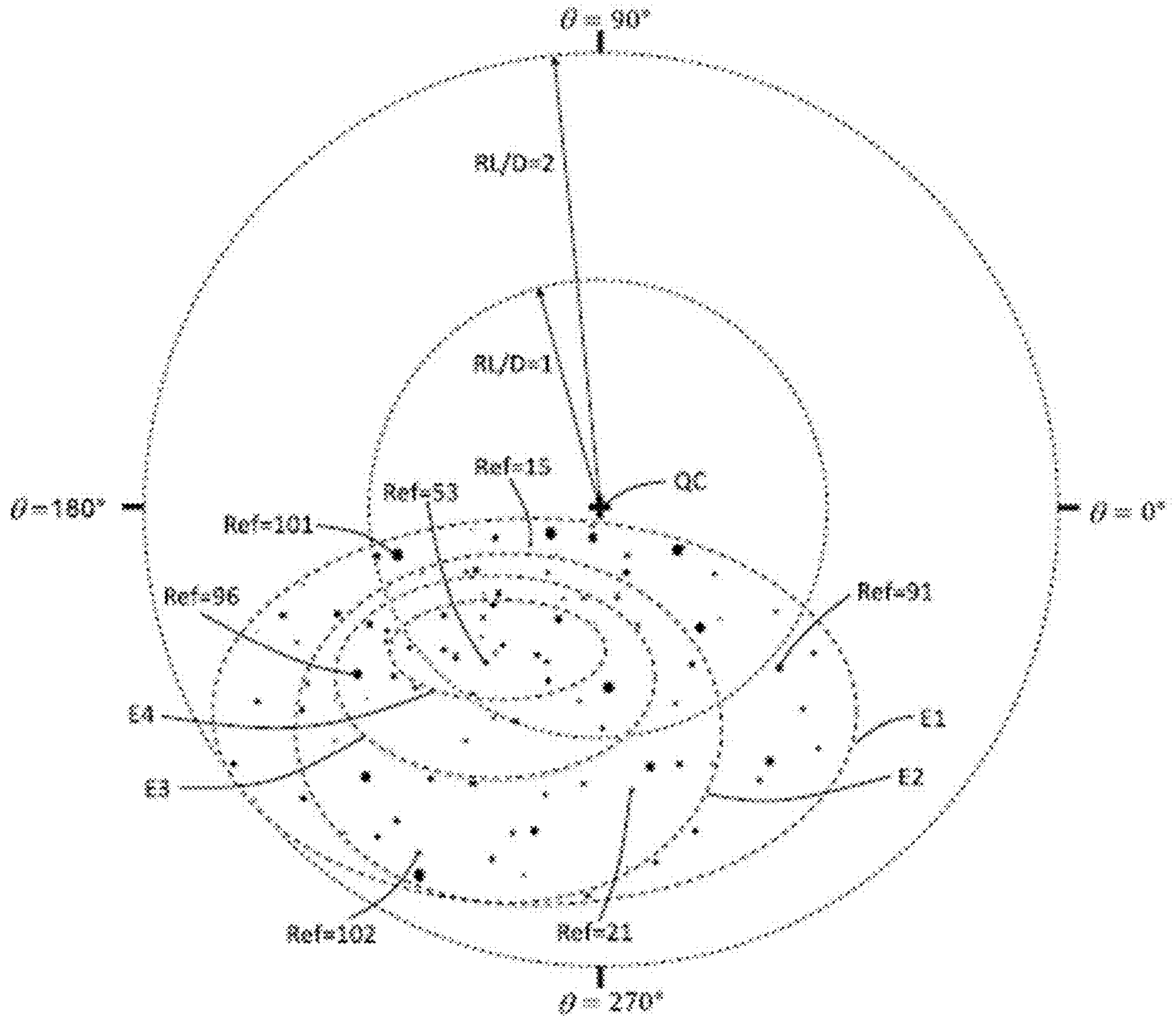
FIG. 11 comprises a schematic representation showing exemplary locations of a point P of one of the unducted fan propulsors, as defined herein, within the first ellipse, the second ellipse, the third ellipse, and the fourth ellipse.

TABLES 1 and 3-6 set forth examples of embodiments of invention. TABLE 1 shows each maximum outer diameter (D) and the location of point P of the unducted fan propulsor relative to the effective quarter chord point, QC, contemplated, where the point P is defined by RL and θ. The term "Ref" refers to the row in Table 1 for reference. The exemplary types of aircraft indicated with reference letters A through I in TABLE 1 are identified in TABLE 2. The point P of the unducted fan propulsor locations from TABLE 1 are shown in FIG. 11 for an under-wing mounted propulsor (for a propulsor mounted above a horizontal stabilizer the maximum outer diameter (D) and the point P of the unducted fan propulsor locations would be mirrored about the chord line of the airfoil section, which, for purposes of explanation, may be thought of as an axis passing through 0=0 deg and 0=180 deg in FIG. 11) relative to the first ellipse (E1), second ellipse (E2), third ellipse (E3), and the fourth ellipse (E4). The size of the points in FIG. 11 represent the relative size of D for the range provided in TABLE 1 (not to scale). The rotating blades diameter (D) may be between 2-50, 8-16, 10-15, 12-14, or 14-16 feet.

TABLE 1

P-location relative to the effective quarter chord point (QC)

| Ref. | Type of aircraft | RL (ft) | D (ft) | θ (deg) | RL/D |
|---|---|---|---|---|---|
| 1 | C I | 2.60 | 2.0 | 220.00 | 1.30 |
| 2 | F I | 1.07 | 2.0 | 189.00 | 0.54 |
| 3 | I | 3.13 | 2.0 | 199.73 | 1.57 |
| 4 | C F I | 2.18 | 3.0 | 319.20 | 0.73 |
| 5 | F I | 2.82 | 3.0 | 242.40 | 0.94 |
| 6 | C I | 1.47 | 4.0 | 293.60 | 0.37 |
| 7 | C I | 2.43 | 4.0 | 217.87 | 0.61 |
| 8 | I | 6.64 | 4.0 | 259.47 | 1.66 |
| 9 | C F I | 4.23 | 5.0 | 265.87 | 0.85 |
| 10 | C H I | 6.57 | 5.0 | 194.40 | 1.31 |
| 11 | F I | 2.03 | 5.0 | 250.93 | 0.41 |
| 12 | C F H I | 8.03 | 5.0 | 275.47 | 1.61 |
| 13 | C | 2.52 | 6.0 | 337.33 | 0.42 |
| 14 | H | 4.44 | 6.0 | 228.53 | 0.74 |
| 15 | C I | 1.88 | 6.0 | 208.27 | 0.31 |
| 16 | C F | 7.14 | 7.0 | 244.53 | 1.02 |
| 17 | B F H | 4.15 | 7.0 | 332.00 | 0.59 |
| 18 | B C I | 6.49 | 7.0 | 292.53 | 0.93 |
| 19 | C G | 8.05 | 8.0 | 216.80 | 1.01 |
| 20 | B F I | 11.89 | 8.0 | 256.27 | 1.49 |
| 21 | C G H | 10.08 | 8.0 | 277.60 | 1.26 |
| 22 | B C G I | 7.31 | 8.0 | 330.93 | 0.91 |
| 23 | C H | 9.97 | 8.0 | 294.67 | 1.25 |
| 24 | G I | 11.57 | 8.0 | 312.80 | 1.45 |
| 25 | B F I | 11.58 | 9.0 | 260.53 | 1.29 |
| 26 | C H | 6.06 | 9.0 | 224.27 | 0.67 |
| 27 | F G H | 3.06 | 9.0 | 233.87 | 0.34 |
| 28 | C I | 12.78 | 9.0 | 204.00 | 1.42 |
| 29 | B H | 10.47 | 10.0 | 210.40 | 1.05 |
| 30 | B I | 5.53 | 10.0 | 221.07 | 0.55 |
| 31 | A B C F G H | 7.00 | 10.0 | 253.07 | 0.70 |
| 32 | I | 2.47 | 10.0 | 306.40 | 0.25 |
| 33 | A C | 15.27 | 10.0 | 222.13 | 1.53 |
| 34 | G | 11.67 | 10.0 | 241.33 | 1.17 |
| 35 | A C F H | 17.13 | 10.0 | 243.47 | 1.71 |
| 36 | A B G I | 18.70 | 11.0 | 210.00 | 1.70 |
| 37 | G | 10.93 | 11.0 | 249.87 | 0.99 |
| 38 | A H | 4.33 | 11.0 | 285.07 | 0.39 |
| 39 | F I | 6.82 | 11.0 | 206.13 | 0.62 |
| 40 | A F H | 11.60 | 12.0 | 272.27 | 0.97 |
| 41 | A B F I | 10.64 | 12.0 | 227.47 | 0.89 |
| 42 | A H | 21.84 | 12.0 | 232.80 | 1.82 |
| 43 | A G | 8.56 | 12.0 | 236.00 | 0.71 |
| 44 | B F H | 0.78 | 12.0 | 263.50 | 0.07 |
| 45 | A F | 10.00 | 12.5 | 200.00 | 0.80 |
| 46 | A B G H I | 15.25 | 12.5 | 268.00 | 1.22 |
| 47 | B | 19.92 | 12.5 | 279.73 | 1.59 |
| 48 | A B F | 15.92 | 12.5 | 316.00 | 1.27 |
| 49 | A B | 6.25 | 12.5 | 270.13 | 0.50 |
| 50 | A F H | 18.42 | 12.5 | 211.47 | 1.47 |
| 51 | F G | 24.25 | 12.5 | 215.73 | 1.94 |
| 52 | A B H | 19.50 | 13.0 | 287.20 | 1.50 |
| 53 | H | 10.66 | 13.0 | 234.93 | 0.82 |
| 54 | B | 14.99 | 13.0 | 326.67 | 1.15 |
| 55 | I | 18.11 | 13.0 | 239.20 | 1.39 |
| 56 | A B F H | 23.49 | 13.0 | 225.33 | 1.81 |
| 57 | A F G H | 10.49 | 13.0 | 302.13 | 0.81 |
| 58 | B I | 3.38 | 13.0 | 231.73 | 0.26 |
| 59 | A B G | 13.95 | 13.0 | 212.53 | 1.07 |
| 60 | A B H | 10.14 | 13.0 | 255.20 | 0.78 |
| 61 | F | 10.80 | 13.5 | 215.00 | 0.80 |
| 62 | A H I | 19.35 | 13.5 | 198.67 | 1.43 |
| 63 | B F | 15.39 | 13.5 | 220.00 | 1.14 |
| 64 | A G H I | 7.83 | 13.5 | 207.20 | 0.58 |

TABLE 1-continued

P-location relative to the effective quarter chord point (QC)

| Ref. | Type of aircraft | RL (ft) | D (ft) | θ (deg) | RL/D |
|---|---|---|---|---|---|
| 65 | B H | 10.30 | 13.5 | 235.70 | 0.76 |
| 66 | A B | 23.49 | 13.5 | 237.07 | 1.74 |
| 67 | A H | 22.05 | 13.5 | 238.13 | 1.63 |
| 68 | F G | 13.08 | 13.5 | 192.00 | 0.97 |
| 69 | A B F | 6.03 | 13.5 | 195.47 | 0.45 |
| 70 | A F | 13.23 | 13.5 | 200.80 | 0.98 |
| 71 | B H | 16.89 | 14.0 | 201.87 | 1.21 |
| 72 | B I | 22.68 | 14.0 | 254.13 | 1.62 |
| 73 | A B F H | 24.17 | 14.0 | 269.07 | 1.73 |
| 74 | B E G | 19.69 | 14.0 | 301.07 | 1.41 |
| 75 | A | 12.60 | 14.0 | 223.20 | 0.90 |
| 76 | H I | 23.30 | 15.0 | 214.67 | 1.55 |
| 77 | A B E G H | 10.30 | 15.0 | 248.80 | 0.69 |
| 78 | A B E H | 17.90 | 15.0 | 288.27 | 1.19 |
| 79 | F G | 21.23 | 16.0 | 246.67 | 1.33 |
| 80 | A E | 8.64 | 16.0 | 290.40 | 0.54 |
| 81 | E G | 17.60 | 16.0 | 207.00 | 1.10 |
| 82 | A E | 25.20 | 18.0 | 230.00 | 1.40 |
| 83 | F | 19.80 | 18.0 | 225.00 | 1.10 |
| 84 | A G | 6.84 | 18.0 | 263.73 | 0.38 |
| 85 | A E | 35.64 | 18.0 | 221.00 | 1.98 |
| 86 | A E | 6.17 | 20.0 | 297.03 | 0.31 |
| 87 | F | 30.55 | 21.0 | 259.78 | 1.45 |
| 88 | A D | 10.99 | 22.0 | 252.33 | 0.50 |
| 89 | A E | 21.50 | 22.0 | 237.43 | 0.98 |
| 90 | D | 14.29 | 24.0 | 222.53 | 0.60 |
| 91 | D E | 25.75 | 24.0 | 319.38 | 1.07 |
| 92 | D E | 3.41 | 29.0 | 267.23 | 0.12 |
| 93 | D | 39.42 | 29.0 | 304.48 | 1.36 |
| 94 | E | 38.55 | 33.0 | 282.13 | 1.17 |
| 95 | D | 51.16 | 33.0 | 229.98 | 1.55 |
| 96 | D E | 44.23 | 35.0 | 215.08 | 1.26 |
| 97 | E | 24.18 | 35.0 | 311.93 | 0.69 |

TABLE 1-continued

P-location relative to the effective quarter chord point (QC)

| Ref. | Type of aircraft | RL (ft) | D (ft) | θ (deg) | RL/D |
|---|---|---|---|---|---|
| 98 | D | 8.53 | 40.0 | 207.63 | 0.21 |
| 99 | D | 31.45 | 40.0 | 274.68 | 0.79 |
| 100 | D | 18.19 | 45.0 | 334.28 | 0.40 |
| 101 | D | 42.32 | 48.0 | 192.73 | 0.88 |
| 102 | D | 90.00 | 50.0 | 244.88 | 1.80 |

TABLE 2

| Designator for TABLE 1 | Aircraft Type |
|---|---|
| A | Narrow Body, twin engine |
| B | Narrow Body, 4 engines |
| C | Narrow Body, distributed propulsors (>4 engines) |
| D | Wide Body, twin engine |
| E | Wide Body, 4 engines |
| F | Wide Body, distributed propulsors (>4 engines) |
| G | Regional Jet |
| H | Business Jet |
| I | UAV |

For Aircraft Type A, B, C and G having a Mach flight speed at cruise conditions of between 0.70 and 0.85 the fan diameter (D) is between 8 and 16 feet, or more preferably between 12 feet and 16 feet.

TABLES 3-6 provide exemplary embodiments for EORL and D for each of the first ellipse E1, second ellipse E2, third ellipse E3 and fourth ellipse E4, respectively, relative to the quarter chord point (QC).

TABLE 3

First Ellipse E1 Embodiments

| D (ft) | θ (deg) | EORL (ft) | 1MajAL (ft) | 1MinAL (ft) | EORL/D | 1MajAL/D | 1MinAL/D |
|---|---|---|---|---|---|---|---|
| 2 | 253.6 | 1.876 | 5.6 | 3.4 | 0.938 | 2.8 | 1.7 |
| 3 | 253.6 | 2.814 | 8.4 | 5.1 | 0.938 | 2.8 | 1.7 |
| 4 | 253.6 | 3.752 | 11.2 | 6.8 | 0.938 | 2.8 | 1.7 |
| 5 | 253.6 | 4.69 | 14 | 8.5 | 0.938 | 2.8 | 1.7 |
| 6 | 253.6 | 5.628 | 16.8 | 10.2 | 0.938 | 2.8 | 1.7 |
| 7 | 253.6 | 6.566 | 19.6 | 11.9 | 0.938 | 2.8 | 1.7 |
| 8 | 253.6 | 7.504 | 22.4 | 13.6 | 0.938 | 2.8 | 1.7 |
| 9 | 253.6 | 8.442 | 25.2 | 15.3 | 0.938 | 2.8 | 1.7 |
| 10 | 253.6 | 9.38 | 28 | 17 | 0.938 | 2.8 | 1.7 |
| 11 | 253.6 | 10.318 | 30.8 | 18.7 | 0.938 | 2.8 | 1.7 |
| 12 | 253.6 | 11.256 | 33.6 | 20.4 | 0.938 | 2.8 | 1.7 |
| 12.5 | 253.6 | 11.725 | 35 | 21.25 | 0.938 | 2.8 | 1.7 |
| 13 | 253.6 | 12.194 | 36.4 | 22.1 | 0.938 | 2.8 | 1.7 |
| 13.5 | 253.6 | 12.663 | 37.8 | 22.95 | 0.938 | 2.8 | 1.7 |
| 14 | 253.6 | 13.132 | 39.2 | 23.8 | 0.938 | 2.8 | 1.7 |
| 15 | 253.6 | 14.07 | 42 | 25.5 | 0.938 | 2.8 | 1.7 |
| 16 | 253.6 | 15.008 | 44.8 | 27.2 | 0.938 | 2.8 | 1.7 |
| 18 | 253.6 | 16.884 | 50.4 | 30.6 | 0.938 | 2.8 | 1.7 |
| 20 | 253.6 | 18.76 | 56 | 34 | 0.938 | 2.8 | 1.7 |
| 21 | 253.6 | 19.698 | 58.8 | 35.7 | 0.938 | 2.8 | 1.7 |
| 22 | 253.6 | 20.636 | 61.6 | 37.4 | 0.938 | 2.8 | 1.7 |
| 24 | 253.6 | 22.512 | 67.2 | 40.8 | 0.938 | 2.8 | 1.7 |
| 29 | 253.6 | 27.202 | 81.2 | 49.3 | 0.938 | 2.8 | 1.7 |
| 33 | 253.6 | 30.954 | 92.4 | 56.1 | 0.938 | 2.8 | 1.7 |
| 35 | 253.6 | 32.83 | 98 | 59.5 | 0.938 | 2.8 | 1.7 |
| 40 | 253.6 | 37.52 | 112 | 68 | 0.938 | 2.8 | 1.7 |
| 45 | 253.6 | 42.21 | 126 | 76.5 | 0.938 | 2.8 | 1.7 |
| 48 | 253.6 | 45.024 | 134.4 | 81.6 | 0.938 | 2.8 | 1.7 |
| 50 | 253.6 | 46.9 | 140 | 85 | 0.938 | 2.8 | 1.7 |

TABLE 4

| Second Ellipse E2 Embodiments | | | | | | | |
|---|---|---|---|---|---|---|---|
| D (ft) | θ (deg) | EORL (ft) | 2MajAL (ft) | 2MinAL (ft) | EORL/D | 2MajAL/D | 2MinAL/D |
| 2 | 248.8 | 2.102 | 3.72 | 3.12 | 1.051 | 1.86 | 1.56 |
| 3 | 248.8 | 3.153 | 5.58 | 4.68 | 1.051 | 1.86 | 1.56 |
| 4 | 248.8 | 4.204 | 7.44 | 6.24 | 1.051 | 1.86 | 1.56 |
| 5 | 248.8 | 5.255 | 9.3 | 7.8 | 1.051 | 1.86 | 1.56 |
| 6 | 248.8 | 6.306 | 11.16 | 9.36 | 1.051 | 1.86 | 1.56 |
| 7 | 248.8 | 7.357 | 13.02 | 10.92 | 1.051 | 1.86 | 1.56 |
| 8 | 248.8 | 8.408 | 14.88 | 12.48 | 1.051 | 1.86 | 1.56 |
| 9 | 248.8 | 9.459 | 16.74 | 14.04 | 1.051 | 1.86 | 1.56 |
| 10 | 248.8 | 10.51 | 18.6 | 15.6 | 1.051 | 1.86 | 1.56 |
| 11 | 248.8 | 11.561 | 20.46 | 17.16 | 1.051 | 1.86 | 1.56 |
| 12 | 248.8 | 12.612 | 22.32 | 18.72 | 1.051 | 1.86 | 1.56 |
| 12.5 | 248.8 | 13.1375 | 23.25 | 19.5 | 1.051 | 1.86 | 1.56 |
| 13 | 248.8 | 13.663 | 24.18 | 20.28 | 1.051 | 1.86 | 1.56 |
| 13.5 | 248.8 | 14.1885 | 25.11 | 21.06 | 1.051 | 1.86 | 1.56 |
| 14 | 248.8 | 14.714 | 26.04 | 21.84 | 1.051 | 1.86 | 1.56 |
| 15 | 248.8 | 15.765 | 27.9 | 23.4 | 1.051 | 1.86 | 1.56 |
| 16 | 248.8 | 16.816 | 29.76 | 24.96 | 1.051 | 1.86 | 1.56 |
| 18 | 248.8 | 18.918 | 33.48 | 28.08 | 1.051 | 1.86 | 1.56 |
| 20 | 248.8 | 21.02 | 37.2 | 31.2 | 1.051 | 1.86 | 1.56 |
| 21 | 248.8 | 22.071 | 39.06 | 32.76 | 1.051 | 1.86 | 1.56 |
| 22 | 248.8 | 23.122 | 40.92 | 34.32 | 1.051 | 1.86 | 1.56 |
| 24 | 248.8 | 25.224 | 44.64 | 37.44 | 1.051 | 1.86 | 1.56 |
| 29 | 248.8 | 30.479 | 53.94 | 45.24 | 1.051 | 1.86 | 1.56 |
| 33 | 248.8 | 34.683 | 61.38 | 51.48 | 1.051 | 1.86 | 1.56 |
| 35 | 248.8 | 36.785 | 65.1 | 54.6 | 1.051 | 1.86 | 1.56 |
| 40 | 248.8 | 42.04 | 74.4 | 62.4 | 1.051 | 1.86 | 1.56 |
| 45 | 248.8 | 47.295 | 83.7 | 70.2 | 1.051 | 1.86 | 1.56 |
| 48 | 248.8 | 50.448 | 89.28 | 74.88 | 1.051 | 1.86 | 1.56 |
| 50 | 248.8 | 52.55 | 93 | 78 | 1.051 | 1.86 | 1.56 |

TABLE 5

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 2 | 239.6 | 1.74 | 2.8 | 1.8 | 0.87 | 1.4 | 0.9 |
| 3 | 239.6 | 2.61 | 4.2 | 2.7 | 0.87 | 1.4 | 0.9 |
| 4 | 239.6 | 3.48 | 5.6 | 3.6 | 0.87 | 1.4 | 0.9 |
| 5 | 239.6 | 4.35 | 7 | 4.5 | 0.87 | 1.4 | 0.9 |
| 6 | 239.6 | 5.22 | 8.4 | 5.4 | 0.87 | 1.4 | 0.9 |
| 7 | 239.6 | 6.09 | 9.8 | 6.3 | 0.87 | 1.4 | 0.9 |
| 8 | 239.6 | 6.96 | 11.2 | 7.2 | 0.87 | 1.4 | 0.9 |
| 9 | 239.6 | 7.83 | 12.6 | 8.1 | 0.87 | 1.4 | 0.9 |
| 10 | 239.6 | 8.7 | 14 | 9 | 0.87 | 1.4 | 0.9 |
| 11 | 239.6 | 9.57 | 15.4 | 9.9 | 0.87 | 1.4 | 0.9 |
| 12 | 239.6 | 10.44 | 16.8 | 10.8 | 0.87 | 1.4 | 0.9 |
| 12.5 | 239.6 | 10.875 | 17.5 | 11.25 | 0.87 | 1.4 | 0.9 |
| 13 | 239.6 | 11.31 | 18.2 | 11.7 | 0.87 | 1.4 | 0.9 |
| 13.5 | 239.6 | 11.745 | 18.9 | 12.15 | 0.87 | 1.4 | 0.9 |
| 14 | 239.6 | 12.18 | 19.6 | 12.6 | 0.87 | 1.4 | 0.9 |
| 15 | 239.6 | 13.05 | 21 | 13.5 | 0.87 | 1.4 | 0.9 |
| 16 | 239.6 | 13.92 | 22.4 | 14.4 | 0.87 | 1.4 | 0.9 |
| 18 | 239.6 | 15.66 | 25.2 | 16.2 | 0.87 | 1.4 | 0.9 |
| 20 | 239.6 | 17.4 | 28 | 18 | 0.87 | 1.4 | 0.9 |
| 21 | 239.6 | 18.27 | 29.4 | 18.9 | 0.87 | 1.4 | 0.9 |
| 22 | 239.6 | 19.14 | 30.8 | 19.8 | 0.87 | 1.4 | 0.9 |
| 24 | 239.6 | 20.88 | 33.6 | 21.6 | 0.87 | 1.4 | 0.9 |
| 29 | 239.6 | 25.23 | 40.6 | 26.1 | 0.87 | 1.4 | 0.9 |
| 33 | 239.6 | 28.71 | 46.2 | 29.7 | 0.87 | 1.4 | 0.9 |
| 35 | 239.6 | 30.45 | 49 | 31.5 | 0.87 | 1.4 | 0.9 |
| 40 | 239.6 | 34.8 | 56 | 36 | 0.87 | 1.4 | 0.9 |
| 45 | 239.6 | 39.15 | 63 | 40.5 | 0.87 | 1.4 | 0.9 |
| 48 | 239.6 | 41.76 | 67.2 | 43.2 | 0.87 | 1.4 | 0.9 |
| 50 | 239.6 | 43.5 | 70 | 45 | 0.87 | 1.4 | 0.9 |

TABLE 6

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 2 | 235.7 | 1.526 | 1.88 | 0.88 | 0.763 | 0.94 | 0.44 |
| 3 | 235.7 | 2.289 | 2.82 | 1.32 | 0.763 | 0.94 | 0.44 |
| 4 | 235.7 | 3.052 | 3.76 | 1.76 | 0.763 | 0.94 | 0.44 |
| 5 | 235.7 | 3.815 | 4.7 | 2.2 | 0.763 | 0.94 | 0.44 |
| 6 | 235.7 | 4.578 | 5.64 | 2.64 | 0.763 | 0.94 | 0.44 |
| 7 | 235.7 | 5.341 | 6.58 | 3.08 | 0.763 | 0.94 | 0.44 |
| 8 | 235.7 | 6.104 | 7.52 | 3.52 | 0.763 | 0.94 | 0.44 |
| 9 | 235.7 | 6.867 | 8.46 | 3.96 | 0.763 | 0.94 | 0.44 |
| 10 | 235.7 | 7.63 | 9.4 | 4.4 | 0.763 | 0.94 | 0.44 |
| 11 | 235.7 | 8.393 | 10.34 | 4.84 | 0.763 | 0.94 | 0.44 |
| 12 | 235.7 | 9.156 | 11.28 | 5.28 | 0.763 | 0.94 | 0.44 |
| 12.5 | 235.7 | 9.5375 | 11.75 | 5.5 | 0.763 | 0.94 | 0.44 |
| 13 | 235.7 | 9.919 | 12.22 | 5.72 | 0.763 | 0.94 | 0.44 |
| 13.5 | 235.7 | 10.3005 | 12.69 | 5.94 | 0.763 | 0.94 | 0.44 |
| 14 | 235.7 | 10.682 | 13.16 | 6.16 | 0.763 | 0.94 | 0.44 |
| 15 | 235.7 | 11.445 | 14.1 | 6.6 | 0.763 | 0.94 | 0.44 |
| 16 | 235.7 | 12.208 | 15.04 | 7.04 | 0.763 | 0.94 | 0.44 |
| 18 | 235.7 | 13.734 | 16.92 | 7.92 | 0.763 | 0.94 | 0.44 |
| 20 | 235.7 | 15.26 | 18.8 | 8.8 | 0.763 | 0.94 | 0.44 |
| 21 | 235.7 | 16.023 | 19.74 | 9.24 | 0.763 | 0.94 | 0.44 |
| 22 | 235.7 | 16.786 | 20.68 | 9.68 | 0.763 | 0.94 | 0.44 |
| 24 | 235.7 | 18.312 | 22.56 | 10.56 | 0.763 | 0.94 | 0.44 |
| 29 | 235.7 | 22.127 | 27.26 | 12.76 | 0.763 | 0.94 | 0.44 |
| 33 | 235.7 | 25.179 | 31.02 | 14.52 | 0.763 | 0.94 | 0.44 |
| 35 | 235.7 | 26.705 | 32.9 | 15.4 | 0.763 | 0.94 | 0.44 |
| 40 | 235.7 | 30.52 | 37.6 | 17.6 | 0.763 | 0.94 | 0.44 |
| 45 | 235.7 | 34.335 | 42.3 | 19.8 | 0.763 | 0.94 | 0.44 |
| 48 | 235.7 | 36.624 | 45.12 | 21.12 | 0.763 | 0.94 | 0.44 |
| 50 | 235.7 | 38.15 | 47 | 22 | 0.763 | 0.94 | 0.44 |

Figure 8:
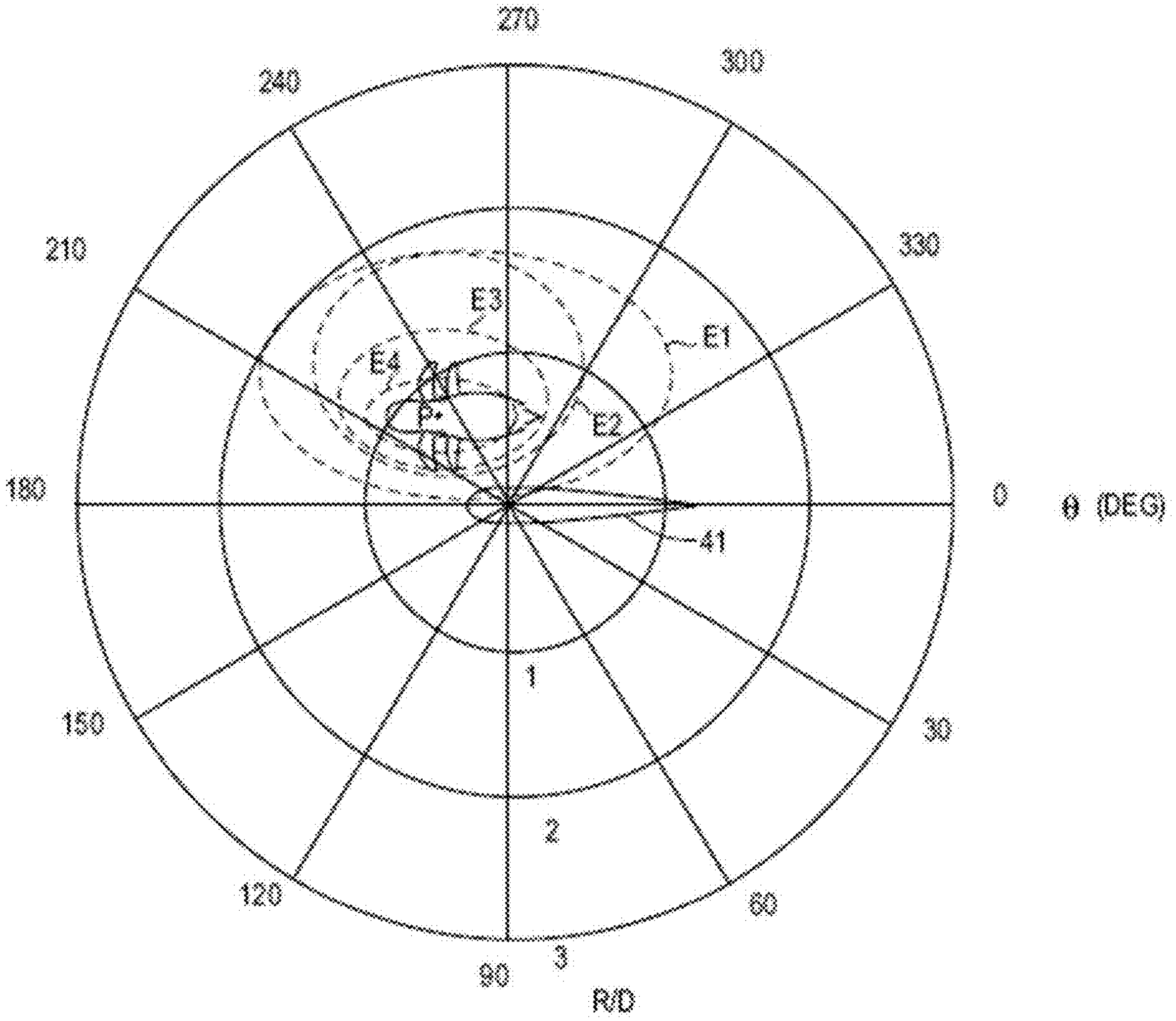
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.

Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section (again, for purposes of explanation, this chord line may be thought of as an axis passing through 0=0 deg and 0=180 deg in FIG. 11) for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

According to the foregoing examples or embodiments, the unducted fan propulsor 38, incorporating the vane assembly described herein, can be incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9. A propulsor that is part of an airplane that operates at a high cruise flight Mach number (e.g., greater than 0.7) encounters velocities near the surfaces of the rotor, vanes, and nacelle that approach or exceed the speed of sound, or Mach 1.0. In general, friction drag increases roughly in proportion to the square of the air velocity. However, as the Mach number increases, a significant contributor to the increase in drag can come from wave drag. Wave drag is a drag resulting from shock waves that form as the flow of air near a surface becomes supersonic (e.g., Mach>1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on the rotor, vanes, and nacelle.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, po is ambient air density, $V_o$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there may be a particularly beneficial range of a dimensionless cruise fan net thrust parameter normalized by ambient density, cruise flight speed squared, and fan stream tube annular area at fan inlet defined by the following expression:

$$0.15 > \frac{F_{net}}{\rho_0 A_{an} V_0^2} > 0.06$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors wing. While the mounting configuration can be fixed, it is contemplated that the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or any other operating condition.

Further improvements can be made with respect to the relative axial alignment of sections of an unducted fan engine. The unducted fan engine's lack of an inlet fairing or nacelle surrounding the unducted fan to align an inlet flow with a fan face of the unducted fan presents challenges for both acoustic and performance reasons. Implementations described herein, which include a pitch down arrangement of a fan face of an unducted fan relative to an engine centerline of the unducted fan engine, address these challenges by enabling the unducted fan to encounter the inlet flow at an upwash angle (as may be caused by an airfoil shape of a wing to which the engine is attached). Additionally, implementations described herein include an unducted fan engine that includes an exhaust section of the engine that is realigned with a freestream airflow to avoid blowing hot gas onto the wing and that aligns the engine thrust with a centerline axis of the aircraft.

These further improvements additionally may include a canting and non-axisymmetric configuration of a working gas flowpath outlet and a third stream flowpath outlet, as well as a pylon design with an integrated outlet guide vane. Additionally, the engine may include a plurality of outlet guide vanes with one or more of the outlet guide vanes integrated with the pylon in such a way as to jointly work to de-swirl the fan exhaust while the fan exhaust passes over the pylon and optimally prepare the air flow as the air flow approaches the wing.

As disclosed, the engine configurations enable improvements in aerodynamics, acoustics, and the installed performance, and in particular with an unducted fan engine concept. The embodiments presented herein additionally enable configurations of the engine that enable improved fuel burn, power efficiency, and less weight of the engine. Additionally, the features of the positioning of the propulsor relative to the aircraft wing by defining a P location between external OGV or IGV and a forward or aft rotating array of fan blades, respectively, and/or defining the distance from the effective QC to P, as described above, results in synergistic effects to improve aerodynamic performance of the aircraft, improve thrust without increasing the required engine power, reduce drag, and/or reduce noise during flight of the aircraft, when integrated with these additional design features. These additional design features include one or more of a fan face of the unducted fan that is pitched downwardly to address the inlet flow encountered at an upwash angle, an unducted fan engine with an exhaust section that is realigned with a freestream airflow to avoid blowing hot gas onto the wing and that aligns the engine thrust with a centerline axis of the aircraft, a canting and non-axisymmetric configuration of a working gas flowpath outlet and a third stream flowpath outlet, a pylon design with an integrated outlet guide vane, and/or outlet guide vanes with one or more of the outlet guide vanes integrated with the pylon in such a way as to jointly work to de-swirl the fan exhaust while the fan exhaust passes over the pylon. These synergistic effects may be additive in a nonlinear manner, such that improvements are greater than would be expected by merely adding up the effects of each feature separately.

Figure 12:
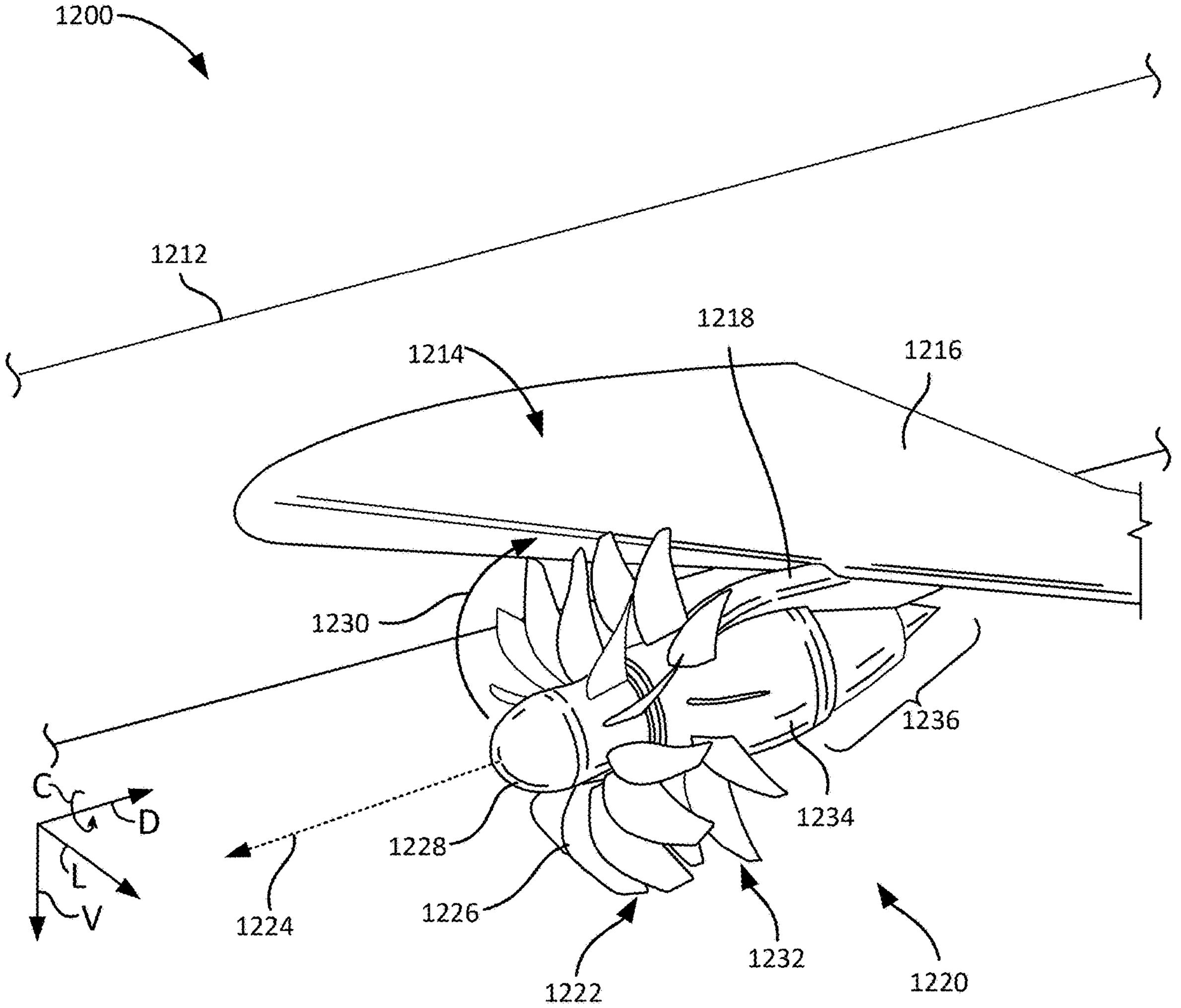
FIG. 12 is a perspective view of a portion of an aircraft with an exemplary unducted fan engine according to various embodiments of the present subject matter.

Referring again to the drawings, wherein identical numerals indicate the same elements throughout the figures, FIG. 12 is a perspective view of a portion of an aircraft 1200. The aircraft 1200 includes a fuselage 1212, a wing 1214 (with an upper surface 1216), a pylon 1218, and an engine 1220, and defines a vertical direction V and a downstream direction D. In this example, downstream direction D is a direction of airflow from a front or forward end (e.g., to the left in FIG. 12) of aircraft 1200 to a rear or aft end (e.g., to the right in FIG. 12) of aircraft 1200. Engine 1220 of the aircraft 1200 includes a fan 1222 having a plurality of fan blades 1226, a spinner or nose 1228, stationary guide vanes 1232, a casing 1234, and an exhaust section 1236. Further, fan 1222 of engine 1220 defines a centerline axis 1224 and a direction of rotation 1230. Referring back to FIG. 1, the aircraft 1200 may correspond to the aircraft 10, the fuselage 1212 may correspond to the fuselage 12, the wing 1214 may correspond to the wing 18, the pylon 1218 may correspond to the pylon 39, the fan blades 1226 may correspond to the array of blades 34, the stationary guide vanes 1232 may correspond to the array of vanes 42, and the engine 1220 may correspond to the unducted fan propulsor 38 of FIG. 1.

Figure 13:
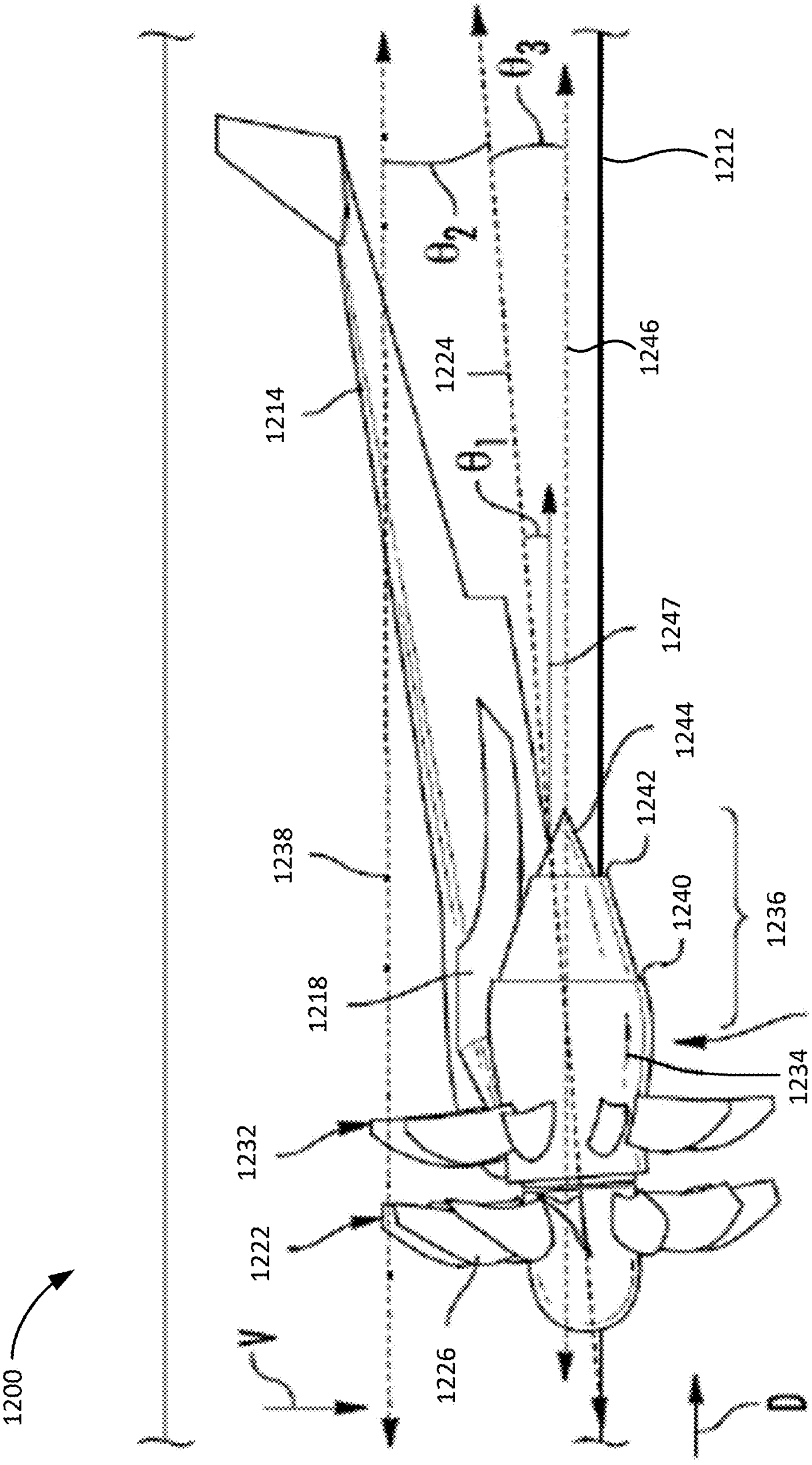
FIG. 13 is a side view of an aircraft with an exemplary unducted fan engine according to various embodiments of the present subject matter.

Referring also to FIG. 13, a side view of aircraft 1200 is provided. As shown in FIG. 13, aircraft 1200 further defines a fuselage centerline 1238, and engine 1220 further includes a bypass outlet nozzle 1240, an outlet nozzle 1242, and a core plug 1244, and defines an outlet axis 1246, an exhaust stream 1247, a first angle $\theta_1$, a second angle $\theta_2$, and a third angle $\theta_3$. FIGS. 12 and 13 are discussed together below.

Fuselage 1212 is a main body or vessel section of aircraft 1200 that contains cargo, passengers, a crew, or a combination thereof during the operation of the aircraft 1200. Wing 1214 is an aerodynamic portion of aircraft 1200 that provides lift for aircraft 1200. Wing 1214 is mounted to and extends from fuselage 1212. Upper surface 1216 is a surface extending along a top-side of wing 1214 relative to vertical direction V (shown as pointing downwards in FIG. 12). The wing 1214 may define an airfoil shape, and upper surface 1216 of the wing 1214 may correspond to the suction side of the airfoil. Such a configuration may cause an upwash of the airflow approaching the wing 1214 during flight, as will be described further below.

Engine 1220 is mounted to the wing 1214 using the pylon 1218. The pylon 1218 is a mount extending between wing 1214 and engine 1220. Pylon 1218 connects engine 1220 to wing 1214. In other embodiments, engine 1220 may be mounted to the wing 1214 in any other suitable manner, such as, for example, being at least partial integrated into the wing 1214 in a blended wing configuration.

Engine 1220 is a machine or thrust producing system for providing thrust for aircraft 1200. In this example, engine 1220 is configured as an unducted single fan (e.g., fan 1222).

More specifically, in the embodiment shown, engine 1220 includes a single row of unducted rotor blades (e.g., fan blades 1226, as described below). Engine 1220, equipped with fan 1222, serves as the source of thrust for aircraft 1200. Fan 1222 is a rotatable propeller configured to rotate about centerline axis 1224. Fan 1222 is mounted at an upstream end of engine 1220 and is configured to rotate relative to casing 1234. As depicted in FIG. 13, an upstream direction is to the left. Centerline axis 1224 is an axial centerline extending through a centerpoint of fan 1222 and about which fan 1222 rotates.

Fan 1222 includes the fan blades 1226. Fan blades 1226 are airfoil vanes configured to rotate with fan 1222 about centerline axis 1224. In this example, fan blades 1226 are unducted rotor blades. Alternatively stated, fan blades 1226 form a stage of unducted rotor blades. Fan blades 1226 are attached to nose 1228 of fan 1222 and extend outward along a radial direction. Nose 1228 is a spinner of engine 1220. Direction of rotation 1230 is a direction of rotation which fan 1222 including fan blades 1226 rotates.

Moreover, for the exemplary embodiment depicted, engine 1220 includes outlet guide vanes 1232. Guide vanes 1232 are non-rotating airfoils or stator vanes that guide or redirect a direction of airflow across guide vanes 1232. Guide vanes 1232 define a stage of outlet guide vanes that are located downstream of fan blades 1226 (e.g., the stage of unducted rotor blades). In one example, guide vanes 1232 can be fixed stator vanes. Alternatively, guide vanes 1232 may be adjustable or variable pith guide vanes. Guide vanes 1232 are affixed to a section of casing 1234. In one example, guide vanes 1232 can be functionally coupled to pitch change mechanisms located inside of casing 1234. Casing 1234 is a housing or exterior wall of engine 1220. Casing 1234 is disposed about an exterior of engine 1220 to form an external barrier or wall of engine 1220. Exhaust section 1236 of engine 1220 corresponds to a downstream portion of engine 1220 that is configured to expel an exhaust stream from engine 1220 for propulsion of aircraft 1200.

Fuselage centerline 1238 is a centerline axis passing through a center of fuselage 1212 and extending in the downstream direction D. For most of its length, the fuselage centerline 1238 runs through an axial centerpoint of fuselage 1212, excluding the nose portion of the fuselage 1212 and the empennage portion of the aircraft 1200.

Bypass outlet nozzle 1240 and outlet nozzle 1242 are outlet nozzles for airstreams passing through an interior of a portion of engine 1220. Core plug 1244 is a cap or a fluid guide insert. In this example, core plug 1244 is a conical piece of solid or hollow material for directing airflow out of outlet nozzle 1242. In other examples, core plug 1244 can include a non-conical shape. Core plug 1244 is disposed at a downstream most end (e.g., right most end in FIGS. 12 through 14) of exhaust section 1236. The outlet axis 1246 runs through the axial center of the exhaust section 1236 and extends through the tip of the core plug 1244. Outlet axis 1246 is defined in part by outlet nozzle 1242. In this example, outlet axis 1246 is parallel to fuselage centerline 1238 (see e.g., FIG. 13).

Exhaust stream 1247 is flow of air expelled from outlet nozzle 1242. In this example, a direction of exhaust stream 1247 is parallel to downstream direction D and perpendicular to vertical direction V. Additionally, the exhaust stream 1247 represents the average direction of airflow moving in the downstream direction D from the exhaust section 1236, as schematically illustrated in the Figures (e.g., FIG. 14).

As shown in FIG. 13, first angle $\theta_1$ is defined by the relative angle between centerline axis 1224 and exhaust stream 1247, second angle $\theta_2$ is defined by the relative angle between centerline axis 1224 and fuselage centerline 1238, and third angle $\theta_3$ is defined by the relative angle between centerline axis 1224 and outlet axis 1246 of exhaust section 1236. With respect to first angle $\theta_1$ for example, the mean direction of flow of exhaust stream 1247 defines first angle $\theta_1$ with centerline axis 1224 greater than zero and less than about 10 degrees (such as less than about 7 degrees), such that centerline axis 1224 is oriented more downwardly along vertical direction V relative to the mean direction of flow of exhaust stream 1247. In certain exemplary embodiments, third angle $\theta_3$ is greater than zero (such as equal to or greater than 5°, such as equal to or greater than 10°, such as equal to or greater than 15°, such as equal to 20°). In certain exemplary embodiments, third angle $\theta_3$ may also be referred to as a nozzle angle $\theta_3$.

Figure 14:
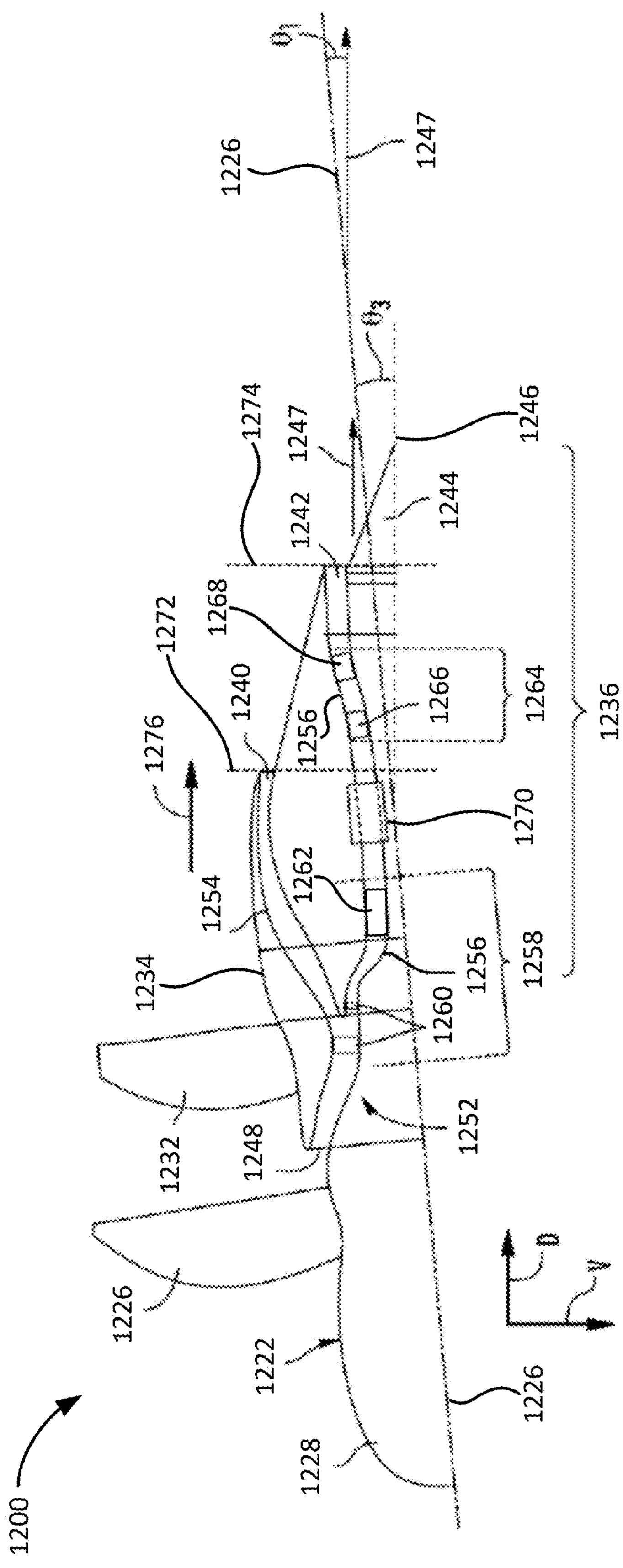
FIG. 14 is a partially transparent side view of the unducted fan engine and shows a flowpath passing through the unducted fan engine.

Referring now also to FIG. 14, illustrates a partially transparent side view of a top half of engine 1220 with fan 1222 and a turbomachine 1252. Engine 1220 defines a fan stream 1276 extending from the fan blades 1226 and over the turbomachine 1252. As shown in FIG. 14, fan stream 1276 may be parallel to outlet axis 1246 of exhaust section 1236, as depicted by the arrowhead downstream from fan 1222.

Turbomachine 1252 is a gas turbine engine. Turbomachine 1252 defines an inlet 1248 and includes exhaust section 1236. The exhaust section 1236 corresponds to a portion of engine 1220 where propulsive airflow is ejected from the turbomachine of engine 1220. Exhaust section 1236 is disposed downstream from fan 1222. In this example, turbomachine 1252 defines centerline axis 1224, along which fan 1222 is axially oriented. Turbomachine 1252 defines a bypass flowpath 1254 and a working gas flowpath 1256. Turbomachine 1252 is disposed downstream of fan 1222 in the embodiment depicted. In this example, turbomachine 1252 is coupled to fan 1222 via a shaft assembly (not shown FIG. 14 for clarity purposes) such that turbomachine 1252 is configured to drive rotation of fan 1222. Turbomachine 1252 receives air through inlet 1248 and produces rotational energy for fan 1222 and thrust by compressing the air, igniting a mix of the air and fuel to produce a high-pressure flow of combustion gasses, and expanding the combustion gasses, as will be described below.

Inlet 1248 may correspond to an annular opening. In other embodiments, inlet 1248 may include a non-annular opening. Inlet 1248 is disposed between fan blades 1226 and guide vanes 1232 along an axial direction of engine 1220. Air from the inlet 1248 is provided to the working gas flowpath and through turbomachine 1252. More specifically, turbomachine 1252 generally includes a compressor section 1258, a combustion section (including, e.g., combustor 1270), and a turbine section 1264 in serial flow order. Compressor section 1258, combustor 1270, and turbine section 1264 together define at least in part the working gas flowpath 1256. In the embodiment depicted, compressor section 1258 generally includes a low-pressure compressor (with LPC blades 1260) and a high-pressure compressor (with HPC blades 1262), and turbine section 1264 generally including a high-pressure turbine (with HPT blades 1266) and a low-pressure turbine (with LPT blades 1268). Air from inlet 1248 is progressively compressed through the low- and high-pressure compressors across LPC blades 1260 and across HPC blades 1262, respectively. The compressed air is then mixed with fuel and burned in combustor 1270 to generate combustion gasses. The combustion gasses are then expanded through the high and low-pressure turbines across HPT blades 1266 and across LPT blades 1268, respectively extracting work. In certain exemplary embodiments, the high-pressure turbine may be coupled to the high-pressure compressor through a shaft or spool (not shown) such that rotation of the high-pressure turbine drives the high-pressure compressor. Similarly, in certain exemplary embodiments, the low-pressure turbine may be coupled to the low-pressure compressor through a shaft or spool (not shown) such that rotation of the low-pressure turbine drives the low-pressure compressor. The low-pressure turbine may further be configured to drive fan 1222.

Airflow from the turbine section is exhausted through outlet nozzle 1242 of exhaust section 1236 as exhaust stream 1247. Outlet nozzle 1242 is an outlet nozzle for working gas flowpath 1256. Turbomachine 1252 further includes a core plug 1244. The outlet nozzle 1242 defines a nozzle outlet plane 1274. Nozzle outlet plane 1274 is a plane extending along and defined by a face of bypass outlet nozzle 1240. For example, in implementations in which outlet nozzle 1242 includes an annular shape, an orientation of nozzle outlet plane 1274 is defined by a plane that includes an outer circumference of outlet nozzle 1242. Nozzle outlet plane 1274 extends along the face of outlet nozzle 1242. Bypass outlet nozzle plane 1272 defines an exit plane of bypass outlet nozzle 1240 and nozzle outlet plane 1274 defines an exit plane of outlet nozzle 1242. In this example, thrust is produced by fan blades 1226, by bypass outlet nozzle 1240, and by outlet nozzle 1242. In one example, engine 1220 is configured to propel aircraft 1200 (and operate) at a speed of greater than Mach 0.74 (570 miles per hour) and less than Mach 0.90 (690 miles per hour). In another example, engine 1220 can be configured to propel aircraft 1200 (and operate) at a speed of Mach 0.79 (610 miles per hour).

Continuing with FIG. 14, as noted above, the turbomachine 1252 further defines bypass flowpath 1254 extending through a portion of turbomachine 1252. Bypass flowpath 1254 extends through a portion of turbomachine 1252 that is disposed outward along a radial direction from working gas flowpath 1256. Bypass outlet nozzle 1240 of bypass flowpath 1254 is an outlet nozzle for bypass flowpath 1254. Bypass flowpath 1254 may correspond to a third stream flowpath. Bypass flowpath 1254 diverts a flow of air away from turbomachine 1252 and delivers the air out of bypass outlet nozzle 1240 to provide additional thrust for aircraft 1200.

More specifically, for the embodiment depicted, bypass flowpath 1254 extends from working gas flowpath 1256 to fan stream 1276. More specifically, still, for the embodiment depicted, bypass flowpath 1254 extends from a low-pressure compressor of compressor section 1258, at a location downstream from LPC blade (e.g., a first stage of rotor blades of the low-pressure compressor), to fan stream 1276. In such a manner, bypass flowpath 1254 may receive compressed air from working gas flowpath 1256 and the airflow from bypass flowpath 1254 through bypass outlet nozzle 1240 may contribute to an overall thrust production of engine 1220. While not shown in this example, engine 1220 may further include one or more heat exchangers located in thermal communication with bypass flowpath 1254 to, for example, add energy to the airflow through bypass flowpath 54 and provide cooling to engine 1220.

Bypass outlet nozzle 1240 may be an annular outlet and is disposed in exhaust section 1236, downstream from guide vanes 1232 and upstream from outlet nozzle 1242. Bypass outlet nozzle 1240 defines a bypass outlet nozzle plane 1272. More specifically, bypass outlet nozzle plane 1272 is a plane extending along and defined by a face of bypass outlet nozzle 1240 (e.g., an aft-most edge of bypass outlet nozzle 1240). In this example, with bypass outlet nozzle 1240 including an annular shape, an orientation of bypass outlet nozzle plane 1272 is defined by a plane along which an outer circumference of bypass outlet nozzle 1240 lies. Bypass outlet nozzle plane 1272 extends along the face of bypass outlet nozzle 1240. In other examples, bypass outlet nozzle 1240 can include a non-annular shape.

While the exemplary engine depicted in FIG. 14 illustrates some implementations of engine 1220, in other implementations, engine 1220 may have any other suitable configurations. Other implementations of engine 1220 may include a geared engine having a reduction gearbox connecting the low-pressure turbine to the fan section; a variable pitch engine such that the fan is a variable pitch fan, and/or includes variable pitch outlet guide vanes; an engine that includes any other suitable number or configuration of compressors, turbines, shafts, spools; and/or other types of suitable engines. Further, although engine 1220 depicted includes bypass flowpath 1254, in other exemplary aspects, engine 1220 may not include such bypass flowpath 1254 or may include bypass flowpath 1254 extending from any other suitable location of compressor section 1258 (e.g., from a location downstream of the low-pressure compressor and upstream of the high-pressure compressor, or from the high-pressure compressor) to fan stream 1276.

As shown in FIG. 14 and FIG. 13, in the exemplary embodiment shown, the turbomachine 1252 is canted downwardly relative to exhaust section 1236 of engine 1220. For example, exhaust section 1236 defines an outlet axis 1246, with centerline axis 1224 defining an angle with the outlet axis 1246. Furthermore, turbomachine 1252 is canted down relative to fuselage centerline 1238. In other words, centerline axis 1224 of turbomachine 1252 is oriented (e.g., pitched or tilted) downwardly along vertical direction D relative to fuselage centerline 1238 and relative to outlet axis 1246. The pitch down arrangement of centerline axis 1224 of turbomachine 1252 provides for alignment of intake airflow with a face of fan 1222. The pitch down arrangement of centerline axis 1224 also enables exhaust section 1236 to re-align an exhaust flow expelled from outlet nozzle 1242 with a freestream of air flowing past aircraft 1200 along downstream direction D.

More specifically, first angle $\theta_1$ is an angle formed between centerline axis 1224 of turbomachine 1252 and outlet axis 1246 of exhaust section 1236. In one example, first angle $\theta_1$ is greater than 0° and less than or equal to 10°, such as less than or equal to 7°. In this example, first angle $\theta_1$ is approximately 5°. Referring particularly to FIG. 13, second angle θ2 is an angle formed between fuselage centerline 1238 and centerline axis 1224 of turbomachine 1252. In this example, second angle $\theta_2$ is greater than or equal to 1° and less than or equal to 10°, such as less than or equal to 8°. Fuselage centerline 1238 and centerline axis 1224 may be parallel to one another.

In existing engine designs, an aircraft engine's lack of an inlet (e.g., outer nacelle surrounding fan 1222) can cause misalignment of airflow with a face of the fan leading to both acoustic and performance issues. The pitch down arrangement of centerline axis 1224 aligning a face of fan 1222 with an incoming airflow (which may be oriented slightly upwardly due to an upwash effect from the wing) provides improvements with respect to both acoustics and performance. Moreover, the re-alignment of the exhaust flow with the freestream of air flowing past aircraft 1200 (e.g., straightening outlet axis 1246 relative to centerline axis 1224) reduces hot exhaust contacting wing 1214 and enables alignment of thrust with fuselage centerline 1238 (e.g., an aircraft axis). In other implementations, the straightening of the outlet axis 1246 relative to the centerline axis 1224 may enable alignment of the thrust with other thrust vectors.

Moreover, in the exemplary embodiment of FIG. 14, bypass outlet nozzle plane 1272 and nozzle outlet plane 1274 are perpendicular to outlet axis 1246 of exhaust section 1236. In such a manner, the airflows from bypass outlet nozzle 1240 and from outlet nozzle 1242 are realigned relative to fan 1222 so as to be parallel with outlet axis 1246 and with fuselage centerline 1238 (see e.g., FIGS. 12-13). In realigning the airflows from bypass outlet nozzle 1240 and from outlet nozzle 1242, a direction of thrust provided by engine 1220 is provided in line with aircraft 1200 in order to provide a more efficient thrust vector for pushing aircraft 1200 through the air.

In other implementations, engine 1220 may have any other suitable configuration that is different from the implementation depicted in FIGS. 12-14. For example, referring now to FIG. 15 a partially transparent side view is provided of a downstream portion of exhaust section 1236 of engine 1220 in accordance with another exemplary embodiment of the present disclosure. The exemplary engine 1220 of FIG. 15 may be configured in a similar manner as the exemplary engine 1220 of FIGS. 12 through 14. For example, the exemplary engine 1220 of FIG. 15 includes a casing 1234, an exhaust section 1236, an outlet nozzle 1242', a core plug 1244 (defining a core plug axis 1278), and a rim 1284, and further engine 1220 depicted defines a centerline axis 1224 (of fan 1222, see e.g., FIGS. 12-14), an outlet axis 1246, an exhaust stream 1247, a working gas flowpath 1256, a nozzle outlet plane 1274', a third angle $\theta_3$, a fourth angle $\theta_4$, a vertical direction V, and a downstream direction D.

Figure 15:
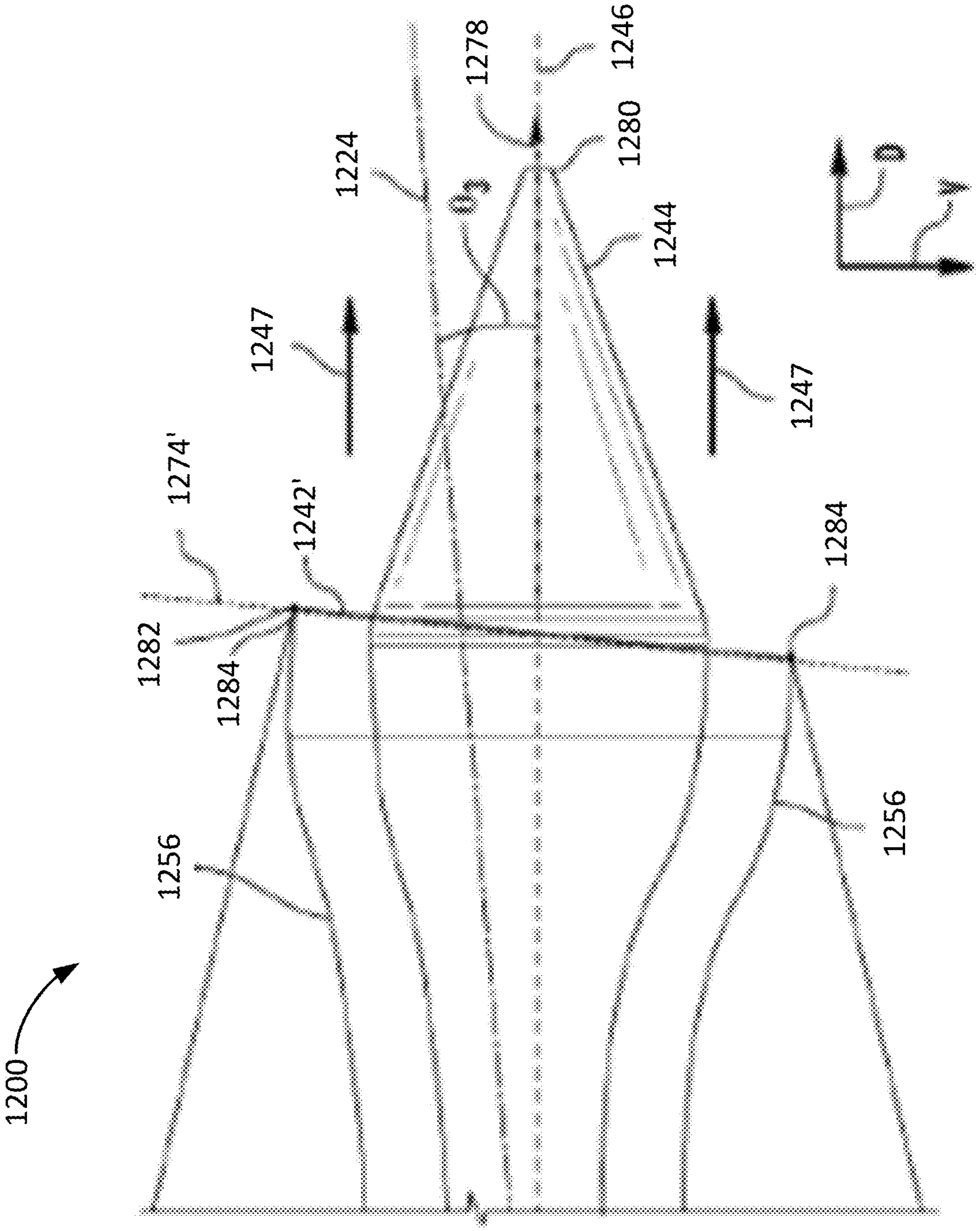
FIG. 15 is a partially transparent side view of a downstream portion of an exhaust section of the unducted fan engine.

In contrast to the embodiment of FIGS. 12 through 14, in the exemplary embodiment of FIG. 15, a shape of outlet nozzle 1242' corresponds to an elliptical ring. In other examples, the shape of outlet nozzle 1242' may correspond to a non-elliptical or non-ring shape. Here, the elliptical ring shape of outlet nozzle 1242' is caused by a canted or tilted orientation of outlet nozzle 1242', as described below. In one example, a distribution of area of outlet nozzle 1242' can be continuous around the entire ring of outlet nozzle 1242'. In another example, the distribution of area of outlet nozzle 1242' can be non-continuous or variable around ring of outlet nozzle 1242'.

Nozzle outlet plane 1274' corresponds to an imaginary plane extending along a face of outlet nozzle 1242'. In this example, nozzle outlet plane 1274' is non-orthogonal, or non-perpendicular, to outlet axis 1246 of exhaust section 1236. Likewise, nozzle outlet plane 1274' is non-parallel to vertical direction V and is non-perpendicular to downstream direction D. Rim 1284 defines the nozzle outlet plane 1274'. In this example, nozzle outlet plane 1274' is non-orthogonal to outlet axis 1246. Put another way, outlet nozzle 1242' is non-axisymmetric about outlet axis 1246. In other examples, the relative angles between outlet nozzle 1242' and nozzle outlet plane 1274' relative to outlet axis 1246, can also be incorporated by bypass outlet nozzle 1240 and bypass outlet nozzle plane 1272 (see e.g., FIG. 14).

Core plug axis 1278 is a centerline axis of core plug 1244. In this example, core plug axis 1278 is parallel to and coaxial with outlet axis 1246. As mentioned above, third angle $\theta_3$ is a relative angle between centerline axis 1224 and outlet axis 1246. In this example, because core plug axis 1278 is coaxial with outlet axis 1246, third angle $\theta_3$ can also be defined by the relative angle formed between centerline axis 1224 and core plug axis 1278. In another example, the relative angle between centerline axis 1224 and core plug axis 1278 can define a fourth angle θ4 that is less than, equal to, or greater than third angle $\theta_3$. The depicted core plug 1244 further defines an apex 1280. The apex 1280 corresponds to a point or tip of core plug 1244. Apex 1280 is disposed at a downstream-most point of core plug 1244.

Terminal endpoint 1282 may define the most downstream point with respect to outlet nozzle 1242'. Rim 1284 is a lip, or an edge disposed along a circumference of outlet nozzle 1242'. Rim 1284 defines nozzle outlet plane 1274' along which rim 1284 is disposed. In this example, rim 1284 is flat such that every point along rim 1284 is disposed along a single plane (e.g., nozzle outlet plane 1274'). Alternatively, rim 1284 can include non-flat or varying configurations (e.g., a 3D configuration) such that all points along rim 1284 are not disposed along nozzle outlet plane 1274'. In implementations where rim 1284 includes a non-flat configuration (e.g., lobed, scalloped, chevron cut-outs, sawtooth profile, etc.), nozzle outlet plane 1274' may be defined by an average of the points along an edge of rim 1284. The nozzle outlet plane 1274 may also be defined by a non-planar rim 1284. When the nozzle outlet plane 1274' is tilted, outlet nozzle 1242' can redirect and redistribute exhaust stream 1247 in order to prevent blowing hot exhaust stream 1247 onto wing 1214 and to enable re-alignment of thrust with an axial centerline of aircraft 1200 (see e.g., FIGS. 12-13, fuselage centerline 1238) or with another desired vector.

Figure 16:
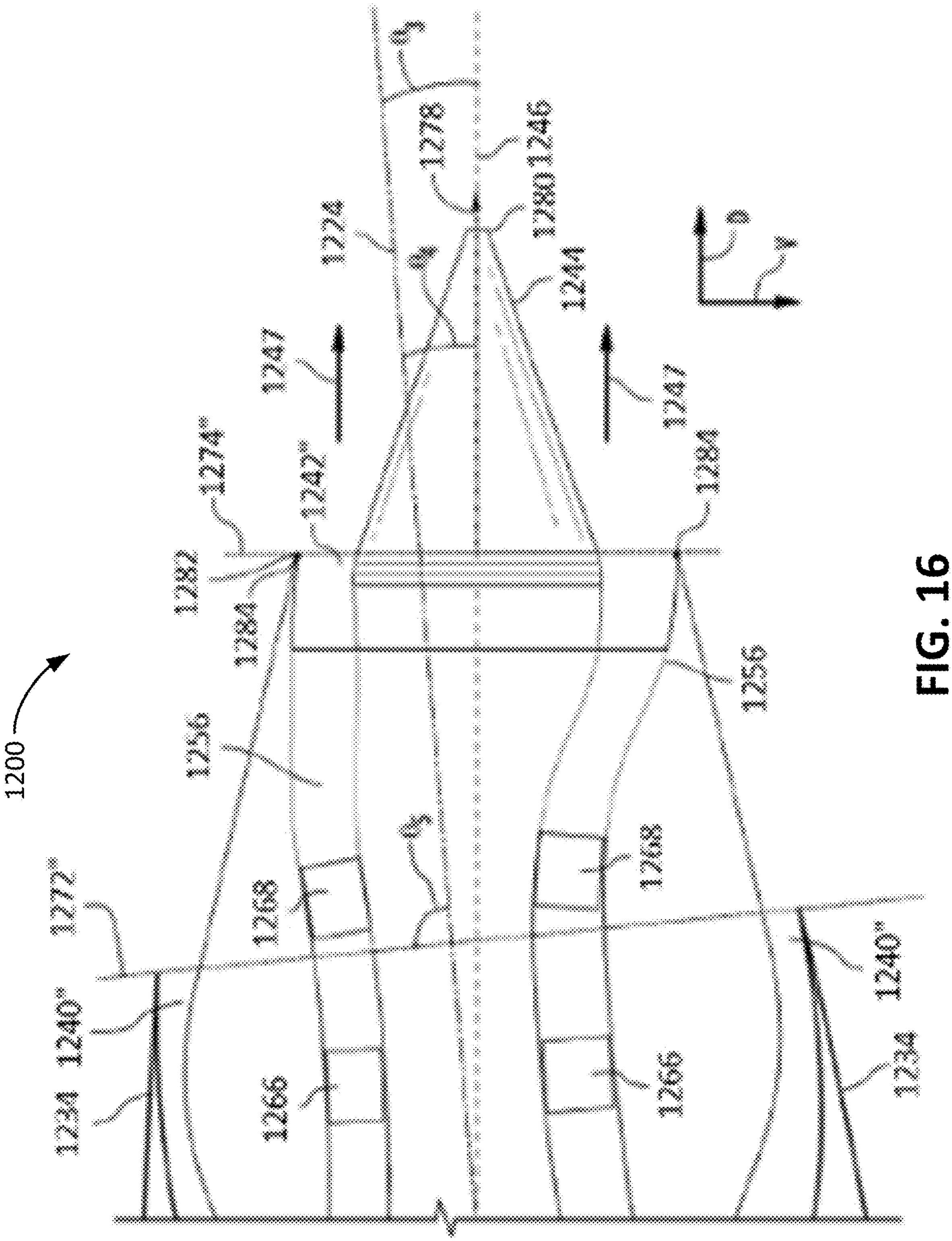
FIG. 16 is a partially transparent side view of a downstream portion of an alternate exhaust section of the unducted fan engine.

Referring now to FIG. 16, FIG. 16 illustrates a partially transparent side view of a downstream portion of exhaust section 1236 of engine 1220 in accordance with another exemplary embodiment of the present disclosure. The exemplary engine 1220 of FIG. 16 may be configured in a similar manner as the exemplary engine 1220 of FIGS. 12 through 14. For example, the exemplary engine 1220 of FIG. 16 includes a centerline axis 1224 (of fan 1222), a casing 1234, a bypass outlet nozzle 1240", an outlet nozzle 1242", a core plug 1244 (defining a core plug axis 1278), an outlet axis 1246, an exhaust stream 1247, a working gas flowpath 1256, a HPT blade 1266, an LPT blade 1268, a bypass outlet nozzle plane 1272", a nozzle outlet plane 1274", an apex 1280 (of core plug 1244), a terminal endpoint 1282 (of outlet nozzle 1242"), a rim 1284 (of outlet nozzle 1242"), a third angle $\theta_3$, a fourth angle θ4, a fifth angle θ5, a vertical direction V, and a downstream direction D. Both the HPT blade 1266 and the LPT blade 1268 are rotatable about the centerline axis 1224.

In the exemplary embodiment of FIG. 16, bypass outlet nozzle 1240" is shown as being aligned with a direction of centerline axis 1224 such that a mean direction of flow of an exhaust of the bypass outlet nozzle 1240" is parallel or substantially parallel (e.g., less than a 3 degree angle therebetween) to the centerline axis 1224. Likewise, bypass outlet plane 1272" is shown in FIG. 16 as being out of alignment with (e.g., non-parallel to) nozzle outlet plane 1274". This configuration contrasts with the embodiment shown in FIG. 14, which shows bypass outlet nozzle 1240 as being misaligned with a direction of centerline axis 1224 and shows bypass outlet plane 1272 as being in alignment with (e.g., parallel or substantially parallel to) nozzle outlet plane 1274.

In certain exemplary embodiments, bypass nozzle 1240" is un-canted or aligned with centerline axis 1224. For example, bypass nozzle 1240" may be aligned with centerline axis 1224 such that fifth angle $\theta_5$ (defined by the relative angle between centerline axis 1224 and bypass outlet plane 1272") is approximately 90°. In such an example, outlet nozzle 1242" is canted or is angled relative to centerline axis 1224, while bypass outlet nozzle 1240" is un-canted or is aligned with centerline axis 1224 of engine 1220. In some implementations, fifth angle $\theta_5$ may be 90° and third angle $\theta_3$ may be greater than zero and equal to or less than 20°.

In other exemplary embodiments, fifth angle $\theta_5$ may be less than 900 such that a complementary angle of fifth angle $\theta_5$ is greater than zero. As used herein the term "the complementary angle" corresponds to 900 minus another angle (e.g., fifth angle $\theta_5$). In this example, the term complimentary angle is used to refer to the complementary angle to fifth angle $\theta_5$. Here, the complementary angle is a degree of cant or an amount of cant of bypass outlet nozzle 1240" (and by extension of bypass outlet plane 1272") relative to centerline axis 1224. In particular, in some embodiments, fifth angle $\theta_5$ may be less than 900 and equal to or greater than 850 such that the complementary angle of fifth angle $\theta_5$ is greater than 0° and is less than or equal to 5°. In other exemplary implementations, fifth angle $\theta_5$ may be less than 850 and equal to or greater than 800 such that the complementary angle of fifth angle $\theta_5$ is greater than 5° and is less than or equal to 10°. In yet other exemplary implementations, in combination of fifth angle $\theta_5$ and third angle $\theta_3$ may be greater than 5° (such as greater than or equal to 10°, such as greater than or equal to 15°). In a particular exemplary embodiment, fifth angle $\theta_5$ is 850 such that the complementary angle of fifth angle $\theta_5$ is 5° and third angle $\theta_3$ is 15°.

Figure 17:
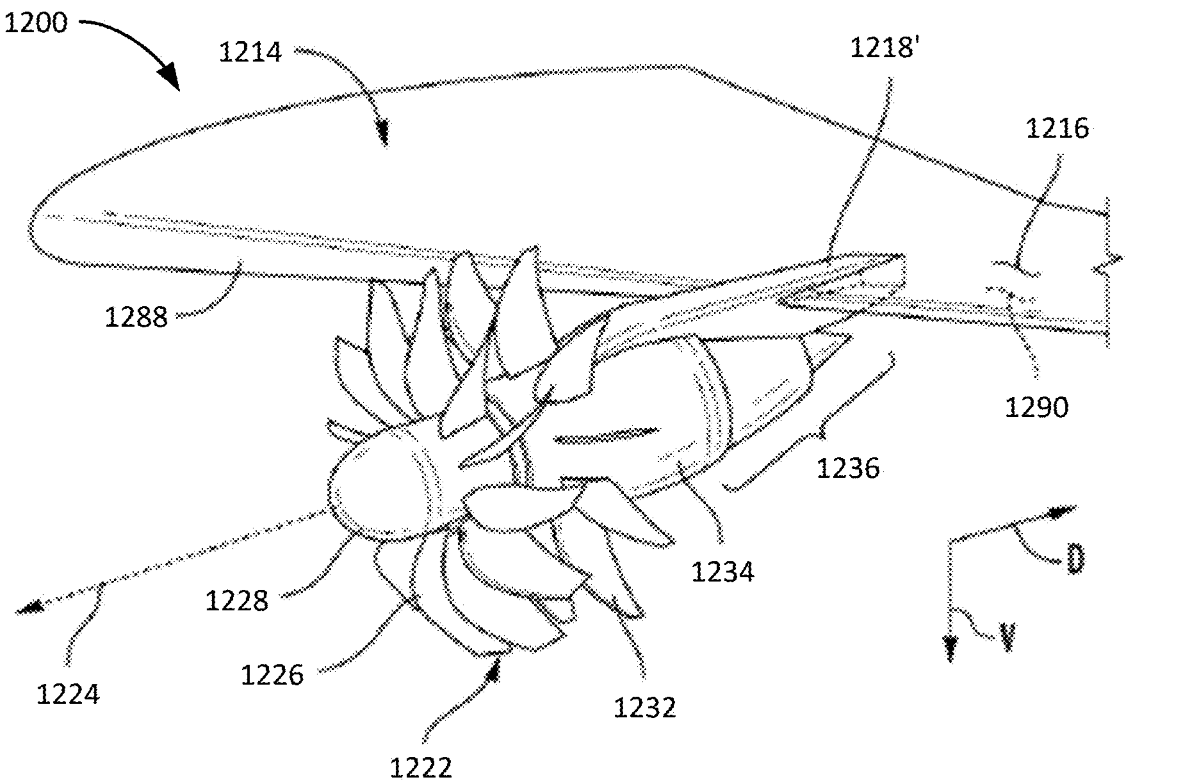
FIG. 17 is a perspective view of a portion of a wing of the aircraft showing a portion of the pylon extending along an upper surface of the wing.

FIG. 17 is a perspective view of a portion of a wing 1214 and shows an upper surface 1216 of wing 1214, a pylon 1218', an engine 1220 (with a fan 1222, a centerline axis 1224, fan blades 1226, a nose 1228, a direction of rotation 1230, guide vanes 1232, a casing 1234, and an exhaust section 1236), a leading edge 1288 of wing 1214, a lower surface 1290 of wing 1214, a vertical direction V, and a downstream direction D.

As shown in FIG. 17, pylon 1218' includes a portion extending along upper surface 1216 of wing 1214. In contrast, FIGS. 12-13 include embodiments showing pylon 1218 extending or connecting to wing 1214 along a bottom surface of wing 1214 and not along upper surface 1216 of wing 1214. In these embodiments, the pylon 1218' is attached to wing 1214 along upper surface 1216, along leading edge 1288, and along lower surface 1290 of wing 1214. In other examples, pylon 1218' can be mounted to wing 1214 along one or more of upper surface 1216, leading edge 1288, and lower surface 1290 of wing 1214. In other examples, engine 1220 could be mounted in wing 1214 in any of an underwing, a blown wing, a high wing, or a fuselage mounted style of installation configuration.

Leading edge 1288 is an upstream (e.g., to the left in FIG. 17) point of wing 1214 relative to downstream direction D. Leading edge 1288 is defined by a curved surface extending between and connecting upper surface 1216 and lower surface 1290 of wing 1214. Leading edge 1288 is disposed at an upstream-most portion of wing 1214. Lower surface 1290 of wing 1214 is a surface extending underneath or on a bottom of wing 1214 relative to vertical direction V.

As shown in FIG. 17, an embodiment is presented of engine 1220 mounted to pylon 1218' and such that portion of pylon 1218' extends along a portion of upper surface 1216 of wing 1214. Having a portion of pylon 1218' extend in a downstream direction along upper surface 1216 helps to guide airflow passing above wing 1214 to straighten relative to downstream direction D. Guiding airflow passing above the wing 1214 to straighten relative to the downstream direction D enables air flowing over wing 1214 to more effectively combine with propulsive air streams generated by engine 1220.

Figure 18:
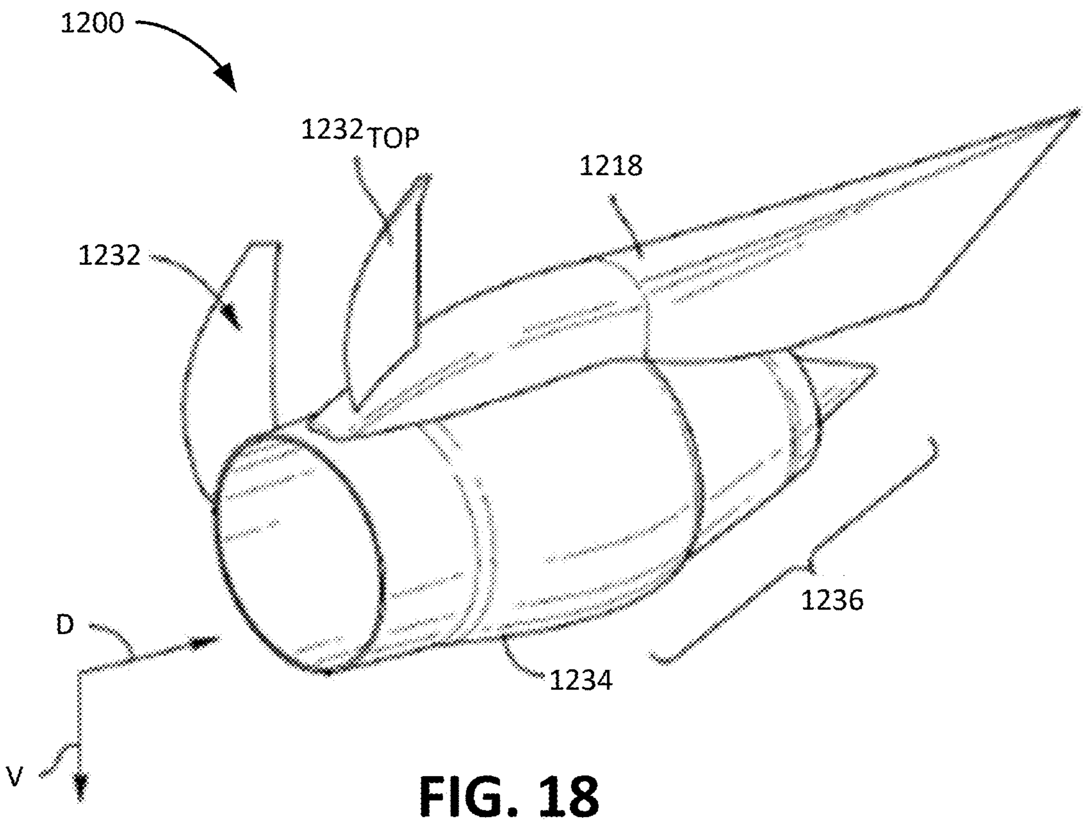
FIG. 18 is a perspective isolation view of the pylon with a guide vane mounted onto the pylon.

FIG. 18 is a perspective isolation view of pylon 1218 mounted to a portion of engine 1220 and shows a pylon 1218, an engine 1220, guide vanes 1232, a top guide vane $\mathbf{1232}_{TOP}$, a casing, an exhaust section, a vertical direction V, and a downstream direction D. In FIG. 18, fan 1222 is removed from engine 1220 for clarity. Here, pylon 1218 is shown with one of guide vanes 1232 (e.g., top guide vane $\mathbf{1232}_{TOP}$) mounted to a top portion of pylon 1218.

In this example two guide vanes 1232 are shown for clarity purposes. However, the pylon 1218 may include a different number of guide vanes 1232. In this example, a plurality of guide vanes 1232 is distributed about a circumference of casing12 1234 (See e.g., FIGS. 12-13 & 16). Top guide vane $\mathbf{1232}_{TOP}$ extends upwards from pylon 1218 along a radial direction from engine 1220. As opposed to being connected to a portion of casing 1234, top guide vane $\mathbf{1232}_{TOP}$ is mounted directly onto pylon 1218. In this example, a single top guide vane $\mathbf{1232}_{TOP}$ is mounted onto pylon 1218. In other implementations, one or more top guide vane $\mathbf{1232}_{TOP}$ can be mounted onto pylon 1218.

Further improvements can be made by incorporating a variable cant core nozzle with the engine. By incorporating a variable cant core nozzle to the engine, exhaust gases are directed away from the flaps when the flaps are deployed during a takeoff operation. More specifically, the variable cant core nozzle includes a movable portion that is rotated to a canted position away from the flaps during the takeoff operation. The movable portion is then rotated back to a centered position when the flaps are stowed, directing the exhaust gases in a direction along the centerline axis of the engine. The variable cant core nozzle reduces the exhaust gases that interact with the trailing edge flap system during takeoff while maintaining full rearward thrust during cruise. The variable cant nozzle may be combined with the design features discussed above with respect to FIGS. 1-18 to further improve performance during a takeoff operation by directing the exhaust gases away from the wing flaps to avoid impingement. For example, by combining one or more of the positioning of the propulsor relative to the aircraft wing, a pitched down fan face, an outlet nozzle that aligns the engine thrust with the centerline axis of the aircraft, a canting and non-axisymmetric configuration of a working gas flowpath outlet and a third stream flowpath outlet, a pylon design with an integrated outlet guide vane, and/or outlet guide vanes with one or more of the outlet guide vanes integrated with the pylon in such a way as to jointly work to de-swirl the fan exhaust while the fan exhaust passes over the pylon, with the variable cant nozzle, the aerodynamic performance and thrust efficiency of the aircraft may be further improved.

Figure 19:
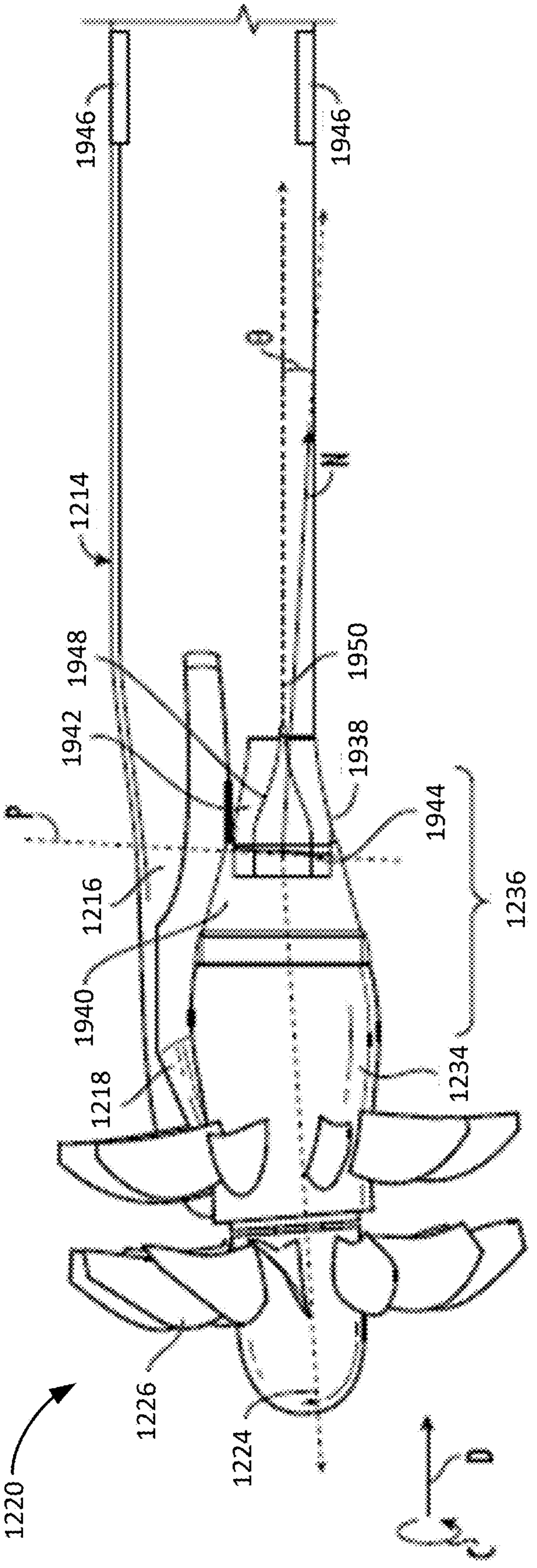
FIG. 19 is a magnified, schematic view of the exemplary engine of FIG. 12.

Now referring to FIG. 19, a magnified, schematic view of the engine 1220 is shown. Specifically, the engine 1220 is shown in FIG. 19 in a cruise operation mode, i.e., the aircraft 1200 is at a specified altitude and no longer ascending or descending.

As described above, the engine 1220 includes the exhaust section 1236. The exhaust section 1236 includes an outlet nozzle 1938 including a fixed portion 1940 and a movable portion 1942. The exhaust section 1236 defines a plane P at which the movable portion 1942 contacts the fixed portion 1940, and a vector N normal to the plane P defines a cant angle θ relative to the centerline axis 1224 of the engine 1220. That is, the movable portion 1942 is canted relative to the rest of the outlet nozzle 1938 to a nonzero cant angle θ such that a surface of an end 1944 of the movable portion 1942 is parallel to the plane P. In particular, the movable portion 1942 is canted downward in the vertical direction and outward in the lateral direction relative to the centerline axis 1224. The end 1944 of the movable portion engaging the fixed portion defines the nonzero cant angle θ with the centerline axis 1224.

The aircraft 1200 includes a takeoff component 1946 downstream of the outlet nozzle 1938. The takeoff component 1946 is a component that aids in lifting the aircraft 1200 during a takeoff operating mode. Exemplary takeoff components 1946 include, but are not limited to, high lift devices, a trailing edge flap system, the wing 1214, or a horizontal tail.

The exhaust section 1236 includes a plug 1948 disposed in the movable portion 1942 of the outlet nozzle 1938. The plug 1948 directs the exhaust gases into an exhaust stream 1950. More specifically, as the exhaust gases flow through the outlet nozzle 1938, the exhaust gases flow between an outer surface of the plug 1948 and an inner surface of the movable portion 1942. The plug 1948 and the movable portion 1942 are shaped to cause the exhaust gases to be directed inward radially in addition to axially forming a conical airflow that exits the outlet nozzle 1938 into a stream, i.e., the exhaust stream 1950. The exhaust stream 1950 provides thrust to the aircraft 1200 in the direction that the exhaust stream 1950 flows. As described in further detail below, based on the position of the movable portion 1942, at least some of the exhaust stream 1950 flows downward and away from the takeoff component 1946.

Figure 20:
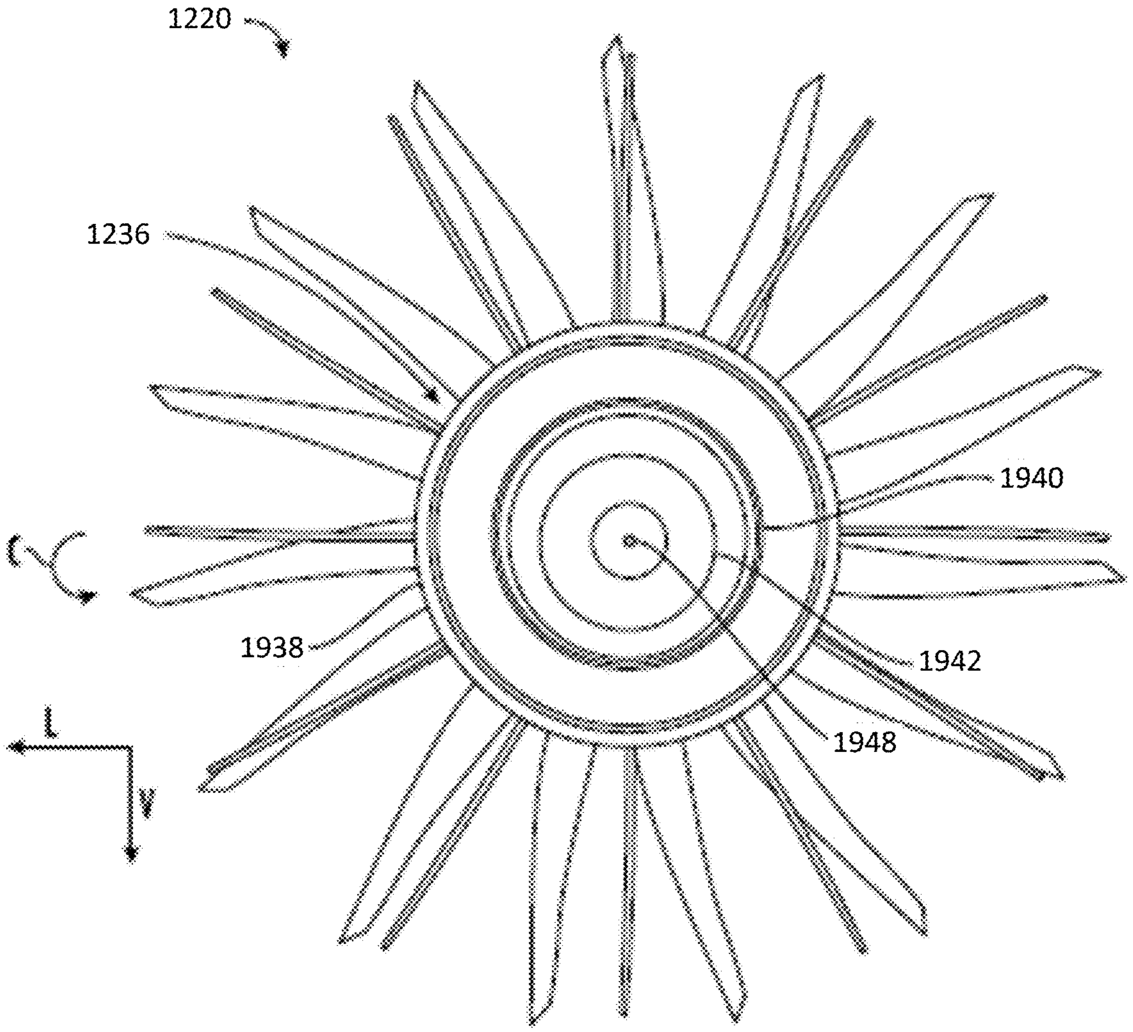
FIG. 20 is a rear view of the exemplary engine of FIG. 12 with a movable portion of an outlet nozzle in a first position.

With reference to FIG. 20, a rear view of the engine 1220 is shown. As described above, the engine 1220 includes the exhaust section 1236 with the outlet nozzle 1938 including the fixed portion 1940 and the movable portion 1942. In the example of FIG. 20, the movable portion 1942 is in a first position that is along the centerline axis 1224 (FIG. 19) of the engine 1220, which is out of the page in FIG. 20. In the first position, all of the exhaust stream 1950 (FIG. 19) from the engine 1220 flows rearward through the outlet nozzle 1938, such that 100% of the exhaust is in the rearward direction. In such a form, the aircraft 1200 is operating in a cruise operating mode, and the takeoff components 1946 (FIG. 19) are stowed away from the exhaust exiting the outlet nozzle 1938. The plug 1948 is aligned with the centerline axis 1224 (FIG. 19).

Figure 21:
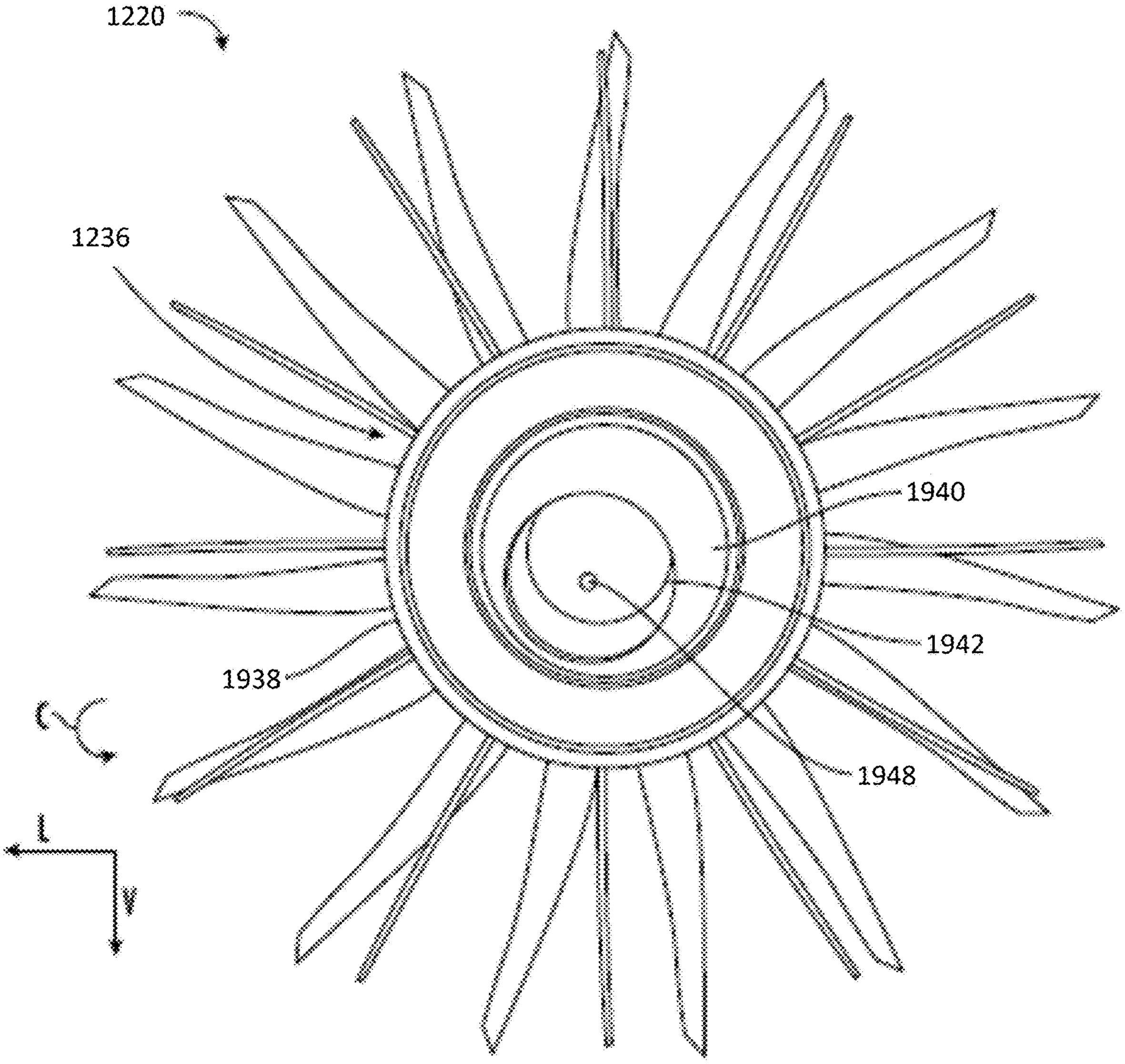
FIG. 21 is a rear view of the exemplary engine of FIG. 12 with the movable portion of the outlet nozzle in a second position.

With reference to FIG. 21, another rear view of the engine 1220 is shown. The aircraft 1200 in FIG. 21 is operating in a takeoff operating mode, and a takeoff component (FIG. 19) extends outward toward the outlet nozzle 1938. Here, the movable portion 1942 is in a second position that is downward in the vertical direction V and outward in the lateral direction L relative to the centerline axis 1224 (FIG. 19) such that the exhaust flows out from the outlet nozzle 1938 in a direction away from the takeoff component 1946 (FIG. 19). The direction away from the takeoff component 1946 is determined based on the nonzero cant angle of the movable portion 1942 relative to the fixed portion 1940. In particular, an amount of exhaust of the exhaust stream 1950 (FIG. 19) flowing from the outlet nozzle 1938 downward in the vertical direction V and/or outward in the lateral direction L is in a range from 5-25% of a total amount of exhaust flowing from the outlet nozzle 1938. By directing some of the exhaust downward and outward, the takeoff component 1946 (FIG. 19) is protected from impingement by the exhaust stream 1950 while most of the thrust from the exhaust continues forward.

Figure 22B:
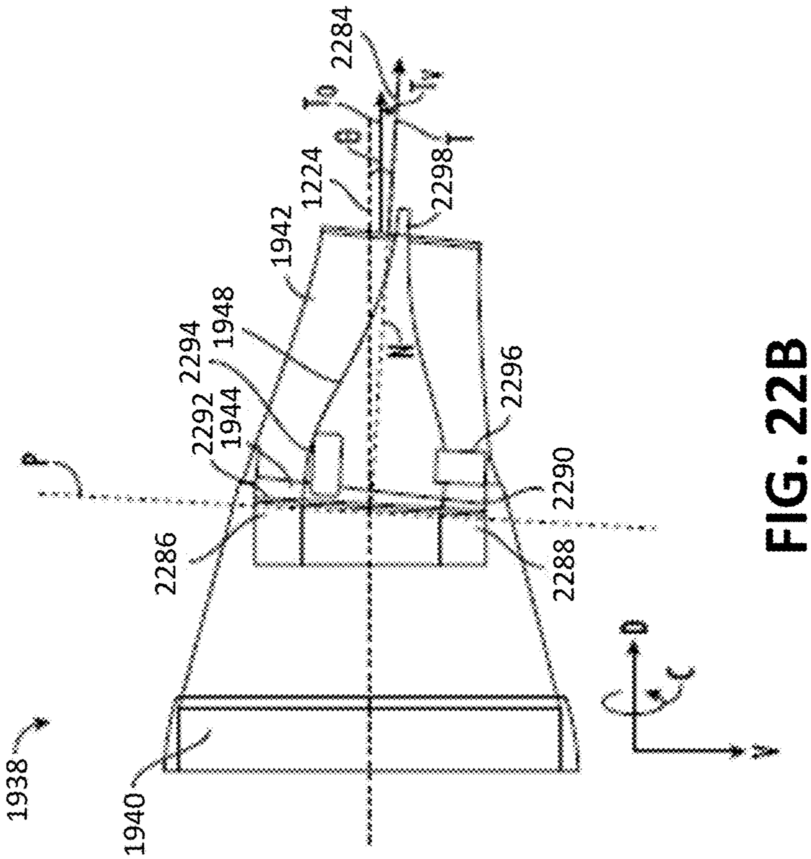
FIG. 22B is a side, magnified view of the outlet nozzle of the exemplary engine of FIG. 12 in the second position.
Figure 22A:
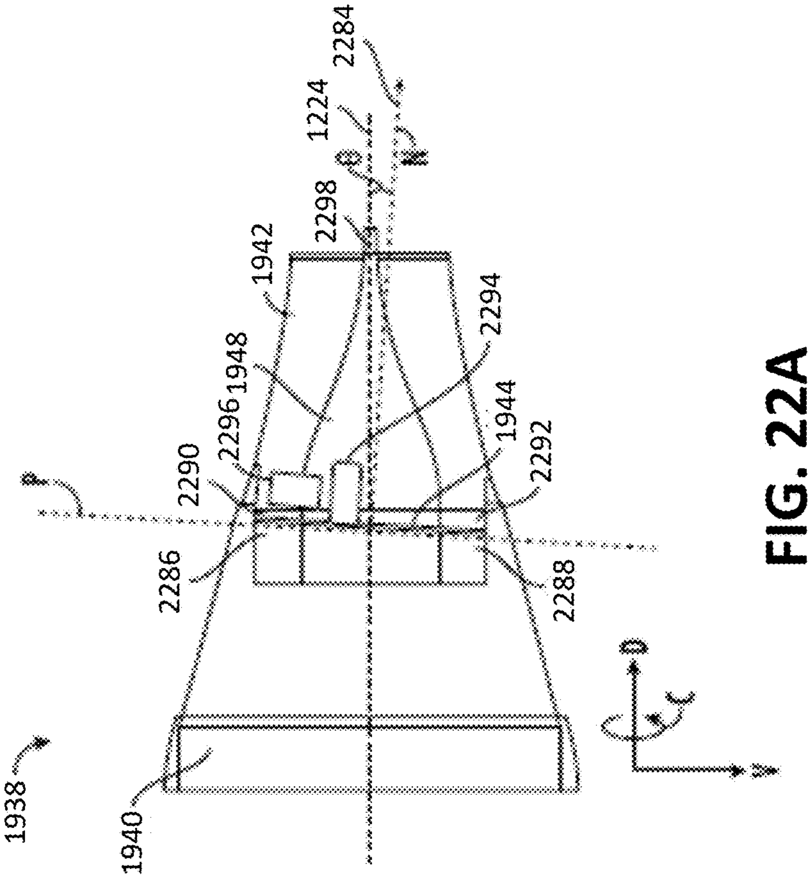
FIG. 22A is a side, magnified view of the outlet nozzle of the exemplary engine of FIG. 12 in the first position.

Now referring to FIGS. 22A-22B, side views of the outlet nozzle 1938 for the exhaust section 1236 of the engine 1220 are shown. FIG. 22A shows the outlet nozzle 1938 with the movable portion 1942 in the first position. FIG. 22B shows the outlet nozzle 1938 with the movable portion 1942 in the second position.

As described above, the outlet nozzle 1938 defines a plane P that is canted relative to the centerline axis 1224 of the engine 1220 by a nonzero cant angle θ. In particular the outlet nozzle 1938 defines a central axis 2284 that aligns with the normal vector N of the plane P. The movable portion 1942 of the outlet nozzle 1938 rotates about the central axis 2284 from the first position to the second position.

The fixed portion 1940 of the outlet nozzle 1938 has an upper portion 2286 and a lower portion 2288, and the movable portion 1942 of the outlet nozzle 1938 has a first portion 2290 and a second portion 2292. In the first position shown in FIG. 22A, the first portion 2290 of the movable portion 1942 is above the centerline axis 1224 and the second portion 2292 of the movable portion 1942 is below the centerline axis 1224. Thus, the upper portion 2286 of the fixed portion 1940 and the first portion 2290 of the movable portion 1942 abut each other, and the lower portion 2288 of the fixed portion 1940 and the second portion 2292 of the movable portion 1942 abut each other. In such a form, a surface of the end 1944 of the movable portion 1942 aligns with the plane P. It will be appreciated that a seal may be placed between the movable portion 1942 and the fixed portion 1940, such as a stepped, flexible surface, a turkey-feather seal, or the like. Such a seal reduces or inhibits air leakage from the circular motion of the movable portion 1942 and an elliptical shape of the fixed portion 1940.

It will be appreciated that, because the end 1944 of the movable portion 1942 is substantially annular, the first portion 2290 and the second portion 2292 of the movable portion 1942 are defined by a specific angle range relative to an origin of a circle defining the annular shape. In the first position, the topmost part of the movable portion 1942 is the origin and defines 0 degrees, and the first portion 2290 is an angle range about the origin, such as from −15 degrees to 15 degrees. The second portion 2292 is an angle range opposing the origin, such as from 165 degrees to 195 degrees. That is, the first and second portions 2290, 2292 may have angle ranges of 30 degrees about the origin and opposing the origin. Alternatively, the first and second portions 2290, 2292 may have different angle ranges, such as 10 degrees, 20 degrees, 40 degrees, 45 degrees, or 90 degrees. When the angle range is 90 degrees, the first portion 2290 is a first half of the movable portion 1942, and the second portion 2292 is a second half of the movable portion 1942.

In the second position shown in FIG. 22B, the movable portion 1942 is rotated 180 degrees about the central axis 2284 of the outlet nozzle 1938 (generally in a circumferential direction C of the engine 1220, see FIGS. 4 and 5). In the second position, the first portion 2290 of the movable portion 1942 abuts the lower portion 2288 of the fixed portion 1940, and the second portion 2292 of the movable portion 1942 abuts the upper portion 2286 of the fixed portion 1940. That is, the first portion 2290 of the movable portion 1942 is rotated below the centerline axis 1224, and the second portion 2292 of the movable portion 1942 is rotated above the centerline axis 1224. In such a form, the surface of the end 1944 of the movable portion 1942 is no longer aligned with the plane P, and only the bottommost point of the end 1944 of the movable portion 1942 meets the plane P at the bottommost portion of the fixed portion 1940.

The outlet nozzle 1938 includes at least one actuator 2294 configured to rotate the movable portion 1942 along the fixed portion 1940 from the first position to the second position. The actuator 2294 is attached to the fixed portion 1940 and drives the movable portion 1942. In particular, the actuator 2294 may include a suitable movement device, such as a wheel or gear, that rotates the movable portion 1942. The actuator 2294 may be of any suitable type, such as a linear actuator or a rotary actuator. One actuator 2294 is shown in the Figures, and it will be appreciated that the outlet nozzle 1938 may include more than one actuator 2294 to rotate the movable portion 1942.

The actuator 2294 can rotate the movable portion 1942 to a third position between the first position and the second position. That is, the actuator 2294 rotates the movable portion 1942 an angle of 180 degrees about the central axis 2284 from the first position to the second position, and the actuator 2294 can rotate the movable portion 1942 to a different angle from the first position, such as 90 degrees, 120 degrees, 150 degrees, or another angle.

The outlet nozzle 1938 further includes at least one strut 2296 connecting the plug 1948 to the movable portion 1942. Specifically, FIGS. 22A-22B show one strut 2296, and it will be appreciated that the outlet nozzle 1938 may include more than one strut 2296. The strut 2296 moves the plug 1948 with the movable portion 1942 when the actuator 2294 rotates the movable portion 1942. Referring back to FIG. 22A, when the movable portion 1942 is in the first position, the plug 1948 is aligned with the centerline axis 1224, and the strut 2296 is disposed adjacent to the upper portion 2286 of the fixed portion 1940 of the outlet nozzle 1938. Additionally, the plug 1948 includes an end 2298 extending aft of the movable portion 1942, and when the movable portion 1942 is in the first position, the end 2298 of the plug 1948 is above the central axis 2284 of the outlet nozzle 1938 in the vertical direction V.

Referring back to FIG. 22B, when the movable portion 1942 is in the second position, the plug 1948 is offset from the centerline axis 1224, and the strut 2296 is disposed adjacent to the lower portion 2288 of the fixed portion 1940. Additionally, when the movable portion 1942 is in the second position, the end 2298 of the plug 1948 is below the central axis 2284 of the outlet nozzle 1938 in the vertical direction V. By moving the plug 1948 below the central axis 2284, the exhaust gases form a conical airflow into the exhaust stream 1950 (FIG. 19) away from the takeoff component 1946 (FIG. 19).

In the second position, a specific amount of thrust is directed downward in the vertical direction V. The thrust is represented by a vector T and can be represented as the sum of two vectors representing the thrust Tv in the vertical direction D (the "vertical thrust" Tv) and the thrust $T_D$ in the downstream direction D (the "downstream thrust" $T_D$). In the second position, the amount of vertical thrust Tv may be in a range from 5% to 25% of the total thrust. Directing 5% to 25% of the total thrust downward in the vertical direction V as vertical thrust Tv allows for the exhaust stream 1950 to be directed away form the takeoff component 1946 without adversely affecting takeoff of the aircraft 1200. In particular, by having the movable portion 1942 of the outlet nozzle 1938, more thrust may be directed downward during takeoff than an outlet nozzle with a fixed cant angle could provide while still allowing for full downstream thrust during cruise. In the first position (FIG. 22A), all of the thrust T is in the downstream direction D, and by rotating the movable portion 1942 to the second position or a third position between the first position and the second position, the amount of vertical thrust Tv can be specified.

Figure 23:
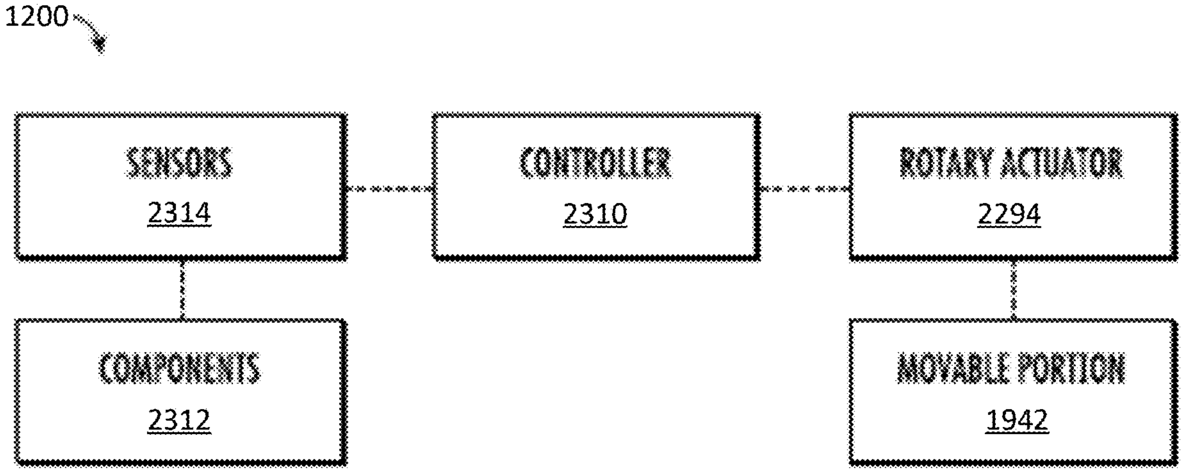
FIG. 23 is a block diagram of components for controlling the outlet nozzle of the exemplary engine of FIG. 12.

Now referring to FIG. 23, a block diagram of portions of the aircraft 1200 is shown. Specifically, FIG. 23 shows how a controller 2310 controls the movable portion 1942 (FIG. 19) of the outlet nozzle 1938 (FIG. 19) based on operation data from components 2312 of the aircraft 1200.

The controller 2310 is configured to actuate the actuator 2294 based on operation data collected from the aircraft 1200. The controller 2310 is a computer including a processor and a memory that communicates with one or more sensors 2314 and the actuator 2294. The controller 2310 provides instructions to the actuator 2294 based on data received from the sensors 2314.

The sensors 2314 collect the operation data from one or more components 2312 of the aircraft 1200, and the controller 2310 receives the operation data from the sensors 2314. Specifically, the controller 2310 receives data from at least from the takeoff component 1946 (FIG. 19), such as a flap of a trailing edge flap system or a high lift device. Additionally, the sensors 2314 may collect operation data from components 2312 of the engine, such as the turbines, the compressors, or the fuel injectors, among others. The operation data includes at least one of: an altitude, a speed, a Mach number, a fuel flow rate, an external ambient temperature, an external ambient pressure, or a pitch angle, among others.

Based on the operation data, the controller 2310 determines whether the aircraft 1200 is about to initiate a takeoff operating condition. In this context, the "takeoff operating condition" is when the aircraft 1200 takes off from the ground before reaching a cruise altitude. Certain components 2312 are operational during the takeoff operating condition, such as the trailing edge flap system and the high lift device. The takeoff operating condition may be determined by one or more of the following conditions that are based on the operation data: an altitude being below an altitude threshold, a Mach number being below a Mach number threshold, a speed being below a speed threshold, a pitch angle being above a pitch angle threshold, an ambient air pressure being above an air pressure threshold, an ambient temperature being above a temperature threshold, or combinations thereof. When the controller 2310 determines that the aircraft 1200 is about to initiate the takeoff operating condition, the controller 2310 actuates the actuator 2294 to rotate the movable portion 1942 of the outlet nozzle 1938 to a position that is angled away from the fixed portion 1940 of the outlet nozzle 1938, such as the second position shown above in FIG. 22B.

Based on additional operation data, the controller 2310 determines whether the aircraft 1200 is no longer in the takeoff operating condition, such as in a cruise operating condition. In the cruise operating condition, the aircraft 1200 maintains a specified altitude and a specified speed. As an example, the controller 2310 determines that the aircraft 1200 is in the cruise operating condition based on one or more of the following conditions: the altitude being above the altitude threshold, the Mach number being above the Mach number threshold, the speed being above the speed threshold, the pitch angle being below the pitch angle threshold, the ambient air pressure being below the air pressure threshold, the ambient temperature being below the temperature threshold, or combinations thereof. When the controller 2310 determines that the aircraft 1200 is in the cruise operating condition, the controller actuates the actuator 2294 to rotate the movable portion 1942 of the outlet nozzle 1938 back to the first position, aligned with the fixed portion 1940 of the outlet nozzle 1938 and the centerline axis 1224 of the engine 1220.

Figure 24:
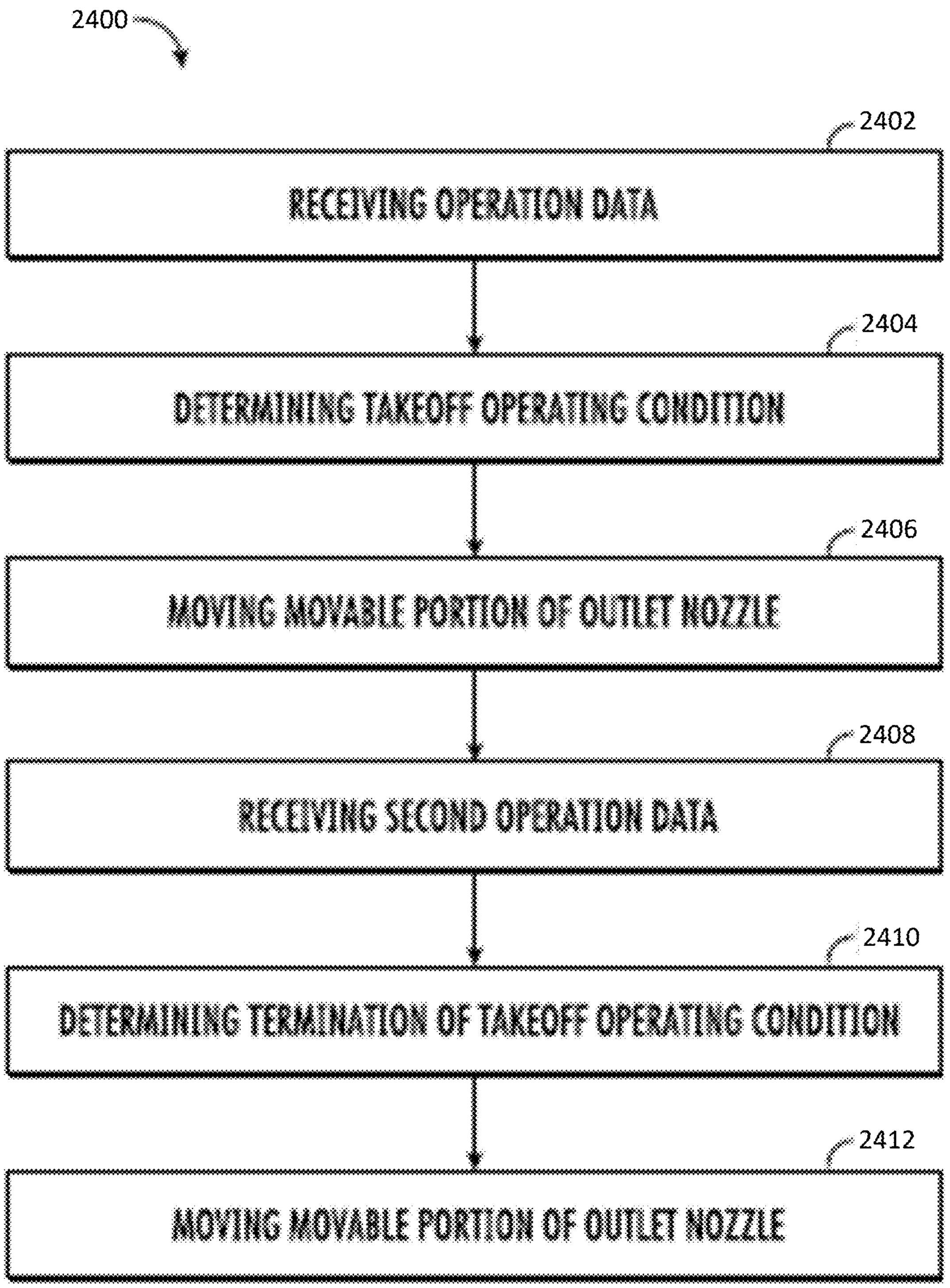
FIG. 24 is a block diagram of an exemplary method for controlling the exemplary engine of FIG. 12.

Referring now to FIG. 24, a flow diagram of a method 2400 of operating a gas turbine engine of an aircraft in accordance with an exemplary aspect of the present disclosure is provided. The method 2400 may be utilized to operate one or more of the exemplary engines described above with reference to FIGS. 12, 14, and 19-23. However, in other exemplary aspects, the method 2400 may additionally or alternatively be utilized to operate any other suitable engine for an aircraft.

As is depicted, the method 2400 includes at (2402) receiving operation data from one or more components of the aircraft. A controller receives data collected from one or more sensors about operation of the engine. As an example, the sensors collect data at least from the takeoff component, such as a flap of a trailing edge flap system or a high lift device. Additionally, the sensors may collect operation data from components of the engine, such as the turbines, the compressors, fuel injectors, among others. The operation data include at least one of: an altitude, a speed, a Mach number, a fuel flow rate, an external ambient temperature, an external ambient pressure, a pitch angle, among others.

The method 2400 includes at (2404) determining whether the aircraft is in a takeoff operating condition. Certain components are operational during the takeoff operating condition, such as the trailing edge flap system and the high lift device. The takeoff operating condition may be determined by one or more of the following conditions that are based on the operation data: an altitude being below an altitude threshold, a Mach number being below a Mach number threshold, a speed being below a speed threshold, a pitch angle being above a pitch angle threshold, an ambient air pressure being above an air pressure threshold, an ambient temperature being above a temperature threshold, or combinations thereof.

The method 2400 includes at (2406) moving a movable portion of an outlet nozzle to a position away from a takeoff component. As an example, the controller actuates an actuator to rotate the movable portion of the outlet nozzle to a specified position that is angled away from a fixed portion of the outlet nozzle. In the specified position, an amount of exhaust flowing from the outlet nozzle downward in the vertical direction is in a range from 5-25% of a total amount of exhaust flowing from the outlet nozzle.

The method 2400 includes at (2408) receiving second operation data collected by the sensors from one or more components of the aircraft. The second operation data may include similar data to the operation data collected at (2402). In particular, the controller may collect data from sensors that are in communication with the takeoff component.

The method 2400 includes at (2410) determining whether the aircraft has terminated or is about to terminate the takeoff operating condition. Upon terminating the takeoff operating condition, the aircraft operates in a different operating condition, such as a cruise operating condition. In the cruise operating condition, the aircraft maintains a specified altitude and a specified speed. As an example, the controller determines that the aircraft is in the cruise operating condition based on one or more of the following conditions: the altitude being above the altitude threshold, the Mach number being above the Mach number threshold, the speed being above the speed threshold, the pitch angle being below the pitch angle threshold, the ambient air pressure being below the air pressure threshold, the ambient temperature being below the temperature threshold, or combinations thereof.

The method 2400 includes at (2412) moving the movable portion of the outlet nozzle back to an initial position. In the cruise operating condition, the takeoff components are stowed away from the engine, and outlet nozzle provides all of the exhaust in the rearward direction. Specifically, the controller can actuate the actuator to rotate the movable portion of the outlet nozzle back to the initial position.

Existing ducted turbofans include separate outlet guide vanes and pylons which can cause separation and turbulence as different air streams pass over guide vanes and pass by pylons. Therefore, in this implementation, outlet guide vane 1232*o* and pylon 1218 are integrated in such a way as to jointly work to de-swirl airflow from the fan (see e.g., FIGS. 12-16, fan 1222) as the airflow passes across pylon 1218 and optimally prepare the airflow as the airflow approaches wing 1214 (see e.g., FIGS. 12-13 & 16).

Turbofans can be installed based on physical constraints without necessarily taking into account how engine turbomachinery could be made more or less efficient based on the installation position. The discussion of FIGS. 1-11 above describes optimal installed locations relative to a wing for an open fan engine to generate rotor thrust most efficiently. The discussion of FIGS. 12-18 further describes that it can be advantageous to tilt an open fan engine down to better align open fan flow with wing upwash, improving rotor aerodynamic efficiency, and/or reducing engine noise. However, this tilt-down disadvantageously directs nozzle exhaust flow towards the wing and any deployed flaps. To mitigate the hot gas impingement, the core nozzle and thus exhaust can be canted down away from the wing. The discussion of FIGS. 19-24 further describes that, in addition to the design features of FIGS. 12-18, during the takeoff operation of an aircraft, a movable portion of an outlet nozzle may be to rotated to a specified position that is angled away from a fixed portion of the outlet nozzle, such that an amount of exhaust flowing from the outlet nozzle downward in the vertical direction is in a range from 5-25% of a total amount of exhaust flowing from the outlet nozzle.

Unlike turboprop canted-down exhausts, which do not have a third stream exhaust surrounding the core exhaust, a canted core exhaust may be more efficient if the nozzle shape is constructed in a particular way when a third stream exhaust surrounds the core exhaust. Implementing this nozzle shape into the nozzles described above results in an open fan engine installed relative to an aircraft wing that can advantageously result in better performance with respect to fuel efficiency and acoustics. These improvements in the nozzle shape result in improved interaction of the bypass stream and/or the third stream with the core exhaust stream, as described below.

An unducted thrust producing system for an aircraft may be associated with various design challenges. For an underwing open fan engine installation, higher efficiency and optimal locations for installation may require placing the engine relatively vertically close to the wing. Thus, the engine is close-coupled with the wing and/or the engine may be pitched down relative to the aircraft to improve performance and noise. The closer the engine installation is to the wing, the higher the risk of hot core exhaust gas impinging on deployed wing flaps. Wing flaps will be deployed during some aircraft operating conditions, such as during takeoff, approach, landing, etc. The location of the engine may result in jet-flap interactions, such as, for example, unsteady loads and/or high temperatures experienced by the trailing edge flap system of the aircraft. To mitigate this risk, the engine core exhaust could be re-directed, such as with a canted, internal plug core nozzle.

Thus, a solution is to design a fixed, but canted, core nozzle to direct the energetic and hot core stream away from the wing and flaps. However, there is a performance penalty for this canting at all flight conditions because the core's thrust vector is not aligned with the rest of the engine's thrust. Therefore, enacting a canted, internal plug nozzle yields some efficiency penalties which should be addressed. These penalties include thrust efficiency, the nozzle's ability to effectively expand high pressure exhaust flow into thrust, and/or flow efficiency, the nozzle's ability to pass the turbomachinery exhaust gas flow through as physically small a nozzle as possible. Smaller nozzles have lower drag and weight.

Implementations described herein further relate to an unducted thrust producing system and a method of using the same. Features of the unducted thrust producing system include the combination of an internal plug core nozzle, historically for acoustics or infrared (IR) signature motivations, and a canted core nozzle, historically for avoiding exhaust-flap impingement. The motivation for the open fan canted core nozzle is exhaust-flap impingement avoidance. There are specific and unique embodiments to make this nozzle efficient, including a core nozzle flow that is annularly interior of a jet exhaust stream that may be of higher pressure and lower temperature (third stream or bypass stream), and a core nozzle's closeout that is cylindrical in shape such that core exhaust flow exits its nozzle parallel to exhaust jet surrounding it.

To maximize a core nozzle's efficiencies, a design feature is identified. This feature is ensuring the core exhaust flow and surrounding bypass or third stream nozzle flow, are parallel or close to parallel, at the core nozzle exit. While a parallel flow between the core exhaust flow and the surrounding bypass or third stream flow may be most efficient, if the core exhaust flow and the bypass or third exhaust flow are off parallel but less than a threshold angle, the off-parallel flow may still provide advantages. During operation of the unducted thrust producing system of the engine, an exhaust stream and a bypass or third stream may be generated by the engine and fan. The core nozzle may be canted downward and/or laterally outward (e.g., away from the fuselage) with respect to a centerline axis of the engine. The core nozzle may expel a core exhaust stream and the aft core cowl may be scrubbed by a bypass or third stream. The core nozzle may include a core nozzle segment that has an interior surface having a decreasing surface curvature in an axial direction and decreasing cross-sectional area toward the exhaust end of the nozzle. The aft core cowl, positioned radially outward with respect to and surrounding the core nozzle segment, may include an aft core cowl segment that has an exterior surface having a decreasing surface curvature in the axial direction and decreasing cross-sectional area toward the exhaust end of the nozzle. The decreasing surface curvature of the interior surface of the core nozzle segment and the decreasing surface curvature of the exterior surface of the aft core cowl segment may both transition together into surfaces that are parallel with respect to each other along the axial direction toward the exhaust end of the outlet nozzle, such that during operation of the unducted thrust producing system, a bypass or third exhaust stream scrubbing the aft core cowl entrains a core exhaust stream expelled through the core nozzle. Entrainment of the core exhaust stream by the bypass or third exhaust stream improves the efficiency of the thrust generated by the unducted thrust producing system of the engine.

Additionally, the shape of the exhaust end of the outlet nozzle may cause inefficiencies. For example, two outlet nozzles may be present on an aircraft, each centered at approximately the same location relative to the wing. A circular nozzle may exhibit risk of impingement, because it may overlap the wing flaps. If a circular nozzle is chosen, either the wing flaps may need redesigning, with an efficiency penalty, or the engine may need to be dropped further below wing, extending landing gear. These two scenarios may be undesirable for aircraft lift and/or weight reasons, respectively.

Implementations described herein further include an elliptical outlet nozzle. An elliptical nozzle, as viewed upstream into nozzle, from nozzle exit, may avoid flap impingement. The internal plug core nozzle's exit may be shaped as an ellipse, defined by semi-major axes lengths a and b, where a is oriented approximately parallel to a ground plane or a wingspan of the aircraft, and where b is vertical and normal to a. As a increases relative to b, the ellipse becomes flatter. When a and b are equal, the nozzle exit is perfectly circular. As the nozzle flattens with a>b, the 12 o'clock flow portion of nozzle flow is relatively further away from wing and flaps, further reducing the risk of hot gas impingement. Additionally, an elliptical nozzle may provide installation advantages, as there is less risk of interference from the wing flaps or other parts of the wing during installation of the engine and/or the outlet nozzle.

The features of the positioning of the propulsor relative to the aircraft wing by defining a P location between external OGV or IGV and a forward or aft rotating array of fan blades, respectively, and additionally defining the distance from the effective QC to P, as described above, results in synergistic effects to improve aerodynamic performance of the aircraft, improve thrust without increasing the required engine power, reduce drag, and/or reduce noise during flight of the aircraft, when integrated with these additional design features. The additional design features include an outlet nozzle that includes a core nozzle that expels a core exhaust stream and an aft core cowl that is scrubbed by a bypass or third stream, such that during operation of the propulsor of the aircraft, a bypass or third exhaust stream scrubbing the aft core cowl entrains/educts a core exhaust stream expelled through the core nozzle as a result of the surfaces of the core nozzle and the aft core cowl transitioning toward or into parallel surfaces toward the exhaust end of the nozzle, and/or with an outlet nozzle that is elliptical in cross-section as viewed upstream into the nozzle from the nozzle exit. These synergistic effects may be additive in a nonlinear manner, such that improvements are greater than would be expected by merely adding up the effects of each feature separately.

Additionally, further synergistic effects may result from adding to the above combination one or more of a fan face of the unducted fan that is pitched downwardly to address the inlet flow being encountered by the unducted fan at an upwash angle, an unducted fan engine with an exhaust section of the engine that is realigned with a freestream airflow to avoid blowing hot gas onto the wing and that aligns the engine thrust with a centerline axis of the aircraft, a canting and non-axisymmetric configuration of a working gas flowpath outlet and a third stream flowpath outlet, a pylon design with an integrated outlet guide vane, outlet guide vanes with one or more of the outlet guide vanes integrated with the pylon in such a way as to jointly work to de-swirl the fan exhaust while the fan exhaust passes over the pylon, and/or a variable cant outlet nozzle such that, during the takeoff operation of an aircraft, a movable portion of the variable cant outlet nozzle may be to rotated to a specified position that is angled away from a fixed portion of the outlet nozzle, as described above.

Figure 25:
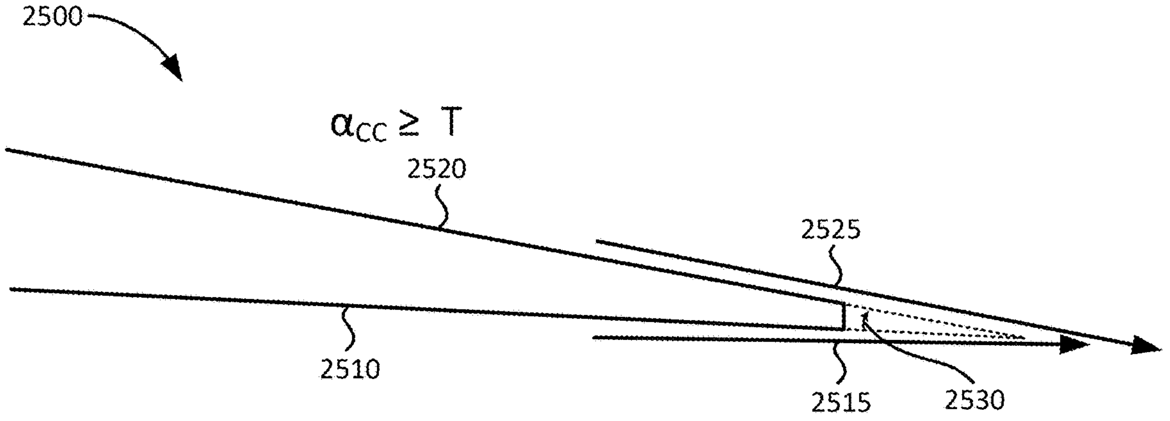
FIG. 25 is a first schematic diagram of the interaction of a core exhaust stream and a bypass stream.
Figure 26:
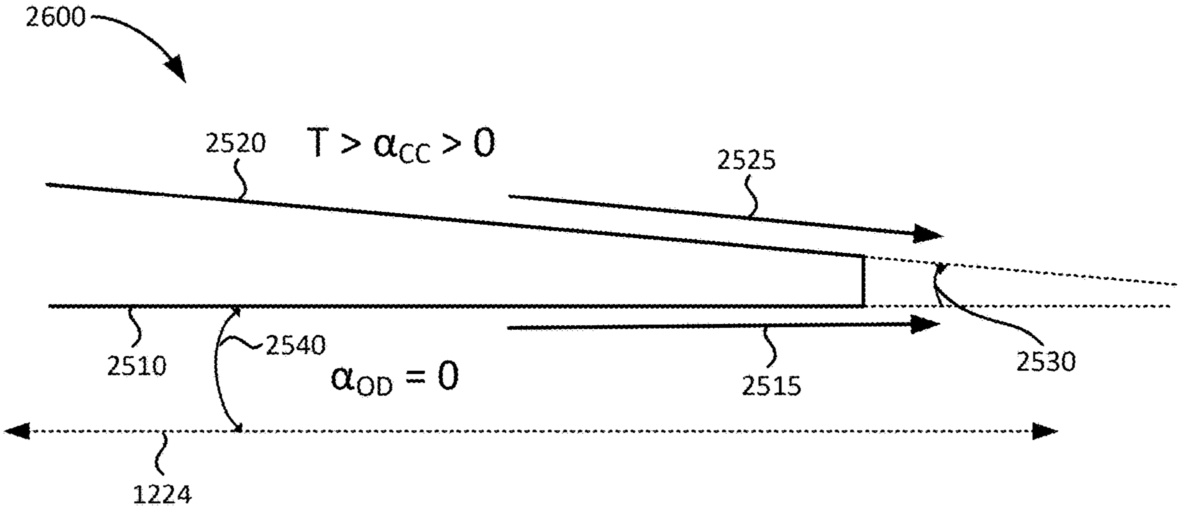
FIG. 26 is a second schematic diagram of the interaction of a core exhaust stream and a bypass stream.
Figure 27:
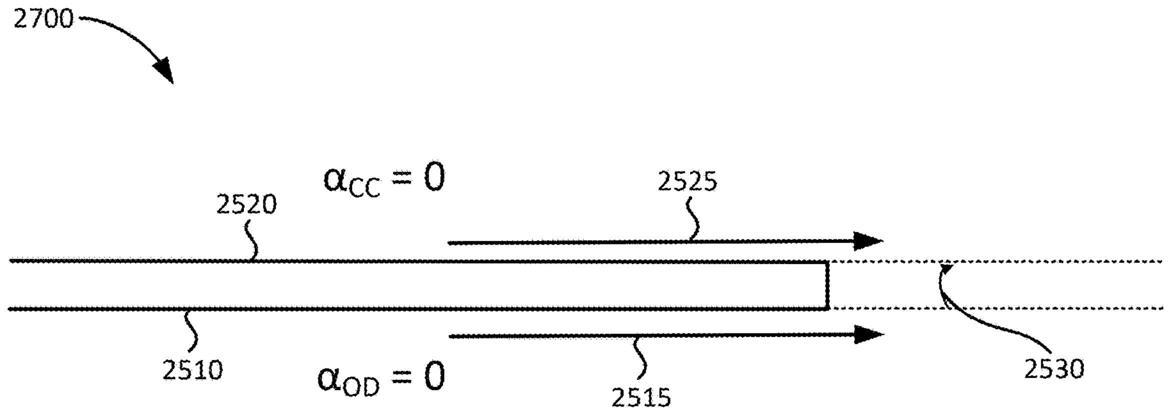
FIG. 27 is a third schematic diagram of the interaction of a core exhaust stream and a bypass stream.

The interaction between a core exhaust stream and a bypass or third exhaust stream may lead to inefficiencies. FIGS. 25-27 illustrate interactions between a core exhaust stream and a bypass or third exhaust stream. FIG. 25 is a first schematic diagram 2500 of the interaction of a core exhaust stream and a bypass stream or a third stream. As shown in FIG. 25, a core nozzle surface 2510 may define a surface that shapes a core exhaust stream 2515 and a core cowl surface 2520 may define a surface that is scrubbed by a bypass or third exhaust stream 2525. A stream "scrubbing" a surface, as the term is used herein, refers to the gas stream contacting the surface and following the direction of the surface due to the pressure differential created by the shape of the surface. Thus, the surface may entrain the gas stream and cause the gas stream to follow the curvature of the surface. The entrainment of the gas stream by the shape of the surface is referred to as the Coanda effect. The angle between the core exhaust stream 2515 and the bypass or third exhaust stream 2525 may be determined by a core cowl angle $\alpha_{CC}$ 2530. The core cowl angle $\alpha_{CC}$ 2530 corresponds to the angle between the inner surface of the core nozzle and the inner surface of the core cowl at the exhaust end of the nozzle. Thus, if a first line tangent to the surface of the core nozzle surface 2510 were to be extended past the exhaust end of the nozzle, and if a second line tangent to the surface of the core cowl surface 2520 were to be extended past the exhaust end of the nozzle, the angle between the first line and the second line would define the core cowl angle $\alpha_{CC}$ 2530.

At large values of the core cowl angle $\alpha_{CC}$ 2530, such as, for example, a value of about 10 degrees, the bypass or third exhaust stream 2525 may suppress the core exhaust stream 2515 by directly impinging the core exhaust stream 2525. The impingement by the bypass or third exhaust stream 2525 may disrupt the core exhaust stream 2515 and make a core exhaust nozzle less efficient at expanding the flow of the core exhaust stream 2515 into thrust. This inefficiency may be expressed as a decrease in the velocity coefficient CV corresponding to a ratio of the actual velocity of the aircraft 1200 and an ideal velocity of the aircraft 110 based on a theoretical velocity with no losses. Furthermore, the impingement by the bypass or third exhaust stream 2525 may make a core exhaust nozzle less efficient at passing air flow through a given area, resulting in reduced thrust. This inefficiency may be expressed as a decrease in the flow coefficient CF corresponding to a ratio of the actual mass flow rate through the nozzle and an ideal mass flow rate through the nozzle based on a theoretical mass flow rate with no losses. As the value of the core cowl angle $\alpha_{CC}$ 2530 decreases, the effect of the impingement effect goes down and transitions into an entrainment effect. At a threshold value of T for the core cowl angle $\alpha_{CC}$ 2530, the impingement by the bypass or third exhaust stream 2525 on the core exhaust stream 2515 may drop below a threshold amount of impingement and/or the entrainment by the bypass or third exhaust stream 2525 on the core exhaust stream 2515 may rise above a threshold amount of entrainment. The amount of impingement or entrainment may be measured based on, for example, a change in the Mach number of the core exhaust stream 2515 in response to encountering the bypass or third exhaust stream 2525. The threshold amount of impingement may be selected as the amount of impingement that does not reduce the Mach number of the core exhaust stream 2515 when the core exhaust stream 2515 meets the bypass or third exhaust stream 2525 at the exhaust end of nozzle.

FIG. 26 is a second schematic diagram 2600 of the interaction of the core exhaust stream 2515 and the bypass or third stream 2525. As shown in FIG. 26, the core cowl angle $\alpha_{CC}$ 2530 may be below the threshold value T and above a value of 0. FIG. 26 further shows a core nozzle outer diameter angle $\alpha_{OD}$ 2540. Core nozzle outer diameter angle $\alpha_{OD}$ 2540 corresponds to an angle between the centerline axis 1224 of the engine 1220 and the outer diameter of the outlet nozzle 1242. Thus, the core exhaust stream 2515 may be aligned with the centerline axis 1224. Below the threshold value T of the core cowl angle $\alpha_{CC}$ 2530, the bypass or third exhaust stream 2525 may no longer suppress and/or impinge the core exhaust stream 2515. Rather, at values below the threshold value T of the core cowl angle $\alpha_{CC}$ 2530, the bypass or third exhaust stream 2525 may entrain or educt the core exhaust stream 2515. FIG. 27 is a third schematic diagram 2700 of the interaction of the core exhaust stream 2515 and the bypass or third exhaust stream 2525. As shown in FIG. 21, the core cowl angle $\alpha_{CC}$ 2530 may have a value of 0.

An outer flow, such as the bypass or third exhaust stream 2525, may have a higher Mach number (e.g., a higher speed, etc.) than an interior core flow, such as the core exhaust stream 2515. A gas stream with a higher Mach number has a lower static pressure. If an outer stream has a lower static pressure than a core stream, the outer stream may entrain or educt the higher-pressure stream along with it. This phenomenon may be referred to as a fluidic nozzle, or as an eductor or ejector effect. When a first fluid entrains or educts a second fluid, the first fluid draws in the second fluid and the second fluid mixes with the first fluid, resulting in the first fluid and the second fluid to flow in the same direction. Occasionally, in operation of two nozzles, one with an outer stream and one with an inner stream, the relative pressures may be reversed for the two nozzles.

The eductor effect may be most efficient when the flow of the outer stream and the inner stream are parallel, meaning that the core cowl angle $\alpha_{CC}$ 2530 has a value of zero or, e.g., +/−2 degrees. If the outer stream and the inner stream are slightly off parallel (e.g., when the core cowl angle $\alpha_{CC}$ 2530 is above zero, but below the threshold T), the eductor effect may exist but be less efficient. The eductor effect enables a more efficient exhaust nozzle by providing a higher flow efficiency, enabling an exhaust nozzle to be physically smaller and have a smaller exit area when designed to implement the eductor effect. Furthermore, the eductor effect enables a higher thrust efficiency, because the exhaust nozzle is able to expand pressurized air through the nozzle more efficiently to create thrust, when designed to implement the eductor effect. The eductor/ejector effect may be maximized for an internal plug nozzle arrangement. However, the eductor/ejector effect may also be implemented on an external plug nozzle, though with less effect, as the exhaust gas flow may still be contracting radially as the gas travels down the plug.

Figure 28:
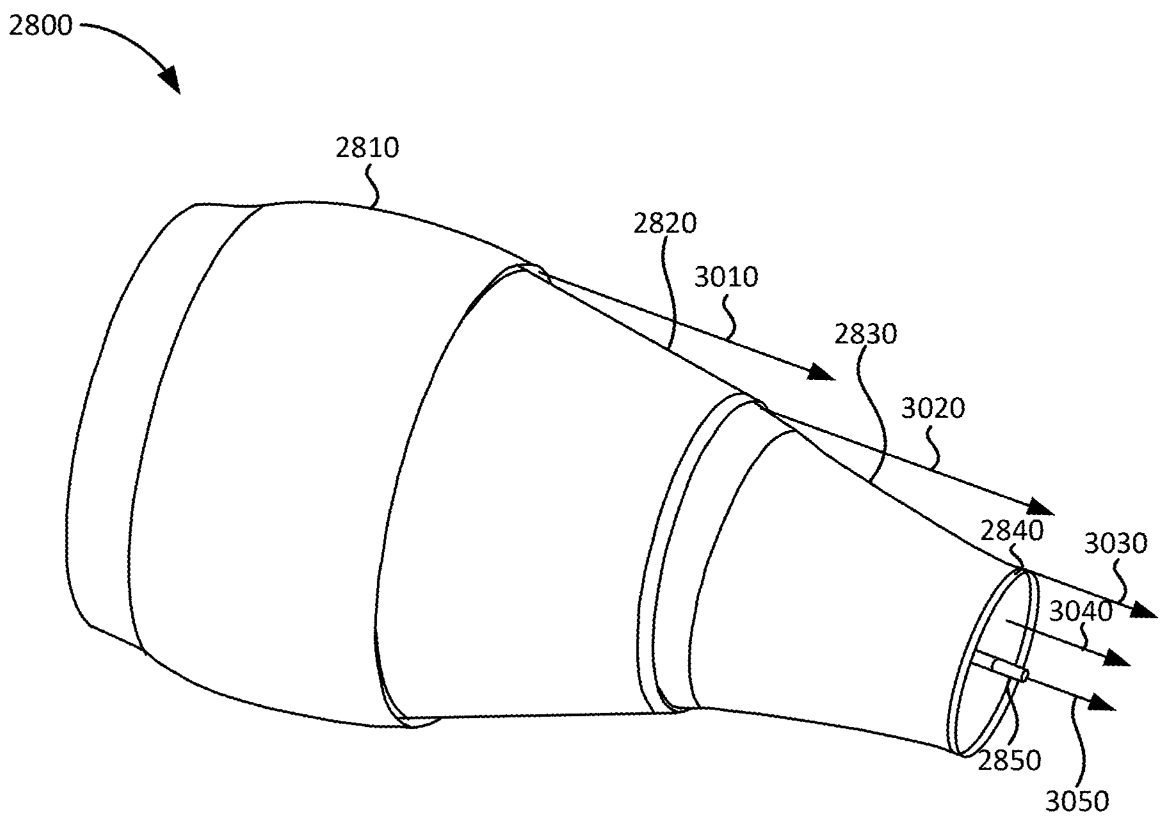
FIG. 28 is a perspective diagram of an exemplary outlet nozzle of an aircraft engine.
Figure 29:
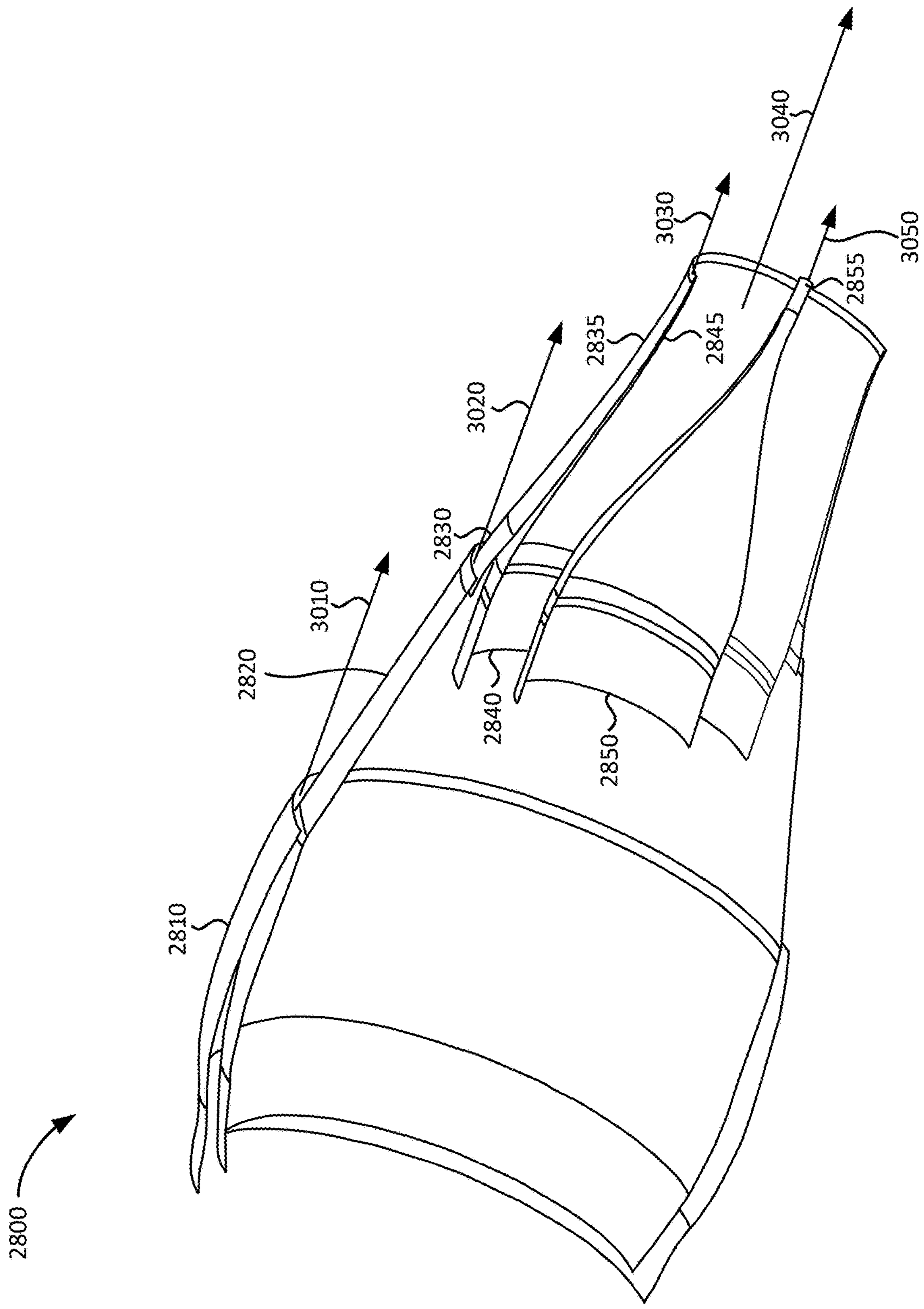
FIG. 29 is a cross-sectional perspective diagram of the exemplary outlet nozzle.
Figure 30:
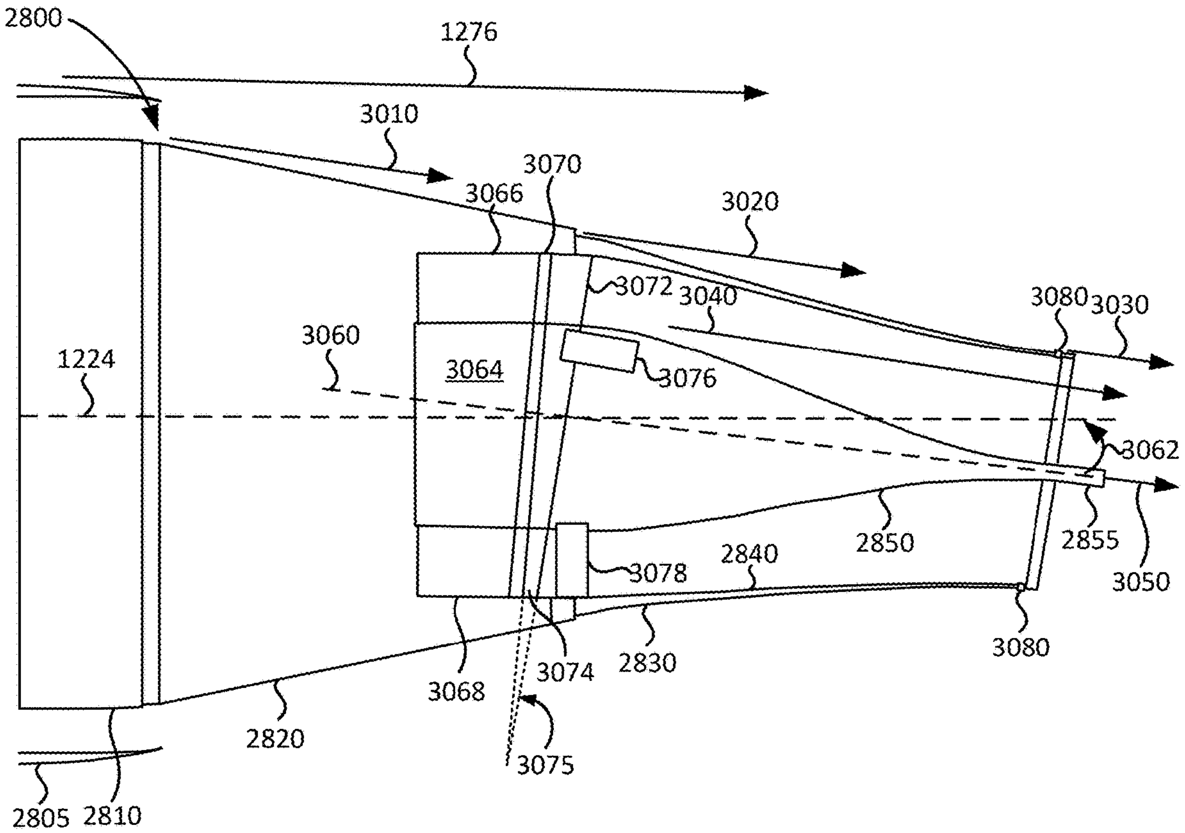
FIG. 30 is a cross-sectional side view diagram of the exemplary outlet nozzle.

FIG. 28 is a perspective diagram of an exemplary outlet nozzle 2800 that implements the eductor effect between a core exhaust stream and a bypass stream. FIG. 29 is a cross-sectional perspective diagram of the outlet nozzle 2800. FIG. 30 is a cross-sectional side view diagram of the exemplary outlet nozzle 2800. The outlet nozzle 1242 and/or the bypass outlet nozzle 1240 may be implemented as and/or include the outlet nozzle 2800. During operation of the turbomachine 1252 and the fan 1222, an exhaust stream and a third stream are expelled from the outlet nozzle 2800. The exhaust stream and the third stream provide thrust for the aircraft 1200. Thus, the turbomachine 1252, the fan 1222, and the outlet nozzle 2800 may together comprise an unducted thrust producing system of the aircraft 1200.

As shown in FIG. 28, the outlet nozzle 2800 may include a third stream nozzle 2810, a core nozzle cowl that includes a forward core cowl 2820 and an aft core cowl 2830, a core nozzle 2840, and a core plug 2850. As shown in FIG. 30, the outlet nozzle may be surrounded by an external nacelle 2805. The external nacelle 2805 may correspond to a radially outward nacelle that is forward of the outlet nozzle 2800 and centered along the centerline axis 1224. The external nacelle 2805 may be scrubbed by the fan stream 1276. The external nacelle 2805 is not shown in FIGS. 28 and 29 for clarity purposes.

In some implementations, the third stream nozzle 2810, the forward core cowl 2820, the aft core cowl 2830, the core nozzle 2840, and the core plug 2850 may correspond to a set of nested, annular, and/or tapered sleeves. For example, the third stream nozzle 2810 may be positioned radially outward with respect to and surround the forward core cowl 2820. The forward core cowl 2820 may be positioned radially outward with respect to and surround the aft core cowl 2830. The aft core cowl 2830 may be positioned radially outward with respect to and surround the core nozzle 2840. The core nozzle may be positioned radially outward with respect to and surround the core plug 2850. The centerline axis of each of the third stream nozzle 2810, the forward core cowl 2820, the aft core cowl 2830, the core nozzle 2840, and/or the core plug 2850 may each be aligned with the centerline axis 1224 of the engine 1220 and canted downward toward the ground and/or laterally outward with respect to the fuselage 1212. Thus, the axial direction of the third stream nozzle 2810, the forward core cowl 2820, the aft core cowl 2830, the core nozzle 2840, and/or the core plug 2850 may extend along the forward-aft direction and/or the upstream-downstream direction of the engine 1220 and be canted downward and/or outward by a cant angle as described below with reference to FIG. 30.

The third stream nozzle 2810 may correspond to the most radially outward and most forward portion of the outlet nozzle 2800 along the centerline axis 1224. Thus, the third stream nozzle 2810 may form the outside surface of the outlet nozzle 2800 at the forward/upstream end of the forward core cowl 2820 and surround and protect the forward core cowl 2820. In some implementations, the third stream nozzle 2810 may have a fusiform shape and/or a bulging cylindrical shape to reduce drag and/or to prevent the fan stream 1276 from impinging upon any bypass and/or exhaust streams. The forward core cowl 2820 may extend axially in the aft/downstream direction and taper in the aft/downstream direction to compress exhaust gases traveling toward the aft core cowl 2830, the core nozzle 2840, and the core plug 2850. The aft end of the forward core cowl 2820 may surround the forward end of the aft core cowl 2830. The external nacelle 2805 may be scrubbed by the fan stream 1276. The fan stream 1276 may correspond to the bypass flow of the engine 1220. The third stream nozzle 2810 may expel a third stream 3010. The third stream 3010 may provide a portion of the thrust generated by the engine 1220. The forward core cowl 2820 may expel cowl vent flow stream 3020. The cowl vent flow stream 3020 may correspond to a minor flow of cooling air. In other implementations, the forward core cowl 2820 may be sealed to the aft core cowl 2830 and the cowl vent flow stream 3020 may not be generated. The forward core cowl 2820 may be scrubbed by the third stream 3010.

The aft core cowl 2830 may include a aft core cowl segment 2835. The aft core cowl segment 2835 may have a surface that corresponds to the core cowl surface 2520. The core nozzle 2840 may include a core nozzle segment 2845. The core nozzle segment 2845 may have a surface that corresponds to the core nozzle surface 2510. The core nozzle segment 2845 may include an interior surface having a decreasing outer decreasing surface curvature in the axial direction toward the exhaust end of the outlet nozzle 2800 and may have a decreasing cross-sectional area that is normal to the axial direction. The aft core cowl segment 2835 may have an exterior surface having a decreasing surface curvature in the axial direction toward the exhaust end of the outlet nozzle 2800 and may have a decreasing cross-sectional area that is normal to the axial direction. The aft core cowl 2830 may be scrubbed by a shear flow stream 3030. The shear flow stream 3030 may include a mixture of the third stream 3010, the cowl vent flow stream 3020, and/or the bypass flow of the fan stream 1276. The shear flow stream 3030 may scrub the outer surface of the aft core cowl 2830. The core nozzle 2840 may expel a core exhaust stream 3040.

The decreasing surface curvature of the interior surface of the core nozzle segment 2845 and the decreasing surface curvature of the exterior surface of the aft core cowl segment 2835 may both transition into surfaces that are parallel, or approximately parallel, with respect to each other along the axial direction toward the exhaust end of the outlet nozzle 2800, such that, during operation of the turbomachine 1252, the fan 1222, and the outlet nozzle 2800, the shear flow stream 3030 scrubbing the aft core cowl 2830 entrains the core exhaust stream 3040 expelled through the core nozzle 2840. Furthermore, the decreasing surface curvature of the interior surface of the core nozzle segment 2845 and the decreasing surface curvature of the exterior surface of the aft core cowl segment 2835 may both transition into surfaces that are parallel with respect to each other along the axial direction toward the exhaust end of the outlet nozzle 2800, such that, during operation of the turbomachine 1252, the shear flow stream 3030, which may include the third stream 3010 and/or the bypass flow of the fan stream 1276, is parallel to the core exhaust stream 3040 and/or generates an eductor effect on the core exhaust stream 3040.

The core cowl angle $\alpha_{CC}$ 2530 between the outer surface of the core nozzle segment 2845 and the interior surface of the aft core cowl segment 2835 may transition from a first non-zero value to a second non-zero or zero value. The first and second values may be based on the differences in size and shape between the forward ends of the core nozzle 640 and the aft core cowl 630 and the aft ends of the core nozzle 640 and the aft core cowl 630. For example, in some implementations, the core cowl angle $\alpha_{CC}$ 2530 between the outer surface of the core nozzle segment 2845 and the interior surface of the aft core cowl segment 2835 may transition from about 5 degrees to about 0 degrees. In other implementations, the core cowl angle $\alpha_{CC}$ 2530 between the outer surface of the core nozzle segment 2845 and the interior surface of the aft core cowl segment 2835 may transition from a value above 5 degrees to a value less than 1 degree, from a value above 5 degrees to a value less than 0.5 degrees, from a value above 5 degrees to a value less than 0.25 degrees, from about 10 degrees to about 5 degrees, from about 10 degrees to about 0 degrees, and/or any other first value in the range of 20 degrees to 5 degrees to a second value in the range of 5 degrees to 0 degrees.

The core plug 2850 may be positioned coaxially and radially inward with respect to the core nozzle 2840. The core plug 2850 may correspond to the plug 1244 and facilitate directly the flow of the core exhaust stream 3040.

In some implementations, the core plug 2850 may include a center vent tube 2855. Thus, the core plug 2850 may be at least partially hollow and include a flowpath that enables a center vent exhaust stream 3050 to exit via the center vent tube 2855. The center vent tube 2855 may be used for sump ventilation and/or oil sump pressurization and may extend past the end of the core nozzle 2840 so that the center vent exhaust stream 3050 contacts ambient air upon exit of the center vent tube 2855.

As shown in FIG. 30, the aft core cowl 2830, the core nozzle 2840, and/or the core plug 2850 may be canted with respect to the centerline axis 1224 and therefore with respect to the wing 1214. A core nozzle centerline axis 3060 of the core nozzle 2840 may be canted downward (e.g., toward the ground) and/or laterally outward relative to the centerline axis 1224 by a cant angle 3062. In some implementations, the cant angle 3062 may be about 4 degrees. In other implementations, the cant angle 3062 may be higher or lower than 4 degrees.

In some implementations, the cant angle 3062 may be adjustable. For example, the core nozzle 2840 may include a fixed portion 3064, which includes an upper fixed portion 3066 and a lower fixed portion 3068, and a movable portion extending from a movable end 3070 aft to the outlet of the core nozzle 2840. The movable portion of the core nozzle 2840 may include a first portion 3072 and a second portion 3074. The movable portion of the core nozzle 2840 may be movable from a first position to a second position. In a first position, the upper fixed portion 3066 may be aligned with and/or abut the first portion 3072 and the lower fixed portion 3068 may be aligned with and/or abut the second portion 3074. In the second position (not shown in FIG. 30), the upper fixed portion 3066 may be aligned with and/or abut the second portion 3074 and the lower fixed portion 3068 may be aligned with and/or abut the first portion 3072. The first portion 3072 and the second portion 3074 may be shaped to form a wedge with a movable portion angle 3075. Therefore, when the first portion 3072 and the second portion 3074 move from the first position to the second position, the cant angle 3062 may change based on the movable portion angle 3075. Thus, the cant angle 3062 may change from the first position to the second position. A surface of the movable end 3070 may be substantially annular in shape and include a seal with the fixed portion 3064, such as, for example, a stepped, flexible surface, a turkey-feather seal, etc. The seal may reduce or inhibit air leakage from the core exhaust stream 3040.

The core nozzle 2840 may include an actuator 3076, attached to fixed portion 3064 and configured to rotate the movable portion and move the first portion 3072 and the second portion 3074 between the first position and the second position. The actuator 3076 may include a linear or rotary actuator. In other implementations, fixed portion 3064 may include multiple actuators 3076. The core nozzle 2840 may further include a strut 3078 that connects the core plug 2850 to the movable portion of the core nozzle 2840. While a single strut 3078 is shown in FIG. 30, in practice the core nozzle 2840 may include multiple struts 3078. Furthermore, the core nozzle 2840 may include one or more rivets 3080 that connect the aft core cowl 2830 to the core nozzle 2840. Thus, the aft core cowl 2830 and the core plug 2850 may move with the movable portion of the core nozzle 2840 when the actuator 3076 moves the first portion 3072 and the second portion 3074 between the first position and the second position.

By moving the core nozzle 2840 between the first position and the second position, the angle of the shear flow stream 3030 (and thus the angle of the third stream 3010) and the core exhaust stream 3040 with respect to the centerline axis 1224 may be adjusted. For example, the angle of the shear flow stream 3030 and the core exhaust stream 3040 may be adjusted away from takeoff components that aid in lifting the aircraft 1200 during a takeoff operating mode. The takeoff components may include, for example, high lift devices, a trailing edge flap system, the wing 1214, or a horizontal tail. Additionally, the direction of thrust may be adjusted between the first position and the second position. For example, the thrust may be represented as a sum of a vertical thrust vector and a horizontal thrust vector in the downstream direction. The amount of vertical thrust may vary between the first position and the second position. For example, direction between 5% to 25% of the total thrust downward in the vertical direction may enable the core exhaust stream 3040 to be directed away from takeoff components of the aircraft 1200 without adversely affecting the takeoff efficiency of the aircraft 1200.

Figure 31:
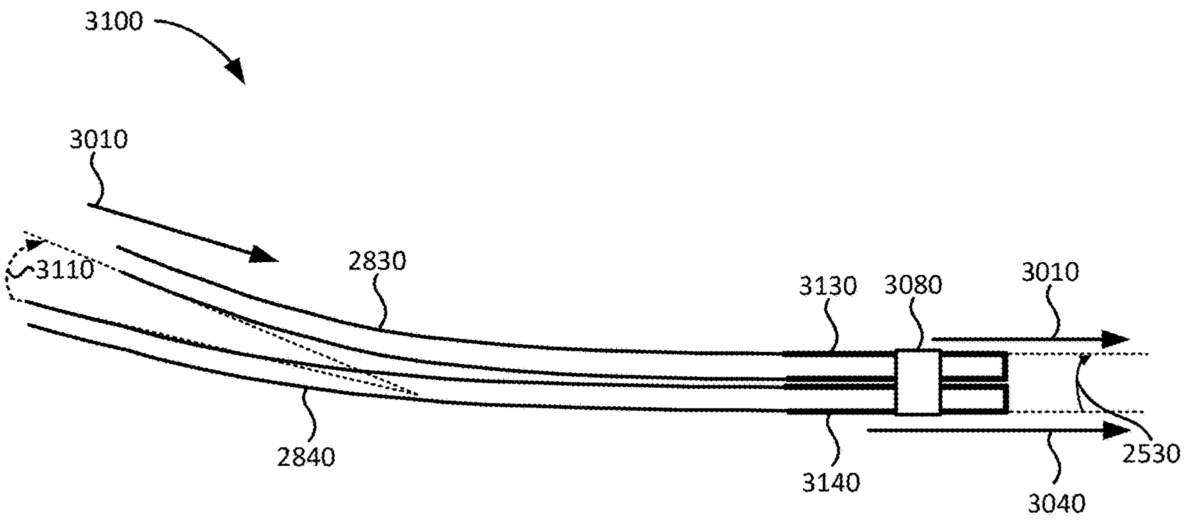
FIG. 31 is a cross-sectional diagram of a connection between an aft core cowl and a core nozzle.

FIG. 31 is a cross-sectional diagram 3100 of a connection between the aft core cowl 2830 and the core nozzle 2840. As shown in FIG. 31, the aft core cowl 2830 and the core nozzle 2840 may have a decreasing curvature in the aft/downstream direction toward the exhaust end of the core nozzle 2800. The decreasing curvature, and in particular the decreasing curvature of the interior surface of the core nozzle 2840 and the decreasing curvature of the exterior surface of the aft core cowl 2830, may decrease from a tangent angle 3110 toward the core cowl angle $\alpha_{CC}$ 2530, in order to guide the third stream 3010 into a direction of flow to entrain the core exhaust stream 3040. In some implementations, the tangent angle 3110 may be approximately 10 degrees. While the core cowl angle $\alpha_{CC}$ 2530 is shown as 0 in FIG. 31, the core cowl angle $\alpha_{CC}$ 2530 need not be 0 and may be any value below the threshold value T of the core cowl angle $\alpha_{CC}$ 2530 that enables entrainment of the core exhaust stream 3040 by the third stream 3010.

The aft core cowl 2830 may include an aft core cowl end section 3130 and the core nozzle 2840 may include a core nozzle end section 3140. The aft core cowl end section 3130 and the core nozzle end section 3140 may be position at the core cowl angle $\alpha_{CC}$ 3130 with respect to each other. The aft core cowl end section 3130 and the core nozzle end section 3140 may be riveted together with rivets 3080. For example, rivets 3080 may be spaced apart at particular intervals around the circumference of the outlet of the core nozzle 2840 and may ensure that a consistent core cowl angle $\alpha_{CC}$ 2530 is maintained around the entirety of the outlet of the core nozzle 2840. In some implementations, the aft core cowl end section 3130 and the core nozzle end section 3140 may be reinforced with extra material. Thus, when the core cowl angle $\alpha_{CC}$ 2530 is approximately 0, the core nozzle 2840 and the aft core cowl 2830 may be riveted together at surfaces that are parallel with respect to each other.

Figure 32:
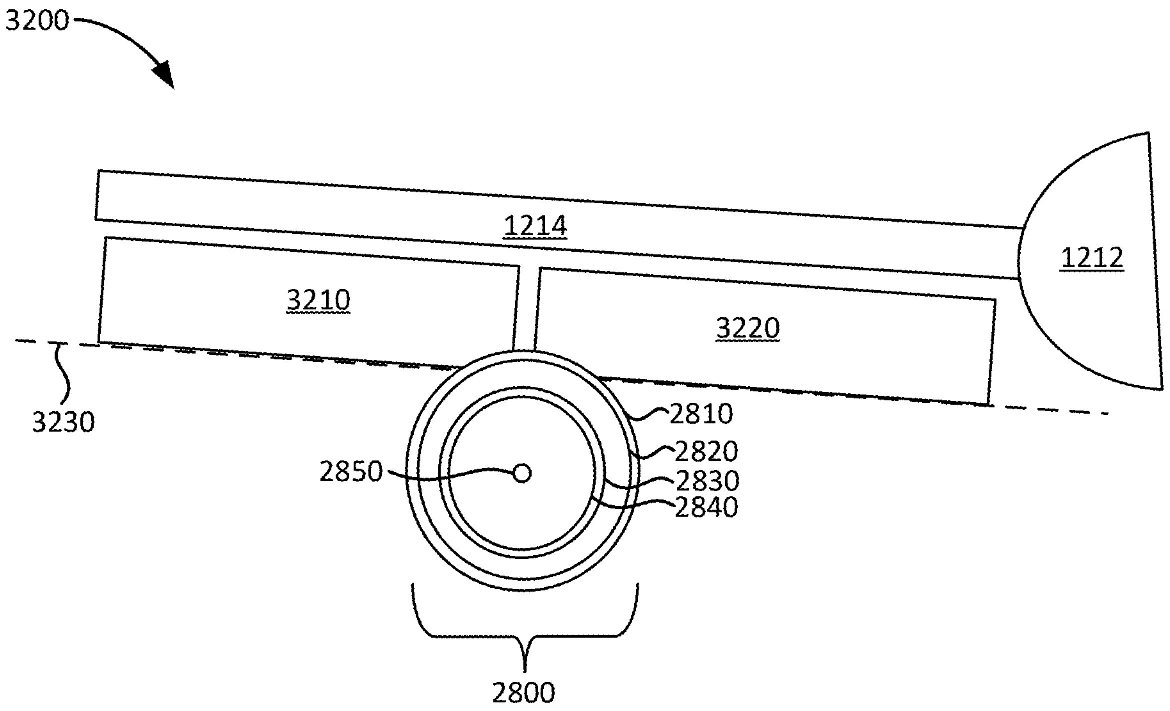
FIG. 32 is a rear view of a first exemplary outlet nozzle.

FIG. 32 is a rear view 3200 of the outlet nozzle 2800 mounted on the aircraft 1200. As shown in FIG. 32, the outlet nozzle 2800 may be mounted on the wing 1214. The outlet nozzle 2800 may be mounted on the wing 1214 through the pylon 1218 (not shown in FIG. 32). The outlet nozzle 2800 may have a substantially circular cross-section when viewed in the upstream direction from the rear. For example, the third stream nozzle 2810, the forward core cowl 2820, the aft core cowl 2830, and/or the core nozzle 2840 may each have a substantially cross-sectional area. However, a circular cross-section may interfere with the wing flap system. The wing 1214 may include a first wing flap 3210 and a second wing flap 3220. The first wing flap 3210 and the second wing flap 3220 have a trailing edge 3230. When the first wing flap 3210 and the second wing flap 3220 are deployed, the trailing edge 3230 may reach below the top of the outlet nozzle 2800 and the exhaust gases from the outlet nozzle 2800 may impinge on the first wing flap 3210 and the second wing flap 3220.

Figure 33:
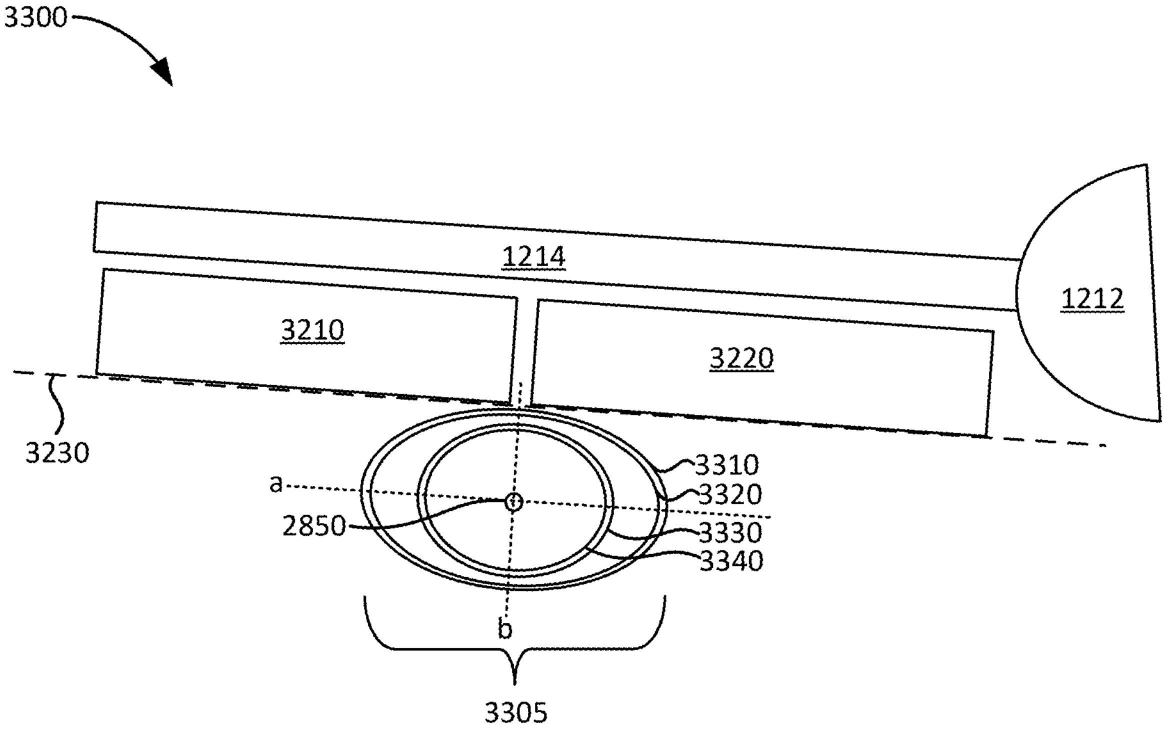
FIG. 33 is a rear view of a second exemplary outlet nozzle.

FIG. 33 is a rear view 3300 of an elliptical outlet nozzle 3305. As shown in FIG. 33, the elliptical outlet nozzle 3305 may have an elliptical cross-section in a plane normal to the axial direction, the axial direction being the centerline axis 1224 of the engine 1220. The elliptical outlet nozzle 3305 may include an elliptical third stream nozzle 3310, an elliptical forward core cowl 3320, an elliptical aft core cowl 3330, and an elliptical core nozzle 3340. The elliptical third stream nozzle 3310, the elliptical forward core cowl 3320, the elliptical aft core cowl 3330, and/or the elliptical core nozzle 3340 may each have an elliptical cross-section in a plane normal to the axial direction, the axial direction being the centerline axis 1224 of the engine 1220.

The nozzle exit, as viewed looking upstream into the outlet nozzle 3305, can be described as an ellipse with a and b semi-major axis lengths, where a is oriented approximately parallel to a ground plane or a wingspan of the aircraft, and where b is vertical and normal to a. As a increases relative to b, the ellipse becomes flatter, and when a and be are equal, the nozzle exit is perfectly circular. The elliptical outlet nozzle 3305, as viewed upstream into nozzle, from nozzle exit, may avoids flap impingement, because when the first wing flap 3210 and the second wing flap 3220 are deployed, the trailing edge 3230 does not reach below the top of the elliptical outlet nozzle 3305 and the exhaust gases from the elliptical outlet nozzle 3305 do not impinge on the first wing flap 3210 and the second wing flap 3220. Thus, the elliptical cross section includes a semimajor axis a that is parallel to the trailing edge 3230 of the wing flaps 3210 and 3220 of the aircraft 1200 when the wing flaps 3210 and 3220 are deployed, and the core exhaust stream 3040 and/or the third stream 3010 substantially avoid flap impingement when the wing flaps are deployed. Furthermore, the elliptical outlet nozzle 1105 may maintain the same amount of thrust as a circular nozzle with the same cross-section. In contrast, if a circular nozzle is reduced in cross-section to avoid flap impingement, the smaller circular nozzle may generate less thrust.

Figure 34:
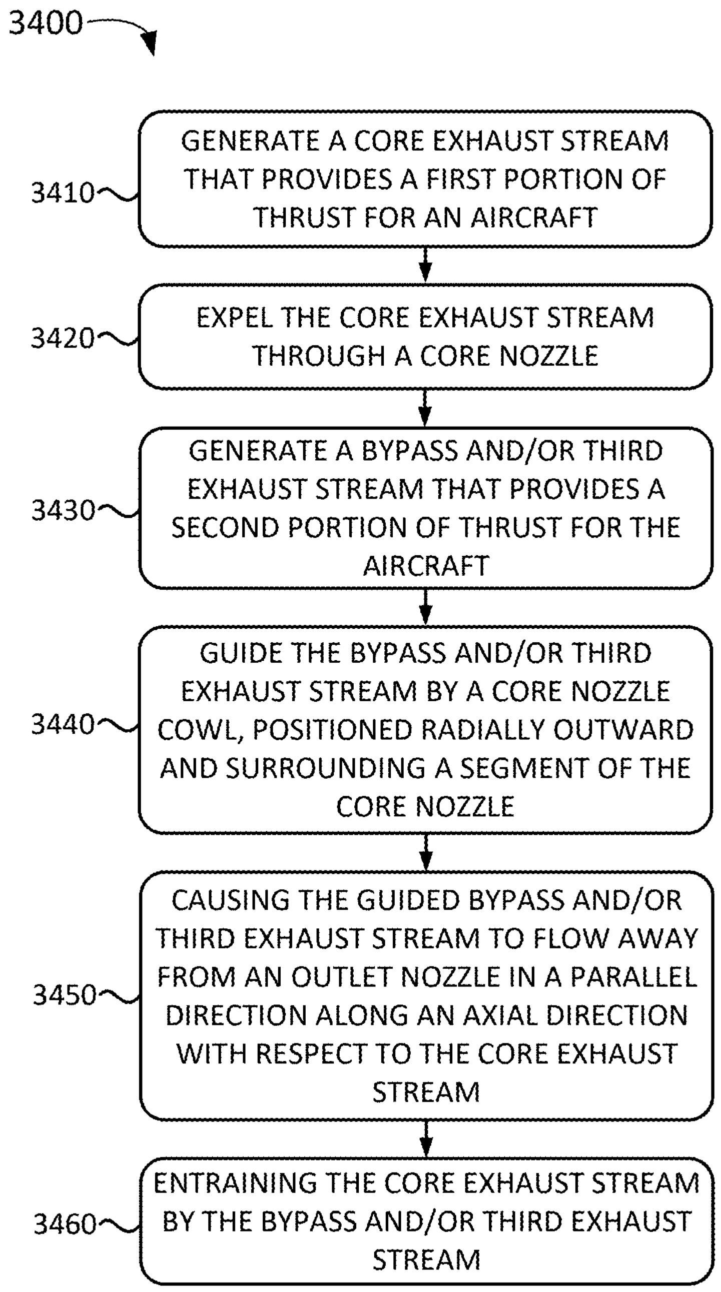
FIG. 34 is a flowchart for an exemplary process performed by an outlet nozzle. Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

FIG. 34 is a flowchart of an exemplary process 3400 performed by an outlet nozzle. In some implementations, the process 3400 may be performed by the outlet nozzle 2800. In other implementations, some or all of the process 3400 may be performed by another device or groups of devices separate from the outlet nozzle 2800.

The process 3400 may include generating a core exhaust stream that provides a first portion of thrust for an aircraft (block 3410) and expelling the core exhaust stream through a core nozzle (block 3420). For example, the unducted thrust producing system of the engine 1220 may generate expanding gases, using the combustor 1270, that enter the core nozzle 2840 of the outlet nozzle 2800, become compressed into the core exhaust stream 3040, and exit the core nozzle 2840.

The process 3400 may further include generating a bypass and/or third exhaust stream that provides a second portion of the thrust for the aircraft (block 3430) and guiding the bypass and/or third exhaust stream by an aft core cowl that is positioned radially outward and surrounding a segment of the core nozzle (block 3440). For example, the unducted thrust producing system of the engine 1220 may generate the fan stream 1276 by the fan 1222 and the generated fan stream 1276 may scrub the third stream nozzle 2810 of the outlet nozzle 2800. Furthermore, the unducted thrust producing system of the engine 1220 may generate a flow of air, through the fan 1222, that enters the bypass flowpath 1254, becomes compressed into the third stream 3010, and exits the third stream nozzle 2810 as the third stream 3010. The third stream 3010, and/or the bypass stream of the fan stream 1276, may scrub the external surfaces of the forward core cowl 2820 and the aft core cowl 2830 and be guided by the external surfaces of the forward core cowl 2820 and the aft core cowl 2830 to follow the shape of the external surfaces of the forward core cowl 2820 and the aft core cowl 2830.

The process 3400 may further include causing the guided bypass and/or third exhaust stream to exit an outlet nozzle in a parallel direction along an axial direction with respect to the core exhaust stream (block 3450) and entraining the core exhaust stream by the bypass or third exhaust stream (block 3460). For example, the decreasing interior surface curvature of the core nozzle segment 2845 and the decreasing exterior surface curvature of the aft core cowl segment 2835 may guide the shear flow stream 3030, which includes the third stream 3010 and/or a portion of the fan stream 1276, into a substantially parallel direction of flow with respect to the core exhaust stream 3040 as the shear flow stream 3030 and the core exhaust stream 3040 flow away from the outlet nozzle 2800, resulting in the third stream 3010 and/or the bypass flow of the fan stream 1276 entraining the core exhaust stream 3040 and/or causing the third stream 3010 and/or the bypass flow of the fan stream 1276 to generate an eductor effect on the core exhaust stream 3040.

The implementations described herein may further include various modifications. For example, the outlet nozzle 2800 and/or the elliptical outlet nozzle 3305 include a non-axisymmetric nozzle. A non-axisymmetric nozzle may be desirable, even in stowed mode, to manage any LPT distortion in deployed mode. As explained above, the outlet nozzle 2800 and/or the elliptical outlet nozzle 3305 may be integrated with a center vent tube 2855. Furthermore, the outlet nozzle 2800 and/or the elliptical outlet nozzle 3305 may be integrated with a heatshield and/or aft pylon fairing and/or be deployed on an aft fuselage mounted aircraft. Moreover, deploying use of the outlet nozzle 2800 and/or the elliptical outlet nozzle 3305 during landing may alleviate reverse thrust requirements as forward thrust may be spoiled when the core exhaust is vectored.

Further aspects of the disclosure are provided by the subject matter of the following clauses:

An aircraft defining a vertical direction, an upstream direction, and a downstream direction, the aircraft comprising: a fuselage; a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward array and the rearward array of blades are rotating blades and the rotating blades define a maximum outer diameter (D), the unducted fan propulsor having an exhaust section comprising an outlet nozzle and a core plug, wherein the core plug extends out of the outlet nozzle in the downstream direction and defines an aft-most portion of the propulsor, wherein during operation of the unducted fan propulsor an exhaust stream is expelled from the outlet nozzle of the exhaust section, wherein the exhaust stream defines a mean direction of flow in the downstream direction from the exhaust section, wherein the mean direction of flow of the exhaust stream defines a first angle with the CL greater than zero such that the CL is oriented downwardly along the vertical direction relative to the mean direction of flow of the exhaust stream; a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; an airfoil section having an effective quarter chord point QC; and a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and 0 is between 187° and 342°.

The aircraft of any preceding clause, wherein 0.15≤RL/D.

The aircraft of any preceding clause, wherein 0.35≤RL/D, and preferably RL/D is about 0.72.

The aircraft of any preceding clause, wherein 0 is between 198° and 310°, and preferably between 205° and 285°.

The aircraft of any preceding clause, wherein the two or more unducted fan propulsors are configured to operate at a cruise flight Mach M0 of between 0.7 and 0.9, and more preferably between 0.75 and 0.9; or the two or more unducted fan propulsors are configured to propel the aircraft at a cruise flight Mach M0 of between 0.7 and 0.9, and more preferably between 0.75 and 0.85.

The aircraft of any preceding clause, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, po is ambient air density, $V_o$ is cruise flight velocity, and $A_{an}$ is annular cross-sectional area perpendicular to an axis of rotation of a rotor axis of rotation.

The aircraft of any preceding clause, wherein the unducted fan propulsor is undermounted to the airfoil with one or more intermediate structures.

The aircraft of any preceding clause, wherein the P of the unducted fan propulsor is variable to accommodate different operating conditions.

The aircraft of any preceding clause, wherein the first angle is less than or equal to 10 degrees.

The aircraft of any preceding clause, wherein the plurality of blades arranged in the forward array comprises a stage of unducted rotor blades and the plurality of blades arranged in the rearward array comprises guide vanes located downstream of the stage of unducted rotor blades, wherein the aircraft further comprises: a pylon mounting one of the unducted fan propulsors to one of the pair of wings; and a guide vane, of the guide vanes, mounted to and extending from a portion of the pylon.

The aircraft of any preceding clause, further comprising: a pylon mounted to one of the pair of wings, wherein the one of the pair of wings defines an upper surface along the vertical direction and a lower surface along the vertical direction, wherein a portion of the pylon connects to and extends along a portion of the upper surface of the one of the pair of wings.

The aircraft of any preceding clause, wherein the outlet nozzle includes: a core nozzle comprising a core nozzle segment with a decreasing cross-sectional area that is normal to an axial direction toward an exhaust end of the outlet nozzle; and an aft core cowl, positioned radially outward with respect to and surrounding the core nozzle segment, wherein the aft core cowl comprises an aft core cowl segment with a decreasing cross-sectional area that is normal to the axial direction, and wherein a surface of the core nozzle segment and a surface of the aft core cowl segment both transition into surfaces that are parallel with respect to each other along the axial direction toward the exhaust end of the outlet nozzle, such that during operation of the unducted fan propulsors, a bypass or third exhaust stream scrubbing the aft core cowl entrains a core exhaust stream expelled through the core nozzle.

The aircraft of any preceding clause, wherein the core nozzle and the aft core cowl are riveted together at the surfaces that are parallel with respect to each other.

The aircraft of any preceding clause, wherein the outlet nozzle includes a fixed portion and a movable portion, wherein the movable portion is movable from a first position to a second position, wherein when the movable portion is in the first position, the movable portion is aligned with a centerline axis of the unducted fan propulsor, and wherein when the movable portion is in the second position, the movable portion is canted downward in a vertical direction and outward in a lateral direction relative to the centerline axis, and wherein the movable portion includes an end engaging the fixed portion, wherein when the movable portion is in the first position, the end defines a nonzero cant angle with the centerline axis.

The aircraft of any preceding clause, wherein the outlet nozzle includes an elliptical cross section in a plane normal to an axial direction, and wherein the elliptical cross section includes a semi-major axis that is parallel to a trailing edge of wing flaps of the aircraft when the wing flaps are deployed, and wherein the exhaust stream substantially avoids flap impingement when the wing flaps are deployed.

An aircraft defining a vertical direction, an upstream direction, and a downstream direction, the aircraft comprising: a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), the unducted fan propulsor having an exhaust section comprising an outlet nozzle and a core plug, wherein the core plug extends out of the outlet nozzle in the downstream direction and defines an aft-most portion of the propulsor, wherein during operation of the unducted fan propulsor an exhaust stream is expelled from the outlet nozzle of the exhaust section, wherein the exhaust stream defines a mean direction of flow in the downstream direction from the exhaust section, wherein the mean direction of flow of the exhaust stream defines a first angle with the CL greater than zero such that the CL is oriented downwardly along the vertical direction relative to the mean direction of flow of the exhaust stream; a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

The aircraft of any preceding clause, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The aircraft of any preceding clause, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The aircraft of any preceding clause, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

An aircraft defining a vertical direction, an upstream direction, and a downstream direction, the aircraft comprising: a fuselage; an airfoil extending from the fuselage, the airfoil having an airfoil section defining an effective quarter-chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D), the unducted fan propulsor having an exhaust section comprising an outlet nozzle and a core plug, wherein the core plug extends out of the outlet nozzle in the downstream direction and defines an aft-most portion of the propulsor, wherein during operation of the unducted fan propulsor an exhaust stream is expelled from the outlet nozzle of the exhaust section, wherein the exhaust stream defines a mean direction of flow in the downstream direction from the exhaust section, wherein the mean direction of flow of the exhaust stream defines a first angle with the CL greater than zero such that the CL is oriented downwardly along the vertical direction relative to the mean direction of flow of the exhaust stream; a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and 0 is between 187° and 340°; and wherein RL/D and θ of the P of the unducted fan propulsor adhere to the following expressions; and $$\frac{RL}{D}+\frac{\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta))}{1.96*\sin^2(\theta)+0.7225*\cos^2(\theta)}>0 \text{ and}$$

$$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0$$

In the preceding specification, various preferred embodiments have been described with reference to the accompanying drawings. It will, however, be evident that various modifications and changes may be made hereto, and additional embodiments may be implemented, without departing from the broader scope of the invention as set forth in the claims that follow. The specification and drawings are accordingly to be regarded in an illustrative rather than restrictive sense.

What is claimed is:

1. An aircraft defining a vertical direction, an upstream direction, and a downstream direction, the aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward array and the rearward array of blades are rotating blades and the rotating blades define a maximum outer diameter (D), the unducted fan propulsor having an exhaust section comprising an outlet nozzle and a core plug, wherein the core plug extends out of the outlet nozzle in the downstream direction and defines an aft-most portion of the propulsor, wherein during operation of the unducted fan propulsor an exhaust stream is expelled from the outlet nozzle of the exhaust section, wherein the exhaust stream defines a mean direction of flow in the downstream direction from the exhaust section, wherein the mean direction of flow of the exhaust stream defines a first angle with the CL greater than zero such that the CL is oriented downwardly along the vertical direction relative to the mean direction of flow of the exhaust stream;

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an airfoil section having an effective quarter chord point QC; and a positioning line (R) having a length (RL) and extending from the QC to the point P of the unducted fan propulsor at an angle θ measured positive in a counterclockwise direction when the high pressure side of the airfoil section is below the airfoil section when viewed looking from an outboard position towards an inboard position of the wing; wherein 0.07≤RL/D≤2.0 and 0 is between 187° and 342°.

2. The aircraft of claim 1, wherein 0.15<RL/D.

3. The aircraft of claim 1, wherein 0.35<RL/D, and preferably RL/D is about 0.72.

4. The aircraft of claim 1, wherein 0 is between 198° and 310°, and preferably between 205° and 285°.

5. The aircraft of claim 1, wherein the two or more unducted fan propulsors are configured to operate at a cruise flight Mach $M_0$ of between 0.7 and 0.9, and more preferably between 0.75 and 0.9; or the two or more unducted fan propulsors are configured to propel the aircraft at a cruise flight Mach $M_0$ of between 0.7 and 0.9, and more preferably between 0.75 and 0.85.

6. The aircraft of claim 1, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, po is ambient air density, $V_o$ is cruise flight velocity, and $A_{an}$ is annular cross-sectional area perpendicular to an axis of rotation of a rotor axis of rotation.

7. The aircraft of claim 1, wherein the unducted fan propulsor is undermounted to the airfoil with one or more intermediate structures.

8. The aircraft of claim 1, wherein the P of the unducted fan propulsor is variable to accommodate different operating conditions.

9. The aircraft of claim 1, wherein the first angle is less than or equal to 10 degrees.

10. The aircraft of claim 1, wherein the plurality of blades arranged in the forward array comprises a stage of unducted rotor blades and the plurality of blades arranged in the rearward array comprises guide vanes located downstream of the stage of unducted rotor blades, wherein the aircraft further comprises:

a pylon mounting one of the unducted fan propulsors to one of the pair of wings; and a guide vane, of the guide vanes, mounted to and extending from a portion of the pylon.

11. The aircraft of claim 1, further comprising:

a pylon mounted to one of the pair of wings, wherein the one of the pair of wings defines an upper surface along the vertical direction and a lower surface along the vertical direction, wherein a portion of the pylon connects to and extends along a portion of the upper surface of the one of the pair of wings.

12. The aircraft of claim 1, wherein the outlet nozzle includes:

a core nozzle comprising a core nozzle segment with a decreasing cross-sectional area that is normal to an axial direction toward an exhaust end of the outlet nozzle; and an aft core cowl, positioned radially outward with respect to and surrounding the core nozzle segment, wherein the aft core cowl comprises an aft core cowl segment with a decreasing cross-sectional area that is normal to the axial direction, and wherein a surface of the core nozzle segment and a surface of the aft core cowl segment both transition into surfaces that are parallel with respect to each other along the axial direction toward the exhaust end of the outlet nozzle, such that during operation of the unducted fan propulsors, a bypass or third exhaust stream scrubbing the aft core cowl entrains a core exhaust stream expelled through the core nozzle.

13. The aircraft of claim 12, wherein the core nozzle and the aft core cowl are riveted together at the surfaces that are parallel with respect to each other.

14. The aircraft of claim 1, wherein the outlet nozzle includes a fixed portion and a movable portion, wherein the movable portion is movable from a first position to a second position, wherein when the movable portion is in the first position, the movable portion is aligned with a centerline axis of the unducted fan propulsor, and wherein when the movable portion is in the second position, the movable portion is canted downward in a vertical direction and outward in a lateral direction relative to the centerline axis, and wherein the movable portion includes an end engaging the fixed portion, wherein when the movable portion is in the first position, the end defines a nonzero cant angle with the centerline axis.

15. The aircraft of claim 1, wherein the outlet nozzle includes an elliptical cross section in a plane normal to an axial direction, and wherein the elliptical cross section includes a semi-major axis that is parallel to a trailing edge of wing flaps of the aircraft when the wing flaps are deployed, and wherein the exhaust stream substantially avoids flap impingement when the wing flaps are deployed.

16. An aircraft defining a vertical direction, an upstream direction, and a downstream direction, the aircraft comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D), the unducted fan propulsor having an exhaust section comprising an outlet nozzle and a core plug, wherein the core plug extends out of the outlet nozzle in the downstream direction and defines an aft-most portion of the propulsor, wherein during operation of the unducted fan propulsor an exhaust stream is expelled from the outlet nozzle of the exhaust section, wherein the exhaust stream defines a mean direction of flow in the downstream direction from the exhaust section, wherein the mean direction of flow of the exhaust stream defines a first angle with the CL greater than zero such that the CL is oriented downwardly along the vertical direction relative to the mean direction of flow of the exhaust stream;

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

17. The aircraft of claim 16, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

18. The aircraft of claim 16, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

19. The aircraft of claim 16, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

20. An aircraft defining a vertical direction, an upstream direction, and a downstream direction, the aircraft comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D), the unducted fan propulsor having an exhaust section comprising an outlet nozzle and a core plug, wherein the core plug extends out of the outlet nozzle in the downstream direction and defines an aft-most portion of the propulsor, wherein during operation of the unducted fan propulsor an exhaust stream is expelled from the outlet nozzle of the exhaust section, wherein the exhaust stream defines a mean direction of flow in the downstream direction from the exhaust section, wherein the mean direction of flow of the exhaust stream defines a first angle with the CL greater than zero such that the CL is oriented downwardly along the vertical direction relative to the mean direction of flow of the exhaust stream;

a point (P) located at an intersection of the CL and a line HP perpendicular to the CL that passes through an axial midpoint between a rearward trailing edge (TE) at a root of a blade of the rearward array and a forward leading edge (LE) at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to a left of the TE; wherein $0.065<RL/D<1.98$ and 0 is between 187° and 340°; and wherein RL/D and θ of the P of the unducted fan propulsor adhere to the following expressions:

$$\frac{RL}{D}+\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0 \text{ and}$$

$$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.963*\sin^2(\theta)+0.7225*\cos^2(\theta)}<0.$$

* * * * *